United States Patent
Neu et al.

(10) Patent No.: US 7,930,006 B2
(45) Date of Patent: Apr. 19, 2011

(54) HOLDER, ELECTRICAL SUPPLY, AND RF TRANSMITTER UNIT FOR ELECTRONIC DEVICES

(75) Inventors: Thorben Neu, Los Angeles, CA (US); Vincent Razo, Granada Hills, CA (US); Scott Jackson, Rochester, NY (US)

(73) Assignee: Belkin International, Inc., Playa Vista, CA (US)

( * ) Notice: Subject to any disclaimer, the term of this patent is extended or adjusted under 35 U.S.C. 154(b) by 385 days.

(21) Appl. No.: 12/171,220

(22) Filed: Jul. 10, 2008

(65) Prior Publication Data

US 2009/0009936 A1  Jan. 8, 2009

Related U.S. Application Data

(63) Continuation-in-part of application No. 11/842,921, filed on Aug. 21, 2007, which is a continuation of application No. 10/936,356, filed on Sep. 8, 2004, now Pat. No. 7,292,881.

(60) Provisional application No. 60/959,057, filed on Jul. 10, 2007.

(51) Int. Cl.
*H04M 1/00* (2006.01)
*G06F 1/00* (2006.01)

(52) U.S. Cl. ............... 455/575.1; 361/679.02

(58) Field of Classification Search ........... 455/90.3, 455/575–573, 344–345, 517, 666.1, 426.1, 455/454, 74.1, 88, 569.1–569.2, 557, 41.2, 455/68.1, 571, 575.1, 575.9
See application file for complete search history.

(56) References Cited

U.S. PATENT DOCUMENTS

D85,176 S   9/1931  Garretson
D244,360 S  5/1977  Van Kersen
(Continued)

FOREIGN PATENT DOCUMENTS

WO  2004008649  1/2004
(Continued)

OTHER PUBLICATIONS

Belkin Catalog, Mobile FM Transmitter, http://catalog.belkin.com/IWCatProductPage.process?Merchant_Id=1&Product_Id=158087. Dec. 3, 2003.

(Continued)

*Primary Examiner* — Melody Mehrpour
(74) *Attorney, Agent, or Firm* — Bryan Cave LLP

(57) ABSTRACT

In one embodiment, an electronic accessory for coupling electronic devices to an external power supply includes: (a) a holder having: (1) a cradle section configured to couple to at least two of the electronic devices, the cradle section comprising a power coupling; and (2) two or more side supports, each of the two or more side supports configured to removably couple to the cradle section; and (b) a power unit electrically coupled to the power coupling and configured to removably couple to the external power supply. At least a first one of the two or more side supports is configured to provide support to a first one of the electronic devices when the first one of the electronic devices is coupled to the cradle section. At least a second one of the two or more side supports is configured to provide support to a second one of the electronic devices when the second one of the electronic devices is coupled to the cradle section. Other embodiments are disclosed in this application.

31 Claims, 43 Drawing Sheets

U.S. PATENT DOCUMENTS

| | | | |
|---|---|---|---|
| D317,579 S | 6/1991 | Shalvi | |
| 5,230,563 A | 7/1993 | Shalvi | |
| D357,201 S | 4/1995 | Novack | |
| D381,662 S | 7/1997 | Weissberg et al. | |
| 5,769,369 A | 6/1998 | Meinel | |
| 5,860,824 A * | 1/1999 | Fan | 439/265 |
| 6,052,603 A | 4/2000 | Kinzalow et al. | |
| 6,075,999 A | 6/2000 | Vilmi et al. | |
| D435,580 S | 12/2000 | Grinkus | |
| 6,157,163 A * | 12/2000 | Blackwood | 320/115 |
| 6,158,793 A * | 12/2000 | Castro | 296/1.07 |
| 6,233,467 B1 * | 5/2001 | Rydbeck | 455/566 |
| 6,282,088 B1 | 8/2001 | Canova et al. | 361/679.56 |
| 6,304,764 B1 * | 10/2001 | Pan | 455/569.2 |
| 6,339,699 B1 * | 1/2002 | Hirai et al. | 455/575.1 |
| 6,349,222 B1 * | 2/2002 | Hafiz | 455/569.2 |
| 6,356,645 B1 * | 3/2002 | Trenkle | 381/389 |
| D462,022 S | 8/2002 | Luebke et al. | |
| 6,453,180 B1 * | 9/2002 | Endoh et al. | 455/567 |
| D463,990 S | 10/2002 | Wysocki | |
| 6,492,792 B1 * | 12/2002 | Johnson et al. | 320/136 |
| 6,539,358 B1 * | 3/2003 | Coon et al. | 704/275 |
| D473,207 S | 4/2003 | Tanio | |
| 6,591,085 B1 * | 7/2003 | Grady | 455/42 |
| D479,712 S | 9/2003 | Ng | |
| 6,633,231 B1 * | 10/2003 | Okamoto et al. | 340/539.11 |
| D483,281 S | 12/2003 | Cobigo | |
| D487,470 S | 3/2004 | Cobigo | |
| D487,735 S | 3/2004 | Wu et al. | |
| 6,728,375 B1 | 4/2004 | Palett et al. | |
| D489,696 S | 5/2004 | Cho | |
| D489,713 S | 5/2004 | Yusa | |
| D495,665 S | 9/2004 | Stekelenburg | |
| D496,638 S | 9/2004 | Deubler, Jr. | |
| D496,639 S | 9/2004 | Deubler, Jr. | |
| 6,788,528 B2 * | 9/2004 | Enners et al. | 361/679.41 |
| D498,219 S | 11/2004 | Hamann | |
| D500,484 S | 1/2005 | Deguchi | |
| D506,989 S | 7/2005 | Seil et al. | |
| D508,028 S | 8/2005 | Deubler, Jr. | |
| D510,046 S | 9/2005 | Li | |
| D510,584 S | 10/2005 | Tierney | |
| D515,058 S | 2/2006 | Boyd | |
| 7,020,500 B2 * | 3/2006 | Saghbini | 455/571 |
| D521,526 S | 5/2006 | Suckle et al. | |
| 7,062,300 B1 * | 6/2006 | Kim | 455/569.1 |
| D525,962 S | 8/2006 | Elson | |
| D526,990 S | 8/2006 | Slevin et al. | |
| D527,666 S | 9/2006 | Tal et al. | |
| D547,223 S | 7/2007 | Tal et al. | |
| D548,728 S | 8/2007 | Yoshiyama | |
| D555,146 S | 11/2007 | Sandy | |
| 7,292,881 B2 * | 11/2007 | Seil et al. | 455/575.1 |
| D561,703 S | 2/2008 | Shimokawa et al. | |
| D561,730 S | 2/2008 | Deubler et al. | |
| D572,230 S | 7/2008 | Neu et al. | |
| D578,993 S | 10/2008 | Yamada et al. | |
| D590,804 S | 4/2009 | Tkachuk | |
| D593,062 S | 5/2009 | Lee et al. | |
| D597,068 S | 7/2009 | Whang | |
| D600,228 S | 9/2009 | Finney et al. | |
| D609,683 S | 2/2010 | Li | |
| 2001/0041590 A1 | 11/2001 | Silberfenig et al. | |
| 2002/0029091 A1 | 3/2002 | Seno et al. | |
| 2002/0155864 A1 * | 10/2002 | Wang | 455/566 |
| 2004/0058649 A1 * | 3/2004 | Grady | 455/42 |
| 2004/0204163 A1 * | 10/2004 | Ou | 455/569.1 |
| 2004/0224717 A1 | 11/2004 | Hertzberg et al. | |
| 2005/0014536 A1 * | 1/2005 | Grady | 455/573 |
| 2005/0064917 A1 | 3/2005 | Peng et al. | |
| 2005/0215285 A1 | 9/2005 | Lin | |
| 2008/0051160 A1 * | 2/2008 | Seil et al. | 455/575.1 |
| 2009/0009936 A1 * | 1/2009 | Neu et al. | 361/679 |
| 2009/0186583 A1 * | 7/2009 | Seil et al. | 455/66.1 |
| 2010/0075609 A1 * | 3/2010 | Seil et al. | 455/66.1 |
| 2010/0078536 A1 * | 4/2010 | Galvin | 248/231.51 |
| 2010/0273421 A1 * | 10/2010 | Tu et al. | 455/41.2 |

FOREIGN PATENT DOCUMENTS

WO    WO 2004 008649    1/2004

OTHER PUBLICATIONS

Griffin Technology, iTrip FM Transmitter for iPod; http://www.griffintechnology.com/products/itrip/index.html. Dec. 3, 2003.
Belkin Catalog, TuneCase Mobile FM Transmitter, http://catalog.belkin.com/IWCatProductPage.process?Mechand_Id=1&Product_Id=140984. Dec. 3, 2003.
FriendTech, iDea Travel Kit for the iPod and PSP; http://www.friendtech/com/pages/idea_travel_kit.htm. Jun. 15, 2006.
Belkin Catalog, TuneCast Mobile FM Transmitter, http://catalog.belkin.com/IWCatProductPage.process?Merchant_Id=&Section_Id=201526&pcount=&Product_Id=140984. Oct. 14, 2003.
Search Report from corresponding European Patent Application No. 08252353.1.

* cited by examiner

HOLDER, ELECTRICAL SUPPLY, AND RF TRANSMITTER UNIT FOR ELECTRONIC DEVICES

CROSS-REFERENCE TO RELATED APPLICATIONS

This application claims the benefit of U.S. Provisional Application No. 60/959,057, filed Jul. 10, 2007 and is a continuation-in-parts of U.S. patent application Ser. No. 11/842,921, filed Aug. 21, 2007, which is a continuation of application Ser. No. 10/936,356 now U.S. Pat. No. 7,292,881, filed Sep. 8, 2004. U.S. Provisional Application No. 60/959,057, U.S. patent application Ser. No. 11/842,921, and U.S. Pat. No. 7,292,881 are incorporated herein by reference.

BACKGROUND OF THE INVENTION

1. Field of the Invention

This invention relates to accessories for electronic devices, particularly media players (e.g., portable MP3 players). More specifically, the invention relates to an electronic device with supports for holding the media players and a method of use of the same.

2. Description of the Background

Numerous types of electronic devices are known, many of which are portable, for example, mobile (or cellular) phones, laptop computers, and audio playback devices, for example, portable AM (amplitude modulated) and FM (frequency modulated) radios, portable CD (compact disk) players, and portable MP3 (MPEG Audio Layer-3) players. The terms "electronic device" and "media player" should be broadly understood and include electronic devices of all types and designs (e.g., MP3 players and audio-visual media players).

The MP3 format is a compressed format for digital music. Use of the MP3 format reduces the size of digitized music files without degrading or distorting acoustic sound quality. Music is sometimes converted to the MP3 format and made available on the Internet. Such MP3 files can be downloaded from the Internet using a computer and special software. A computer with the appropriate capability and software can convert digital music from a CD into MP3 format. MP3 files are commonly played in three different ways: (i) MP3 files can be played directly on a computer that contains the requisite software, (ii) MP3 files can be decompressed and recorded onto a CD, which can then be played, and (iii) MP3 files can be played on an MP3 player.

Portable MP3 players are relatively small, light-weight devices that can interface with a computer. Typically, a user downloads MP3 files from the Internet onto a computer and then loads the MP3 files onto the MP3 player. The MP3 player is coupled to the computer's parallel or USB port, which allows the MP3 player to interface with the computer and receive the MP3 files.

There are many portable MP3 players available, including those manufactured by Sony Corp., Philips Corp., Audiovox Corp., Microsoft Corp. (e.g., the Zune™ MP3 player), and Apple Computer, Inc. (e.g., iPod® MP3 player and iPod® mini MP3 player). MP3 players rely on batteries for their portability and typically utilize headsets or ear phones for user listening. Battery life is sometimes a problem. After a few hours of playing time, most MP3 players need an alternate power source, need to be charged, or need to have their batteries replaced. Another limitation is that these MP3 players typically playback sound for only one listener at a time (e.g., via headset or ear phones). Even if the MP3 player is equipped with a speaker, the player's small size and light-weight design limit the size of the speaker, which tends to make the speaker inadequate for transmitting music to a group of people, e.g., in a vehicle.

MP3 player accessories that attempt to overcome these limitations are available, for example, units to supply power to the MP3 player for operation and/or charging (e.g., Auto Kit For iPod With Dock Connector, Part No. F8V7058-APL, from Belkin Corp.) and FM transmission systems (e.g., TuneCast II Mobile FM Transmitter, Part No. F8V3080-APL, from Belkin Corp.). An FM transmission system when used in conjunction with an MP3 player allows the user to play MP3 music files stored on the MP3 player through an FM audio system so that one can listen and allow others to listen to the stored music. However, current FM transmission systems are often unstable and provide weak FM signals, which can result in loss of signal or constant static hiss in the background. In such known FM transmission systems, the FM signal strength is sometimes weakened or lost because of inefficient antenna design (e.g., concerning its size, shape, and/or location).

Some known accessory units combine power supply and charging circuitry with an FM transmission system. Some of these devices are capable of use in vehicles by means of a cigarette lighter adapter (e.g., U.S. Pat. No. 6,591,085, U.S. Patent Application Publication No. 2004/0058649, International Application Publication No. WO 2004/010594, and International Application Publication No. WO 2004/008649). The current devices available, however, are often bulky, mechanically unstable, lack versatility, produce weak FM signals, yield noisy audio output from the FM receiver (e.g., audio output with noticeable hiss), and sacrifice user comfort and convenience. (All of the documents, including patent documents and product specification sheets, are incorporated herein in their entireties for all purposes.)

Another common problem with MP3 accessories is that the accessories are designed to be compatible with only one or a very limited number of MP3 players. That is, an MP3 accessory designed to work with the Apple iPod® MP3 player is not compatible with the Apple iPod® Mini MP3 player, the Apple iTouch® MP3 player or the Apple iPhone®. Usually, the incompatibility is caused by the MP3 accessories inability to physically couple to the second MP3 player. For example, the second MP3 player could be wider and thicker than the first MP3 player and the accessory is not designed to couple to MP3 players that are wider and thicker than the first MP3 player. Furthermore, ever if a holder is designed to work with a specific accessory the holder cannot usually physically coupled to the accessory when the accessory is inside of a protective case.

Broadly speaking, accessories for electronic devices have included various features that attempt to improve reliability, stability, portability, and/or functionality. Some of these features include: multiple preset buttons for user convenience; concealed buttons under a single smooth resilient thin outside surface, which reduces the danger of dirt getting stuck between the buttons (as in, for example, some cell phones and microwave ovens); goosenecks, which allow for increased maneuverability of the devices, and swivel joints, which also allow for increased maneuverability of the devices.

Despite all of this, however, the need still remains for a versatile holder and power supply unit, desirably with RF (e.g., FM) transmission capabilities, for electronic devices (e.g., MP3 players) so that one can easily utilize the full breadth of the capabilities of the electronic devices. The need exists for such units that are stable, light-weight, have rigid but and/or are portable so that they can be coupled with multiple MP3 players, for example, in vehicles. The need also exists for such units that are aesthetically pleasing to the eye, for example, that are sleek and modern-looking. Finally, the need also exists for such units that are superior in comfort, convenience, and/or electrical capabilities when mounting, powering, and/or otherwise using the units, but without sacrificing portability, stability, versatility, and/or aesthetics. Finally, a need also exist for accessories that are design to be compatible with multiple electronic devices and/or electronic device inside protective cases.

BRIEF SUMMARY OF EMBODIMENTS

Embodiments of an invention that satisfies one or more of those needs and overcomes one or more of those problems have now been developed. Broadly, in one aspect, some embodiments concern an electronic accessory for coupling electronic devices to an external power supply. In some embodiments, the electronic accessory can include a holder including: (a) a cradle section configured to couple to at least two of the electronic devices, the cradle section having a power coupling; (b) two or more side supports, each of the two or more side supports can be configured to removably couple to the cradle section; and (c) a power unit electrically coupled to the power coupling and configured to removably couple to the external power supply. In these embodiments, at least a first one of the two or more side supports can be configured to provide support to a first one of the electronic devices when the first one of the electronic devices is coupled to the cradle section. Additionally, at least a second one of the two or more side supports can be configured to provide support to a second one of the electronic devices when the second one of the electronic devices is coupled to the cradle section.

Further embodiments concern an electronic device to hold media players. In these embodiments, the electronic device include: (a) a holding structure configured to hold a first one of the media players and having: (1) at least two clasps; (2) a base; and (3) a transmitter electrically coupleable to the first one of the media players through the holding structure. The at least two clasps can be removably couplable to the base. A first clasp of the at least two clasps can be configured to couple to a first side of the first one of the media players. A second clasp of the at least two clasps can be configured to couple to a second side of the first one of the media players.

Yet other embodiments concern a method of using an electronic accessory. In these embodiments, the method can include: (a) providing the electronic accessory including: (1) a cradle having a base section with a power coupling; and (2) a power unit electrically coupled to the power coupling; (b) choosing one or more first side supports based on characteristics of a first electronic device; (c) coupling the one or more first side supports to the cradle; and (d) coupling the cradle and the one or more first side supports to the first electronic device.

As used herein, "vehicle" and the like should be broadly understood and refer to vehicles of all types and designs, including watercraft, aircraft (both lighter-than-air and heavier-than-air), automobiles, trucks, carriages, golf carts, motorcycles, etc.

The terms "couple," "coupled," "couples," "coupling," "coupleable," and the like should be broadly understood and refer to connecting two or more elements or signals, electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled; etc. Coupling (whether only mechanical, only electrical, or both) may be for any length of time, e.g., permanent or semi-permanent or only for an instant.

"Electrical coupling" and the like should be broadly understood and include coupling involving any electrical signal, whether a power signal, a data signal, or mixture of the two.

"Mechanical coupling" and the like should be broadly understood and include mechanical coupling of all types. For example, side supports can be mechanically coupled to the cradle in some examples. In another embodiment, the side support can be attached or detached by mechanically coupling or mechanically uncoupling connection mechanisms on the side supports and the cradle.

"Semi-permanently" and the like should be broadly understood and refer to a position, coupling, etc. being able to be held until it is changed. For example, the connector may comprise a semi-rigid elongate metallic antenna portion that allows the position of the holder to be semi-permanently adjusted relative to the position of the power acquisition sub-unit. Thus, while keeping the power acquisition sub-unit in position, the semi-rigid elongate metallic antenna portion can be put into one position, which it holds until it is put into another position, which it then holds until changed from that second position, thereby twice semi-permanently adjusting the position of the holder relative to the position of the power acquisition sub-unit. Significant advantages of using a gooseneck as the connector include its being readily repositionable from one semi-permanent position to another, which helps make embodiments usable in virtually any vehicle, even though vehicles differ widely in what obstructions (knobs, levers, etc.) are located near their cigarette lighters, because the gooseneck and holder can be adjusted so easily to avoid those obstructions.

As another example, the deformable resilient member (e.g., stabilizer 154 in, e.g., FIG. 9) may be, but need not be, semi-permanently mounted on the cigarette lighter adapter (e.g., power acquisition sub-unit 102 of FIG. 9 comprises a cigarette lighter adapter), e.g., the deformable resilient member may instead be permanently mounted. Thus, the deformable resilient member is preferably fixed in position on the cigarette lighter adapter but may be removed (e.g., by first unscrewing and removing nut 146 and retaining washer 158), e.g., to replace the deformable resilient member.

As another example, each one of the pre-sets of the RF transmission system may desirably be semi-permanently set to select a carrier frequency on which the RF transmitter can operate. Thus, e.g., a pre-set can be set to a carrier frequency and it will hold (i.e., correspond to) that frequency until that pre-set is reprogrammed to a different frequency. In the same or different embodiment, the pre-sets of the RF transmission system can be preset or reprogrammed for other uses such as selecting an audio mode. The term "pre-set" should be broadly understood to include any type of mechanism (whether or not having moving parts) that allows information, such as a frequency or audio mode, to be set and held in the mechanism for later use. The one or more pre-sets desirably are programmable by the user but need not be (e.g., they may be permanently set by the manufacturer and not be reprogrammable by the user).

"Semi-rigid" and the like should be broadly understood and refer to a member being sufficiently flexible, pliable, etc. so that it holds a position and shape when not stressed but can be bent, twisted, etc., preferably without damaging the member. Thus, a semi-rigid member is preferably not so rigid that attempts to bend, twist, etc. it cause it to break, crack, etc.

rather than bend, twist, etc. However, a wire itself would not be a semi-rigid elongate portion that allows the position of the holder to be semi-permanently adjusted relative to the position of the power acquisition sub-unit because, among other reasons, a wire by itself is not rigid or strong enough to support and semi-permanently maintain in the desired position either the empty holder or the holder when holding the electronic device.

The term "external power source" and the like should be broadly understood and refer to a source of electrical power outside of the item in question. For example, an external power source with respect to (i.e., outside of) the embodiments include a battery pack that is not part of the embodiment, a power plug or jack of a vehicle (e.g., the cigarette lighter of a car), or even the electrical system of the electronic device with which the embodiment is being used.

The term "circumference" and the like should be broadly understood and refer to some or all of the periphery of a member, regardless of the shape of the member (e.g., whether or not the shape of that member is all or partially concave, convex, straight, or a mixture of all three, and whether all or partially circular, elliptical, or otherwise curved, polygonal (e.g., triangular, square, pentagonal) or otherwise angular, etc.). Accordingly, the expression "the outer circumference of the deformable resilient member being larger than the inner circumference of the cigarette lighter" should be broadly understood to mean that at least some (but not necessarily all) of the periphery of the deformable resilient member extends radially beyond at least some of the periphery of the cigarette lighter. The outer circumference of the deformable resilient member need not have the same shape as the inner circumference of a cigarette lighter of a car (or other power source). Preferably, however, the deformable resilient member and the power source both have circular peripheries and all of the outer circumference (edge) of the deformable resilient member extends beyond the inner circumference of the power source.

Some embodiments can provide a combined holder, electrical supply, and optional RF transmitter unit and/or an electronic accessory for an electronic device to be used, e.g., in a vehicle, having one or more of the following features and advantages: the unit may be mechanically mounted (desirably semi-permanently but otherwise, e.g., permanently, is also possible), e.g., to the vehicle, at only one point (e.g., by the cigarette lighter adapter); the unit is readily (i.e., rapidly and easily) coupled, e.g., to the vehicle (the mechanical and electrical connection is made merely by plugging the power acquisition sub-unit (comprising a cigarette lighter adapter) into the vehicle's cigarette lighter, the unit remains coupled to the vehicle even on bumpy roads and going around turns and resists rotation and other movement with respect to the vehicle, thereby keeping the electronic device in the desired position in the vehicle (in other words, the unit is stable); the unit is light-weight; the unit allows the position of the electronic device in the vehicle to be easily and semi-permanently adjusted (e.g., by means of a preferred gooseneck between the holder and the cigarette lighter adapter and/or by means of a preferred swivel joint between the gooseneck and the holder); the unit accommodates electronic devices of different sizes and holds them securely (e.g., by using different size clasps for different electronic devices), even on bumpy roads and going around turns; the unit can provide power from the vehicle's electrical system to the electronic device; the cigarette lighter adapter of the unit accommodates cigarette lighters of different sizes and shapes; the unit converts the data output signal received from the electronic device (as is or as it may be modified) to an RF signal, which is then transmitted to the vehicle's audio system by using the gooseneck, when made of metal, as the broadcast antenna, the gooseneck thus functioning as an adjustable, repositionable mechanical support and connecting element and as an electronic signal transmission element, thereby providing a better signal to the vehicle's audio system; the unit allows the user to select the audio mode of the signal; the unit produces a stronger and cleaner (e.g., more accurate) signal, e.g., to provide or facilitate a higher signal-to-noise ratio in the audio output; the unit allows the carrier frequency of the RF transmitter to be changed easily and rapidly and has a number of pre-sets for storing different carrier frequency information so that the unit can easily and rapidly be switched from one available pre-determined carrier (broadcast) frequency to another (e.g., by depressing the button that has been pre-programmed by the user to the desired one of the user pre-determined carrier frequencies); the unit allows the user to view the carrier frequency and audio mode information on a video display; a one-piece resilient protective membrane covers all of the buttons in some embodiments, thereby keeping dirt from entering the mechanism; the RF transmitter can be releasably held in the holder; both the electronic device and RF transmitter can be removed from the holder and coupled directly to each other and removed (if desired) from the vicinity of the rest of the unit (thereby allowing the transmitter to broadcast the RF signal (e.g., FM signal) to another RF receiver (e.g., in the user's home or office or in another vehicle equipped with a holder and power acquisition sub-unit unit of this invention; and the unit is sleek and modern looking.

Some electronic devices have their own internal batteries and internal charging circuits (e.g., Apple Computer's iPod mini MP3 player). A unit of some embodiments can provide power to such electronic devices and allow them to charge even though the unit of some embodiments preferably does not itself have any charging circuitry.

Various embodiments can also provide a power acquisition unit for supplying power to an electronic device, and/or a power supply and support apparatus for an electronic device, and/or a holder for an electronic device, and/or an RF transmission system for use in a vehicle, each having one or more features and advantages described above.

A combined holder, electrical supply, and optional RF transmitter unit in some embodiments can be mounted in the cigarette lighter (or other power connection) of virtually any vehicle (this adaptability is made possible by various features, including the stabilizer on the power acquisition sub-unit), and the holder can be positioned with respect to the power acquisition sub-unit so that the holder, the electronic device, and the connector do not interfere with the knobs, levers, etc. in the vehicle (this adaptability is made possible by various features, including the adjustability of the connector, e.g., the gooseneck, which desirably also functions as the RF antenna). In short, some embodiments can provide a "one-size-can-fit-virtually-all" combined holder, power supply, and optional RF transmitter unit for electronic devices.

Other features and advantages are described below and still others will be apparent to those skilled in the art.

BRIEF DESCRIPTION OF THE DRAWINGS

To facilitate further description of the invention, the following drawings are provided in which.

These drawings are for illustrative purposes only and should not be used to unduly limit the scope of the invention.

DETAILED DESCRIPTION OF THE INVENTION

The shapes, dimensions, materials of construction, arrangements of the parts, etc. of the various embodiments are not critical except as otherwise noted, and any shapes, dimensions, materials of construction, arrangements of the parts, etc. may be used provided they allow those embodiments to operate and one or more of the benefits of these embodiments to be achieved.

Figure 1:
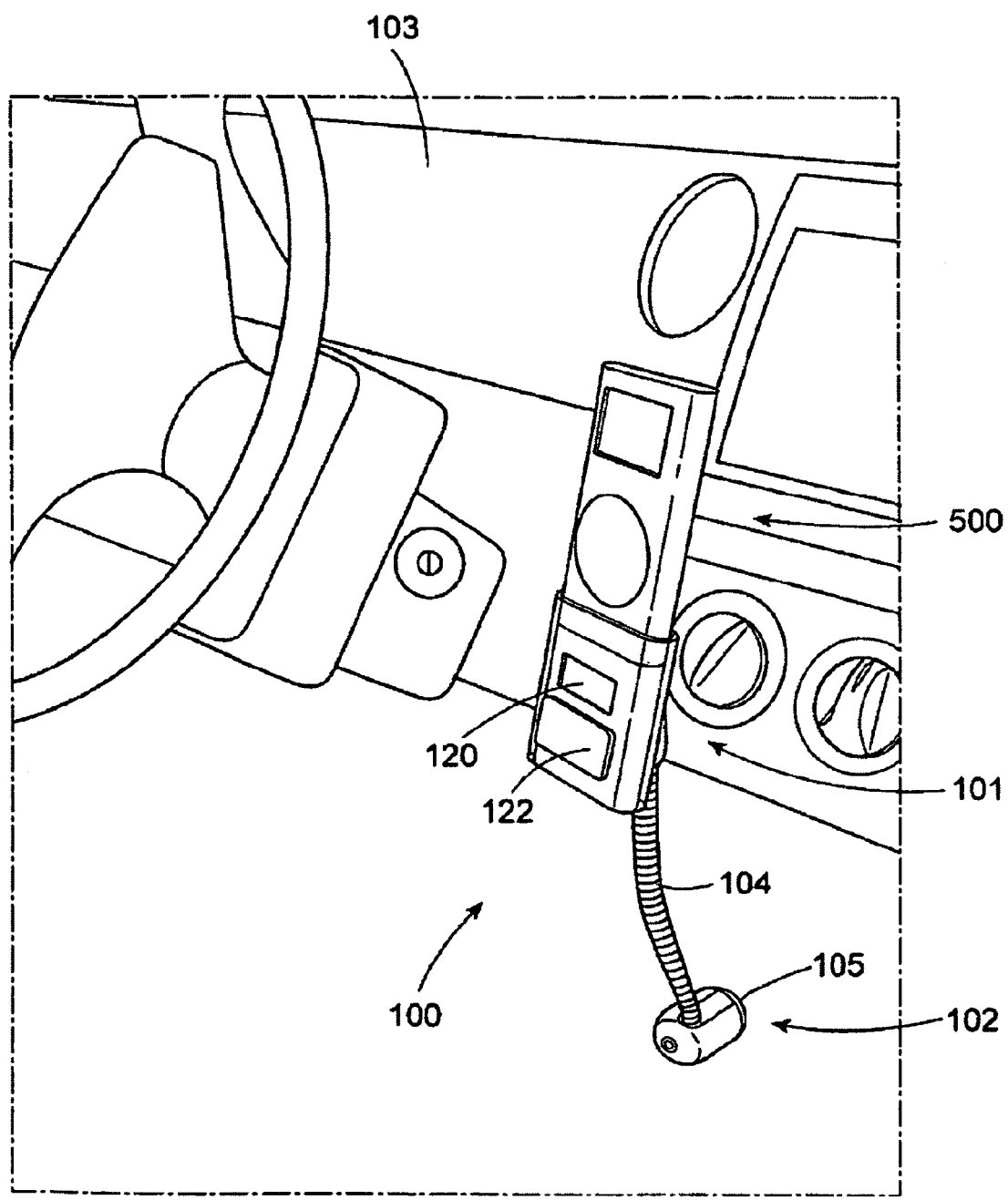
FIG. 1 shows a preferred embodiment situated in an automobile, with an electronic device, more specifically an MP3 player (iPod mini MP3 player), attached, which embodiment contains an FM transmitter (an RF transmitter) for converting the data (audio) signal from the MP3 player and broadcasting it via an antenna (in this case, a metallic gooseneck that is part of the unit) to the automobile's FM receiver.
Figure 2:
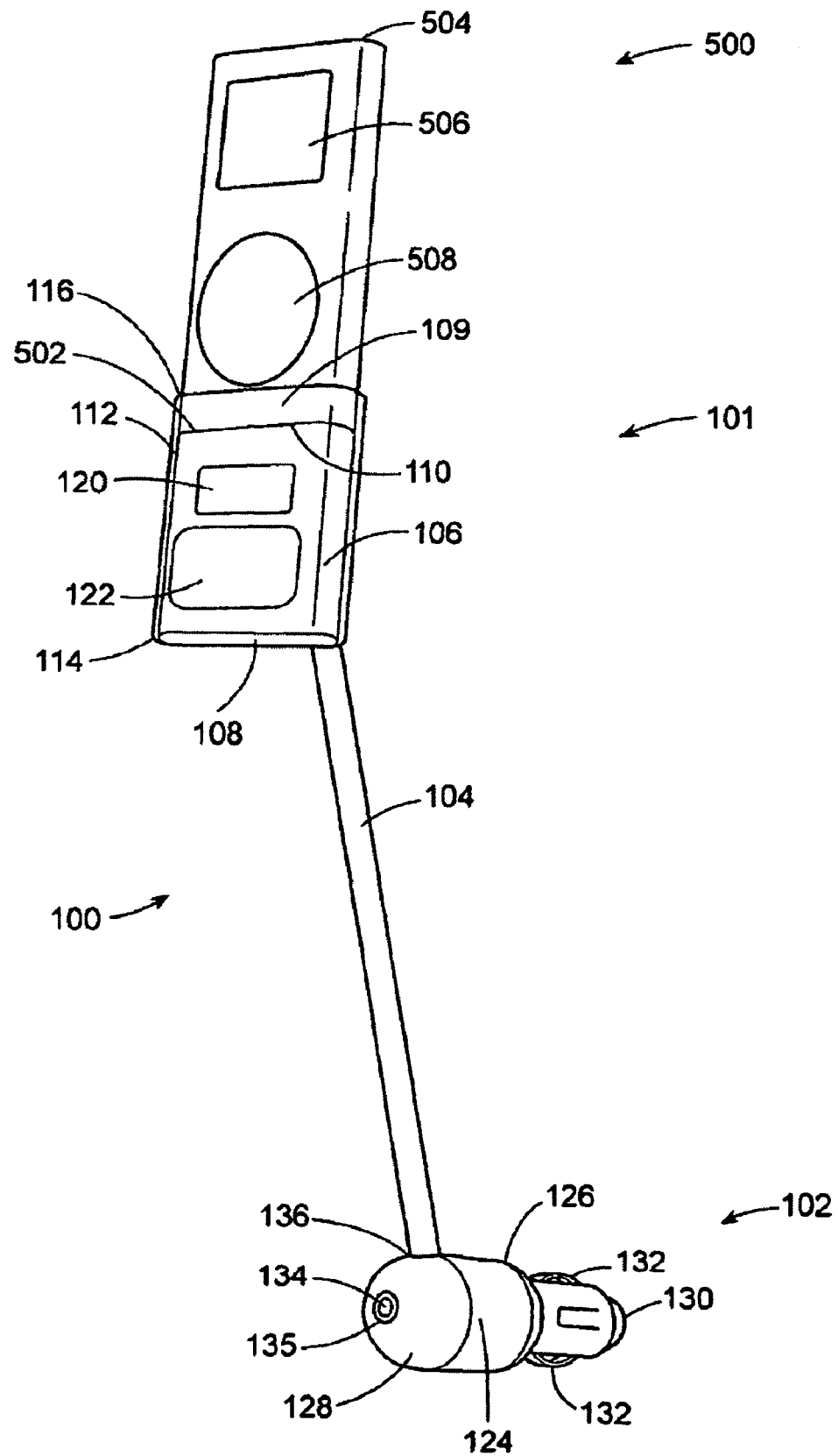
FIG. 2 is a front perspective representational view of the unit of FIG. 1, with an iPod mini MP3 player attached.
Figure 3:
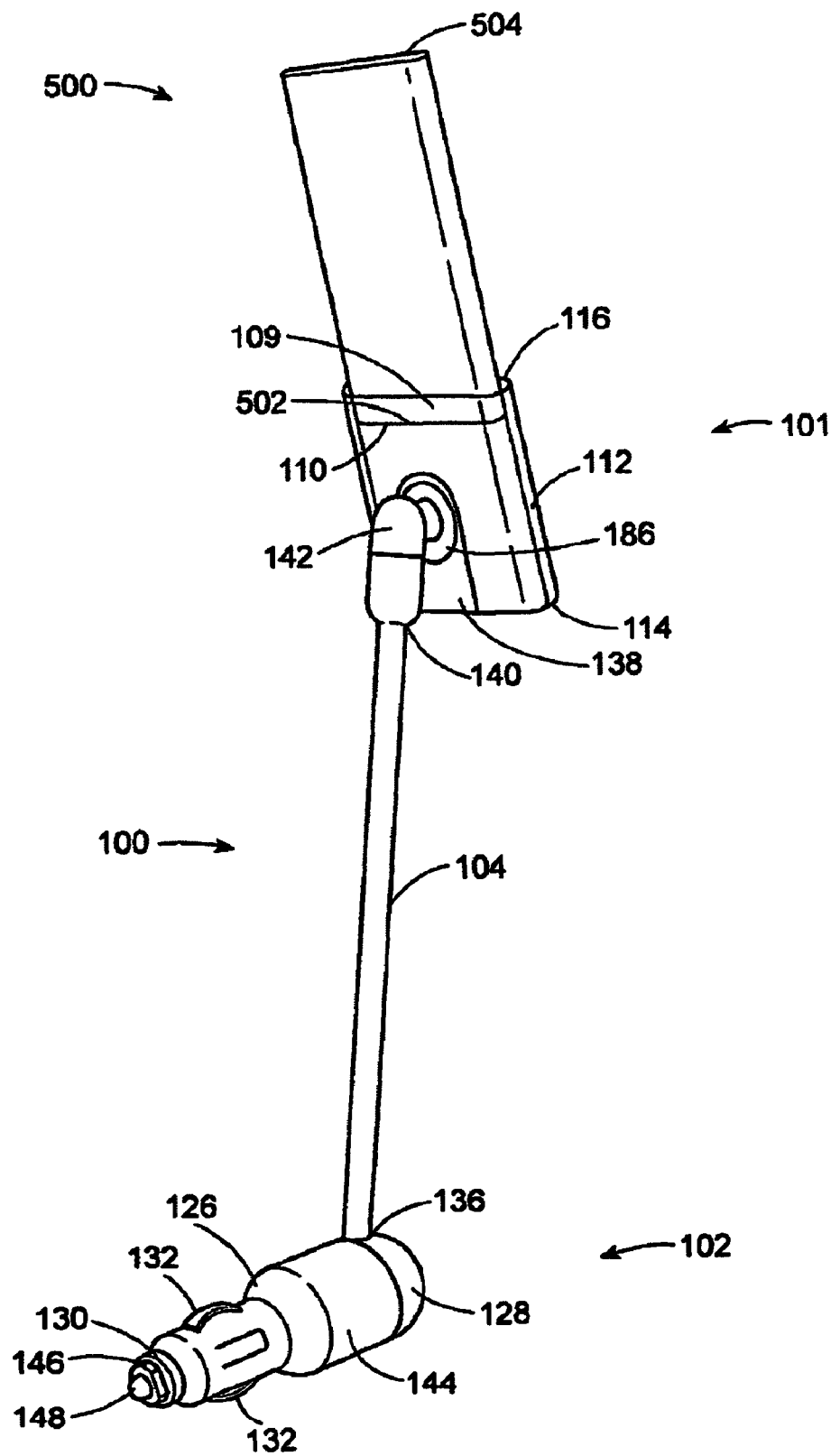
FIG. 3 is a back perspective view of the unit with an iPod mini MP3 player attached.

FIG. 1 shows one preferred embodiment of this invention located in a preferred environment (a vehicle, namely, a car). Thus, FIG. 1 shows cigarette lighter adapter-gooseneck-transmitter 100 (i.e., a holder, electrical supply, and RF transmitter unit) holding (supporting) iPod mini MP3 player 500 (i.e., an electronic device) just in front of automobile console 103. Cigarette lighter adapter-gooseneck-transmitter 100 comprises holder (support assembly) 101, gooseneck 104 (connector), and power acquisition sub-unit 102 (comprising a cigarette lighter adapter), which is plugged into cigarette lighter 105 (i.e., an external power source).

The term "cigarette lighter" is to be broadly understood and includes any power source, whether or not in a vehicle and whether or not customarily used or designed for lighting cigarettes. Similarly, the term "cigarette lighter adapter" is to be broadly understood and includes any member, device, etc.

at least a part of which mechanically mates with or fits into a "cigarette lighter" (as that term is to be broadly understood) and can draw power from it.

Although the power acquisition sub-unit is preferably removably coupled to the power source (e.g., cigarette lighter), the power acquisition sub-unit may in some cases be permanently affixed to the power source. For example, a driver of a vehicle who does not smoke may obtain a unit of this invention and hard-wire it into the cigarette lighter of the vehicle.

The term "removably coupled" and the like should be broadly understood and refer to one item (e.g., the power acquisition sub-unit, which may comprise a cigarette lighter adapter) being readily coupled to (e.g., by pushing) and readily uncoupled from (e.g., by pulling) another item (e.g., a power source, such as a vehicle's cigarette lighter). The absence of the word "removably," "removable," and the like near the word "coupled," "connected," and the like does not mean that the coupling, connection, etc. in question is or is not removable. For example, the recitation of a cigarette lighter adapter being coupled to a power source does not mean that the cigarette lighter adapter cannot be removed (readily or otherwise) from, or that it is permanently connected to, the power source. In another example, the recitation of side supports coupled to a cradle does not mean that the side supports cannot be removed from, or that they are permanently connected to, the cradle.

Broadly speaking, and as explained below, power from the cigarette lighter flows through the cigarette lighter adapter, through one or more conductors (not shown) inside gooseneck 104, and to holder 101. Some of the power entering the holder flows to the FM transmitter (discussed below), which is inside the holder, and some of the power flows to the iPod mini MP3 player, which is held by holder 101. A data signal flows from the iPod mini MP3 player to the FM transmitter, which processes the data to produce an FM signal (an RF signal). The gooseneck is made of metal, and the FM signal is sent to (electrically coupled to) the gooseneck, which functions as an antenna in addition to its functioning as a repositionable mechanical connection and support between holder 101 and power acquisition sub-unit 102.

Gooseneck 104 has been positioned (e.g., by bending) and holder 101 has been turned with respect to power acquisition sub-unit 104 so that the front of iPod mini MP3 player 500 is readily viewable by the driver of the vehicle. That permits the driver to read the information provided by liquid crystal display 120, such as the carrier (broadcast) frequency to which the FM transmitter is tuned, and also to read the information on button-covering membrane 122, which covers six pushbuttons. The membrane provides a neat appearance and keeps dirt from entering the pushbutton and other mechanisms inside the inner cavity of holder 101.

Although pushbuttons are used in this embodiment, any type of button can be used and the term "button" should be broadly understood to refer to any type of mechanism (with or without moving parts) whereby the user can input to the unit of this invention his or her data (for example, selection of a frequency), e.g., a mechanical pushbutton, an electrostatic pushbutton, an electrostatic array, or any other input device of any type.

Two of the six pushbuttons under the membrane are up-down frequency selection buttons, which allow the carrier frequency (on which the FM signal will be broadcast) to be adjusted up or down within the unit's range (e.g., 88.1 to 107.9 MHz), and four of which control pre-sets. Thus, a carrier frequency within the range may be selected by the vehicle's driver using the up-down buttons and then, if desired, one of the pre-sets can be semi-permanently set (programmed) to that carrier frequency (e.g., by depressing the desired one of the four dedicated pre-set buttons for a sufficient length of time, e.g., a few seconds). The FM transmitter will operate at the selected frequency whether or not a pre-set is programmed to correspond to that frequency. The pre-sets may be re-set at any time to any desired frequency within the allowed range. The FM (RF) receiver of the car's audio system is set in the usual way to the same frequency on which the transmitter is operating so that it receives the signal being broadcast by the unit of this invention.

The RF (radio frequency) spectrum is often considered to run from about 10 kHz (kilohertz) or below to about 100 GHz (gigahertz) or above, and the RF transmitter can utilize any appropriate frequency and/or any type of RF transmitter, including an AM (amplitude modulation) transmitter, an FM (frequency modulation) transmitter, a Bluetooth transmitter, or any other type of suitable RF transmitter. For a civilian vehicle (e.g., family car), either FM or AM frequencies and transmitters desirably will be used, with FM being preferred because of its superior sound quality as compared to AM.

The unit of an embodiment of this invention holds iPod mini MP3 player 500 tightly in position even though the iPod mini is held only at its bottom portion. The unit is easily adjustable (both electronically and mechanically), provides power and FM (RF) transmission capability, provides a strong FM (RF) signal (thereby improving the quality of the audio output), is sleek and aesthetically appealing, and allows easy repositioning of the holder with respect to the cigarette lighter adapter to accommodate a wide range of vehicles (which vary widely as to where their cigarette lighters are located and what other potentially spatially interfering members, e.g., gear shift levers, are nearby).

With reference now to FIGS. 2 through 8, 13, and 14, cigarette lighter adapter-gooseneck-transmitter unit 100 is again seen to comprise holder 101 (in which iPod mini MP3 player 500 is firmly held at its bottom portion), power acquisition sub-unit 102, and gooseneck (connector) 104. iPod mini MP3 player 500, which is not part of this invention, has bottom 502, top 504, liquid crystal display 506, and control wheel 508. Holder 101 comprises outer enclosure 112, which has bottom 114 and top 116, and inner enclosure ("clam shell"), which comprises front inner enclosure member 106 and back inner enclosure member 138. Outer enclosure 112 is a one-piece (unitary) member, which slips over front inner enclosure member 106 and back inner enclosure member 138 and holds them in close-fitting abutment. Front inner enclosure member 106 and back inner enclosure member 138 are not mirror images of one another. Thus, each of racetrack-shaped bottom 108 and top 110 is part of front inner enclosure member 106. Inner enclosure alignment and retention tabs 198 (along the top and bottom edges of back inner enclosure member 138), tabs 206 (along the back edge of top 110 of front inner enclosure member 106), and alignment slots 196 help maintain members 106 and 138 in proper registry with one another.

Figure 13:
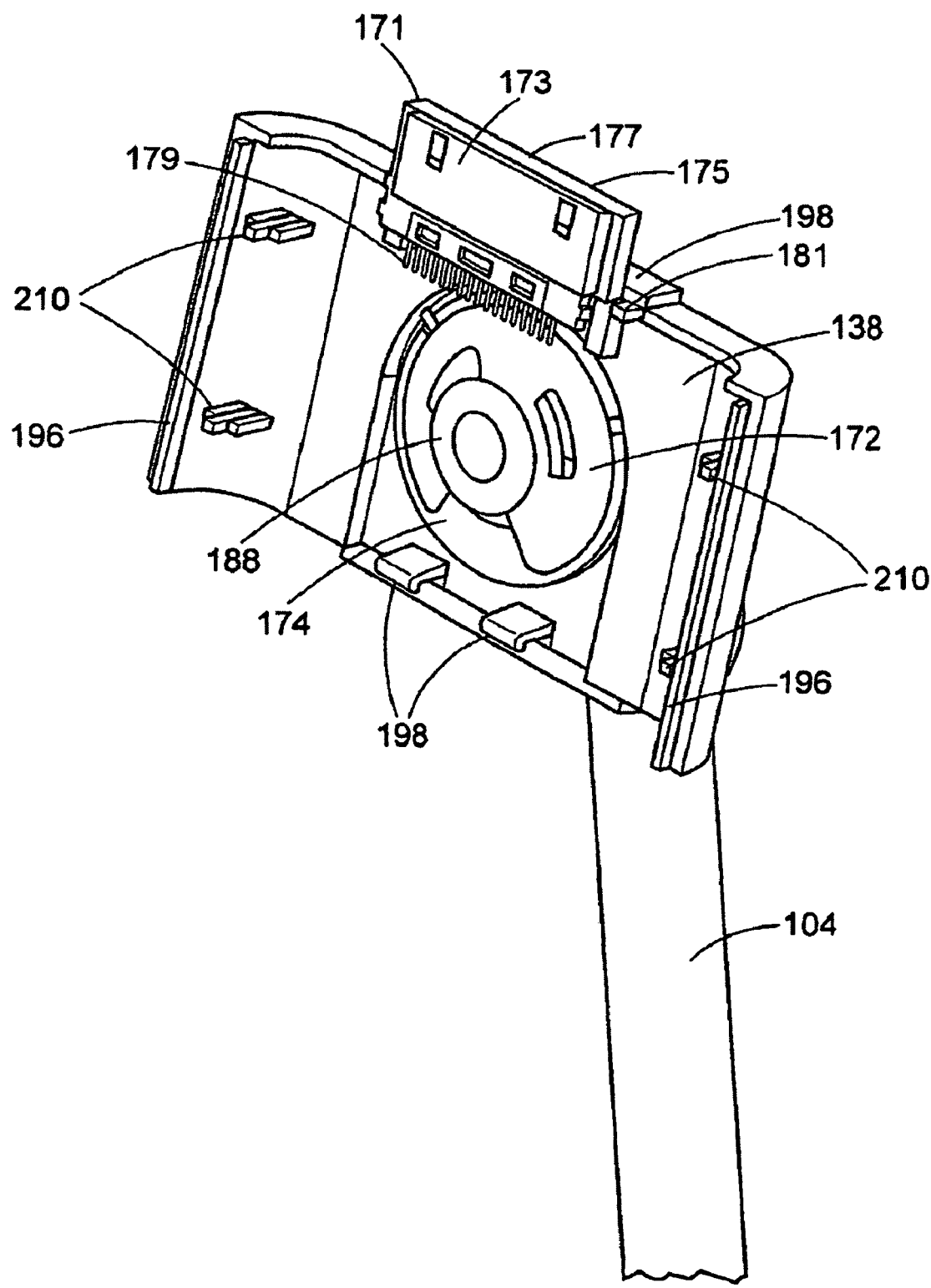
FIG. 13 is a perspective view of the back inner enclosure member of the support assembly (holder)
Figure 14:
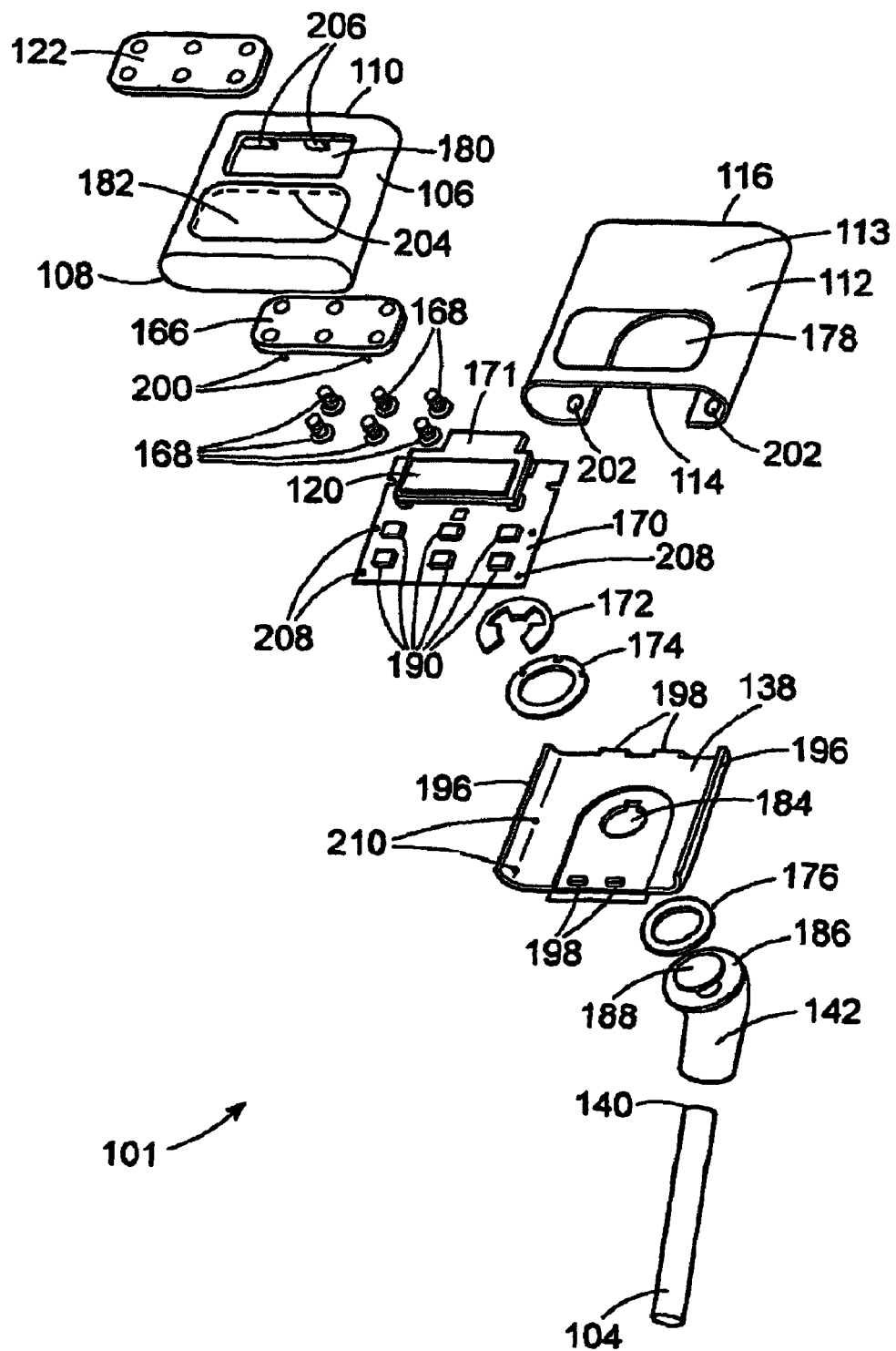
FIG. 14 is an exploded view of the support assembly (holder)
Figure 22:
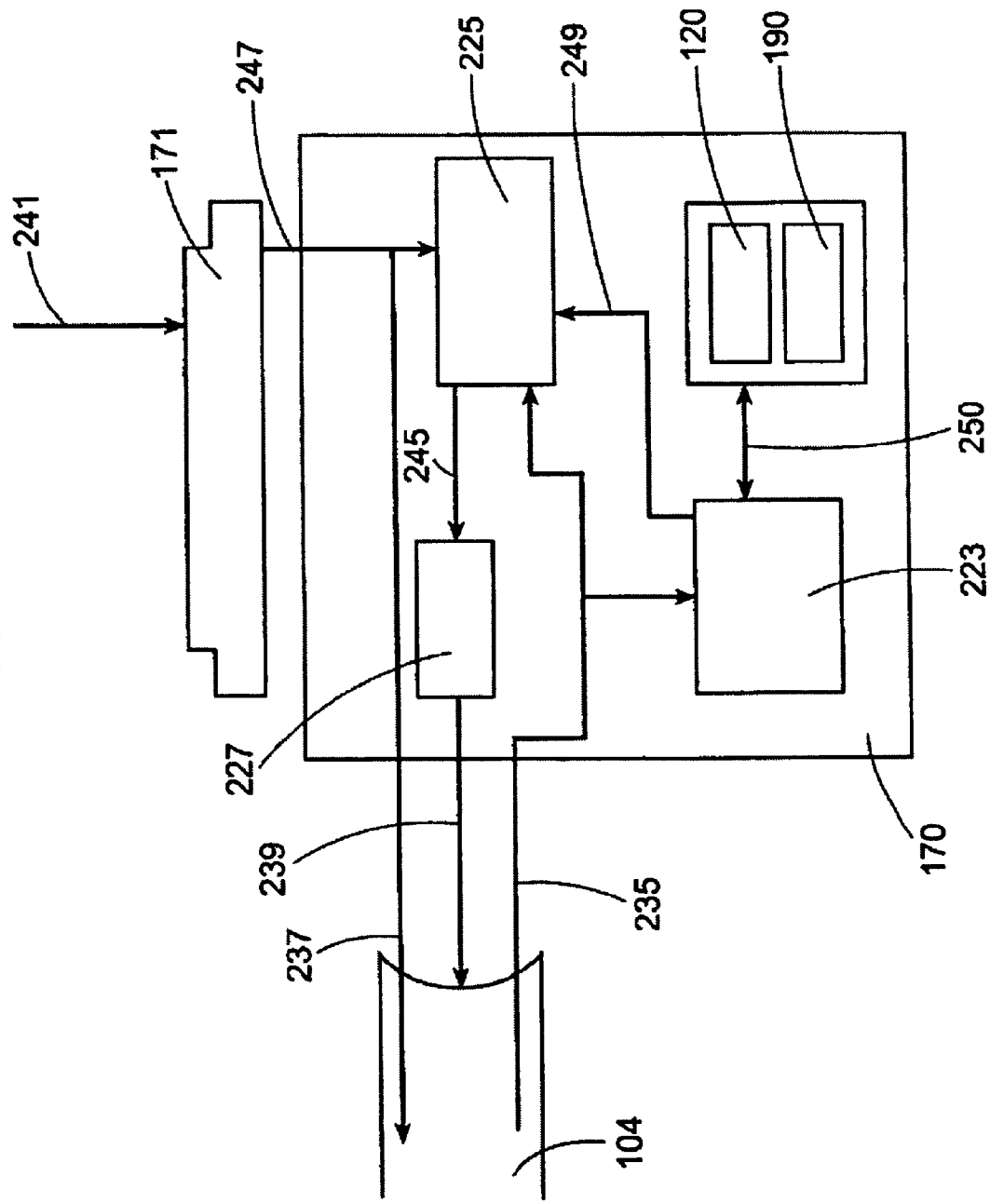
FIG. 22 is a block diagram of the holder (support assembly) and gooseneck antenna of the embodiment of FIG. 1.

As best appreciated from FIGS. 13 and 14, the two inner enclosure members 106 and 138 together define at least one inner cavity between them in which printed circuit board (PCB) 170 is held. Alignment pins 210 on the inside surface of back inner enclosure member 138 fit into printed circuit board slots 208 to fix the printed circuit board in position in the inner cavity. With reference briefly also to FIG. 22, printed circuit board 170 carries liquid crystal display 120, six momentary pushbutton switches 190, microprocessor 223, stereo modulator and FM transmitter circuitry 225, attenuation circuit 227, and 30-pin dock connector 171 (see also FIG.

12). As will be understood by one skilled in the art, microprocessor 223, stereo modulator and FM transmitter circuitry 225, and attenuation circuit 227 (the functioning of each of which is further described below) may be placed in any convenient location on printed circuit board 170.

Returning to FIG. 14, six pushbuttons 168 (the six pushbuttons described above for selecting the broadcast frequency) are held in proper registry above the six momentary pushbutton switches 190 by button frame 166. Button frame 166 is held in position with respect to the six momentary pushbutton switches by being held in opening 182 of front inner enclosure member 106. Member 106 is itself held in position with respect to back inner enclosure member 138, which carries printed circuit board 170 with momentary pushbutton switches 190, in the manner previously described. Button frame alignment pins 200 on the back face of button frame 166 snap into and are fixedly held in the spaces between button frame alignment and retention tabs 204.

Figure 4:
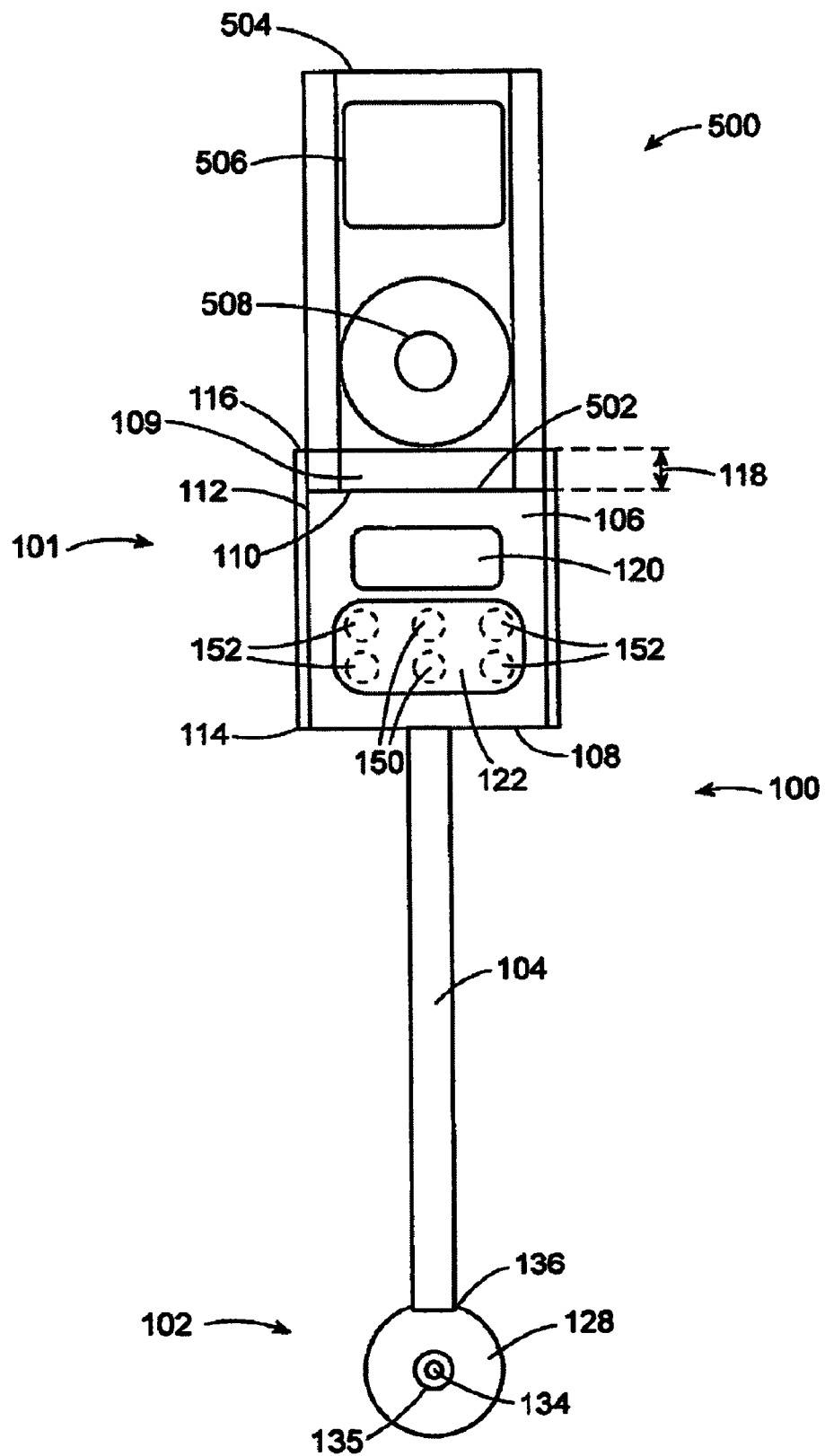
FIG. 4 is a front elevational view of the unit, with an iPod mini MP3 player attached.

Imperforate button-covering membrane 122, which is held in opening 182 in front inner enclosure member 106, overlies the six pushbuttons, thereby protecting them and their momentary pushbutton switches from dirt. Membrane 122 carries indicia 150 to indicate the function of the two up-down buttons and indicia 152 to indicate the function of the buttons that control the pre-sets (FIG. 4). Membrane 122 may be held in place by being affixed to button frame 166, e.g., by adhesive. The face of liquid crystal display 120 is visible through opening 180 in front inner enclosure member 106. Membrane 122 is flexible so that pushing the indicia for a button also pushes in the button beneath that indicia.

After printed circuit board 170 and its accompanying elements have been put in place in and on front and back inner closure members 106 and 138 and the two members 106 and 138 have been aligned and brought together, outer enclosure 112 is slid down over the inner enclosure assembly until outer enclosure alignment and locking slots 202 (at the bottom of the back of outer enclosure 112) interlock with two mating raised portions (not shown) on the bottom of the outer surface of back inner closure member 138, thereby locking the two inner members together and locking itself to the two inner members. In this locked assemblage of the three enclosure members (outer enclosure 112 and inner enclosure members 106 and 138), face 113 overlies liquid crystal display 120 and opening 178 coincides with button-covering membrane 122 (in opening 182), thereby protecting the face of liquid crystal display 120 and allowing the control pushbuttons to be pressed by the user to adjust the broadcast frequency.

As best seen in FIG. 4, in this embodiment, only the bottom portion of iPod mini MP3 player 500 is held in cavity 109. By "bottom portion" of an electronic device that can be held by an embodiment of this invention is meant the portion of the device running from (and including) the bottom of the electronic device toward the top of the electronic device and typically ending no higher than bottom of controls of the electronic device so that the ability to use the electronic device is not impaired. Typically, "bottom portion" means the lower 40% or less of the device, typically the lower 33% or less of the device, desirably the lower 25% or less of the device, and preferably the lower 20% or less of the device. For small electronic devices (e.g., Apple Computer's iPod mini MP3 player), the bottom portion will typically be the lower 30 millimeters or less of the device, desirably the lower 25 millimeters or less of the device (e.g., in the range of 5 to 25 millimeters), and preferably the lower 20 millimeters or less of the device (e.g., in the range of 6 to 20 millimeters). For the iPod mini MP3 player, the bottom portion is approximately the lower 9 millimeters.

Figure 12:
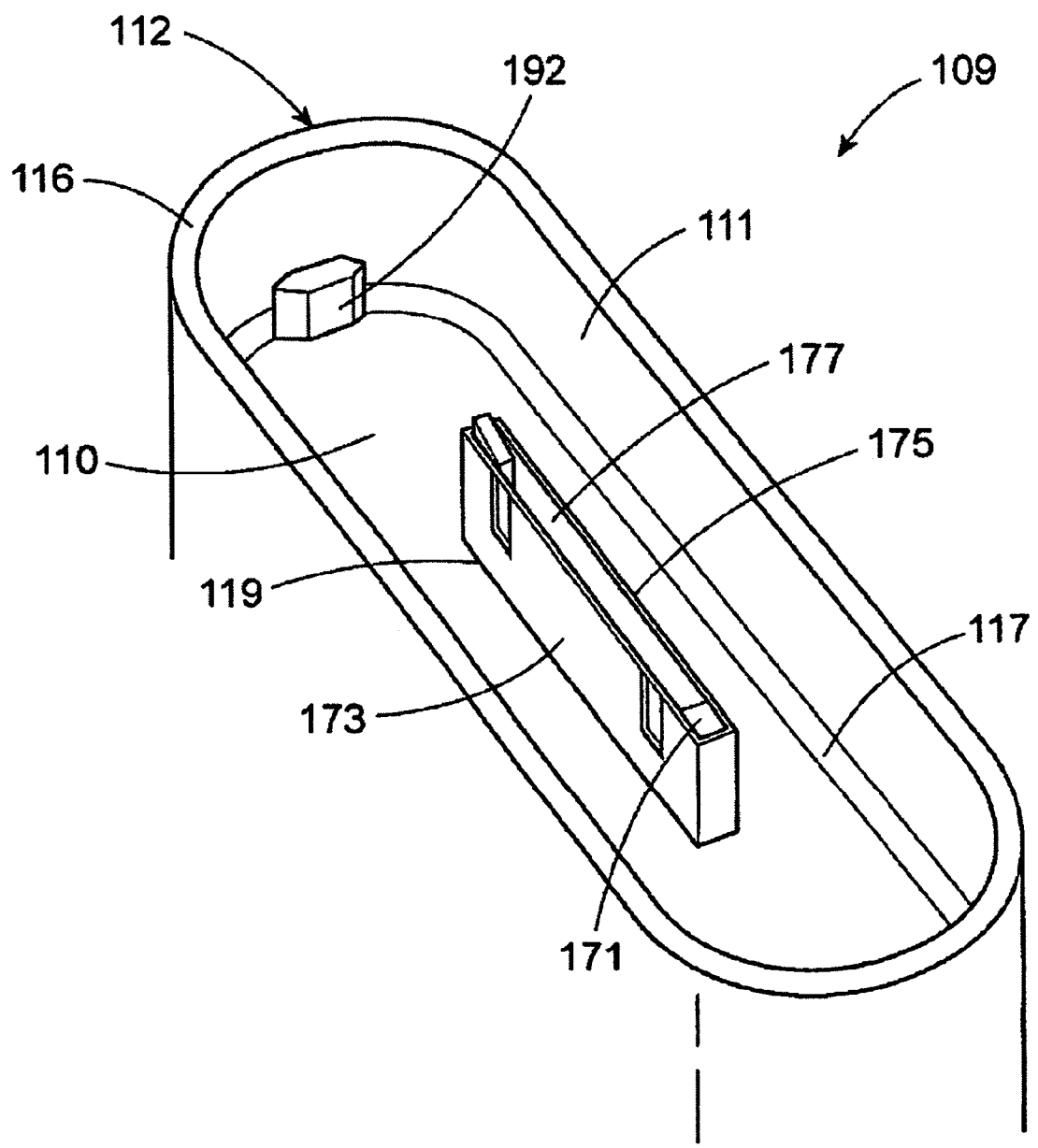
FIG. 12 is an enlarged partial view of the top, bottom wall, and sidewall of the unit's holder (support assembly), which receives the iPod mini MP3 player when the invention is in use (i.e., when the electronic device is in the holder)

Cavity 109 of holder 101 desirably has a height sufficient to tightly hold just the bottom portion of the electronic device. The bottom of cavity 109 is defined by top 110 of front inner enclosure member 106. Referring also to FIG. 12, sidewall 111 of cavity 109 is formed by that portion of outer enclosure 112 that extends above top 110, the sidewall extending from the bottom of cavity 109 to top 116 of outer enclosure 112 (the depth of cavity 109 being indicated by reference numeral 118). Thus, when iPod mini MP3 player 500 is pushed down into cavity 109 so that its bottom 502 contacts top 110, sidewall 111 of cavity 109 encircles and holds the bottom portion of iPod mini MP3 player 500.

Still referring to FIG. 12, outer enclosure 112 has ledge or rim 117, which runs around the inner surface of outer enclosure 112 near its top 116. Rim 117 fits into a dado (groove) that runs around the periphery of top 110 of front inner enclosure member 106 and that is essentially the same size (height and width) as rim 117. Rim 117 thus acts as a vertical stop member and helps keep the assemblage of the two inner enclosure members 106 and 138 from moving inside outer enclosure 112. Furthermore, in the locked assemblage of outer enclosure 112 and the two inner enclosure members 106 and 138, top 110 and rim 117 together constitute an even (constant height) bottom for cavity 109.

It will be understood by one skilled in the art that cavity 109 may be deeper (i.e., sidewall 111 may extend higher above the bottom of cavity 109) so as to provide more area to grip the electronic device that is placed into the cavity. For example, with reference to FIG. 2, top 116 could be higher up, e.g., up to or above control wheel 508, in which case a cut-out at the front of cavity 109 would desirably be provided so that control wheel 508 was sufficiently (preferably completely) accessible. It will also be understood by one skilled in the art that cavity 109 may completely contain the electronic device, that is, the cavity may be formed by members that run along the sides of the device and are connected by a top member to completely encircle the electronic device. Cavity 109 may have any size and shape desired, consistent with the size and shape of the electronic device and the environment in which the unit of an embodiment of this invention will be used to hold and supply power to the electronic device.

Although the cavity is desirably manufactured to provide as little distance as possible between the inner surface of the sidewall and the outer surface of the electronic device (so that the device will be firmly held in the cavity), as a practical matter, the cavity cannot be manufactured to provide a perfect fit under all conditions (e.g., with changes in ambient temperature) for several reasons, including variations in dimensions of both the cavity and the electronic device arising from manufacturing tolerances. Biasing members help avoid this problem.

Cavity 109 desirably is defined at least in part by biasing members (not shown) that help hold the electronic device in position. Any type of one or more biasing members may be used, e.g., deformable plastic and/or elastic materials (e.g., elastomers and plastomers), spring-biased members (for example, leaf springs, ball-in-socket detents), and the like. The biasing members may be located at any one or more convenient locations in the cavity, for example, along the sidewall. Biasing members help hold the device in position in the cavity by pushing against the device (even minimally), thereby forcing it towards another member that defines the cavity. Thus, placing a biasing member at the bottom of the cavity (which would push the electronic device upwards) would generally be counterproductive unless the cavity was defined at least in part by a top element against which the top of the device would be pushed by such a biasing member.

One preferred biasing member is a deformable crush bar, made, e.g., of plastic, on the inside of the sidewall (so that it faces the electronic device when it is in cavity 109) and arranged with its longitudinal axis lying vertically. Without crush bars or the like, dimensional variations arising from manufacturing tolerances (in the manufacture of the holder as well as of the electronic device) might result in there being too much distance between the cavity sidewall and the outer surface of the electronic device and, therefore, insufficient frictional engagement between the inner surface of the cavity and the outer surface of the electronic device.

In some possible embodiments for holding and supplying power to iPod mini MP3 player 500, two crush bars are used in cavity 109 of holder 101, arranged with the two crush bars symmetrically located on the rear straight portion of the inside of the sidewall, approximately 15 to 30 millimeters apart (the straight portion of each sidewall is approximately 40 millimeters long in a holder for iPod mini MP3 player 500) and with each crush bar measuring approximately 9 millimeters long (i.e., as long as the cavity is high), approximately 0.5 millimeters deep (the distance away from the sidewall towards the electronic device), and approximately 1 to 2 millimeters wide (the side-to-side distance). The crush bars are preferably sloped or chamfered so that they extend away from the rear inside wall their maximum depth (i.e., approximately 0.5 millimeters) at the bottom of the cavity and less than that (e.g., 0.1 millimeters or less) at the top of the cavity. In these embodiments, the two crush bars are desirably made integral with outer enclosure 112 by being molded as part of the outer enclosure (rather than being affixed to it after it has been made). Preferably, however, crush bars are not used.

With reference again to FIGS. 12 and 14, two alignment pins 192 (only one of which is shown) rise up from top 110 of front inner enclosure member 106, i.e., alignment pins are attached to and extend up away from the bottom of cavity 109. Alignment pins 192 fit into (i.e., mate with) corresponding concavities (not shown) in the bottom of iPod mini MP3 player 500. Dock connector 171, which is attached to printed circuit board 170 and has front wall 173, back wall 175, and receiving slot/receptacles 177 (for the pins of the multi-pin connector of the iPod mini MP3 player), passes through opening 119 in top 110 of front inner enclosure member 106. Dock connector 171 is mechanically coupled to back inner enclosure member 138 and aligned by means of alignment tabs 181 (FIG. 13) as well as being coupled to printed circuit board 170, which is coupled to back inner enclosure member 138 by alignment pins 210.

The dock connector mates with a corresponding concavity in the iPod mini MP3 player in which a multi-pin connector (i.e., a 30-pin connector, which is not shown) is located, and the slots/receptacles of the dock connector receive and mate with the pins of the pin connector. Electrical signals, as power and/or data, flow from and to the electronic device in cavity 109 through the multi-pin connector and dock connector when the electronic device is being held in the cavity. The receptacles in dock connector 171 are electrically coupled to pins 179 on its bottom side, which pins extend into the inner cavity (FIG. 13). At least some of those pins are directly or indirectly electrically coupled to printed circuit board 170 inside holder 101 for carrying electrical signals, as power and/or data, between the electronic device and the unit of this invention.

Because the multi-pin connector is recessed in the bottom of the iPod mini MP3 player 500 and the opening to that concavity is not much larger in cross-section than the portion of dock connector 171 that extends above top 110 and has the same cross-sectional shape (FIG. 12), dock connector 171 when in that concavity also helps hold iPod mini MP3 player 500 firmly in cavity 109 of holder 101. Thus, iPod mini MP3 player 500 is held in the holder by the mechanical and frictional engagement of the MP3 player's outer surface with the inner surface of cavity 109 (including the preferred crush bars), by the engagement of alignment pins 192 with mating concavities in the bottom of the MP3 player, by the engagement of dock connector 171 with the mating concavity for the multi-pin connector in the bottom of the MP3 player, and by the engagement of the pins of the multi-pin connector of the MP3 player with the mating receptacles of the dock connector.

As will be understood by one skilled in the art, any suitable number of alignment pins or other protuberances (or recesses that mate with protuberances of the electronic device) may be used to help hold the electronic device in the holder, and they may have any suitable size, shape, and location. There will usually be at least one protuberance in the cavity, namely, an electrical connector for the flow of power and/or data signals between the unit of this invention and the electronic device held by it. Other protuberances (e.g., alignment pins) may also be used, depending on the availability, location, size, and shape of recesses in the electronic device. Although protuberances that help hold the electronic device in the holder will typically be in the cavity of the holder at the bottom, one or more such protuberances may be on the electronic device and/or may be in the cavity of the holder at a location other than the bottom. Thus, if a holder is designed to completely encircle the electronic device when it is being held, the holder may have a partial or complete back wall and one or more of the protuberances (or recesses) may be located on the back wall.

In the preferred embodiment of FIG. 1 et seq., the holder has the following approximate dimensions. The outer enclosure is 6.3 centimeters high, 5.6 centimeters wide (the tangent-to-tangent distance from the outside surface of one curved end of the racetrack cross-sectional area of the holder to the outside surface of the other curved end), and 1.8 centimeters deep (the distance between the outer surfaces of the front and back of the holder). The outer enclosure is made of clear plastic approximately 1.5 millimeters thick. The assemblage of the front and back inner enclosures 106 and 138 is approximately 5.4 centimeters high, 5.3 centimeters wide (the tangent-to-tangent distance from the outside surface of one curved end of the racetrack cross-sectional area of the assemblage to the outside surface of the other curved end), and 1.5 centimeters deep (the distance between the outer surfaces of the front and back of the assemblage). The inner enclosure members are made of colored plastic approximately 1.5 centimeters thick, although various tabs, walls defining alignment holes, etc. may be of different thicknesses. Rim 117 (see FIG. 12) is located on the inner surface of outer enclosure 112, about 9 millimeters below its top edge 116. Rim 117 is approximately 1 millimeter wide and approximately 1 millimeter thick, and there is a corresponding mating grove running around the periphery of the assemblage of the two inner enclosure members. Alignment pins 192 are generally rectangular solids, approximately 4 millimeters long, 2 millimeters wide, and 3 millimeters high, rising from top 110 of front inner enclosure member 106 and spaced about 1 millimeter from its periphery. Opening 180 for liquid crystal display 120 is approximately 3.1 centimeters long and 1.4 centimeters high, and openings 178 and 182 for button-covering membrane 122 are each approximately 4.1 centimeters long and 2.1 centimeters high.

The holder may be made of any sufficiently hard formable material (desirably scratch-resistant and sufficiently rigid), although plastic, particularly engineering plastic, will usually be employed (except for those parts that must be made of another material, e.g., the conductive portions, such as the electrodes). One preferred material is polycarbonate, which is available from GE Plastics, Pittsfield, Mass., US, under the name Lexan.

As shown in FIGS. 2 through 8, unit 101 also comprises connector 104, which mechanically and electrically connects holder 101 to power acquisition sub-unit 102 (further described below). Connector 104 desirably comprises a gooseneck and in preferred embodiments is made of metal so that it can be used as a broadcast antenna by the RF transmitter.

With reference also to FIGS. 13 and 14, connector 104 is coupled to holder 101 through swivel connector 142, which comprises swivel connector flange 186 and hollow protrusion 188. Both flange 186 and protrusion 188 are circular, but flange 186 is of larger diameter than protrusion 188. Protrusion 188 has a peripheral circular groove next to its end face, with flange 186 lying against the rear outer surface of back inner enclosure member 138 when assembled. In the assembled unit, protrusion 188 passes through the central circular opening of friction washer 176 (which lies between flange 186 and the rear outer surface of back inner enclosure member 138), through circular opening 184 of member 138, and then through the central circular opening of washer 174 (which lies against the inner surface of back inner enclosure member 138). Retaining ring 172, which presses against, frictionally engages, and moves with washer 174, is snapped (friction fit) into the peripheral circular groove, thereby locking protrusion 188 inside the inner cavity formed when front and rear inner enclosure members 106 and 138 are joined together. Retaining ring 172 is free to revolve around protrusion 188 because the retaining ring is free to move along the circumference of the groove. Accordingly, back inner housing member 138, which presses tightly against washer 174, which in turn presses tightly against retaining ring 172, is free to rotate 360 degrees around protrusion 188.

Figure 5:
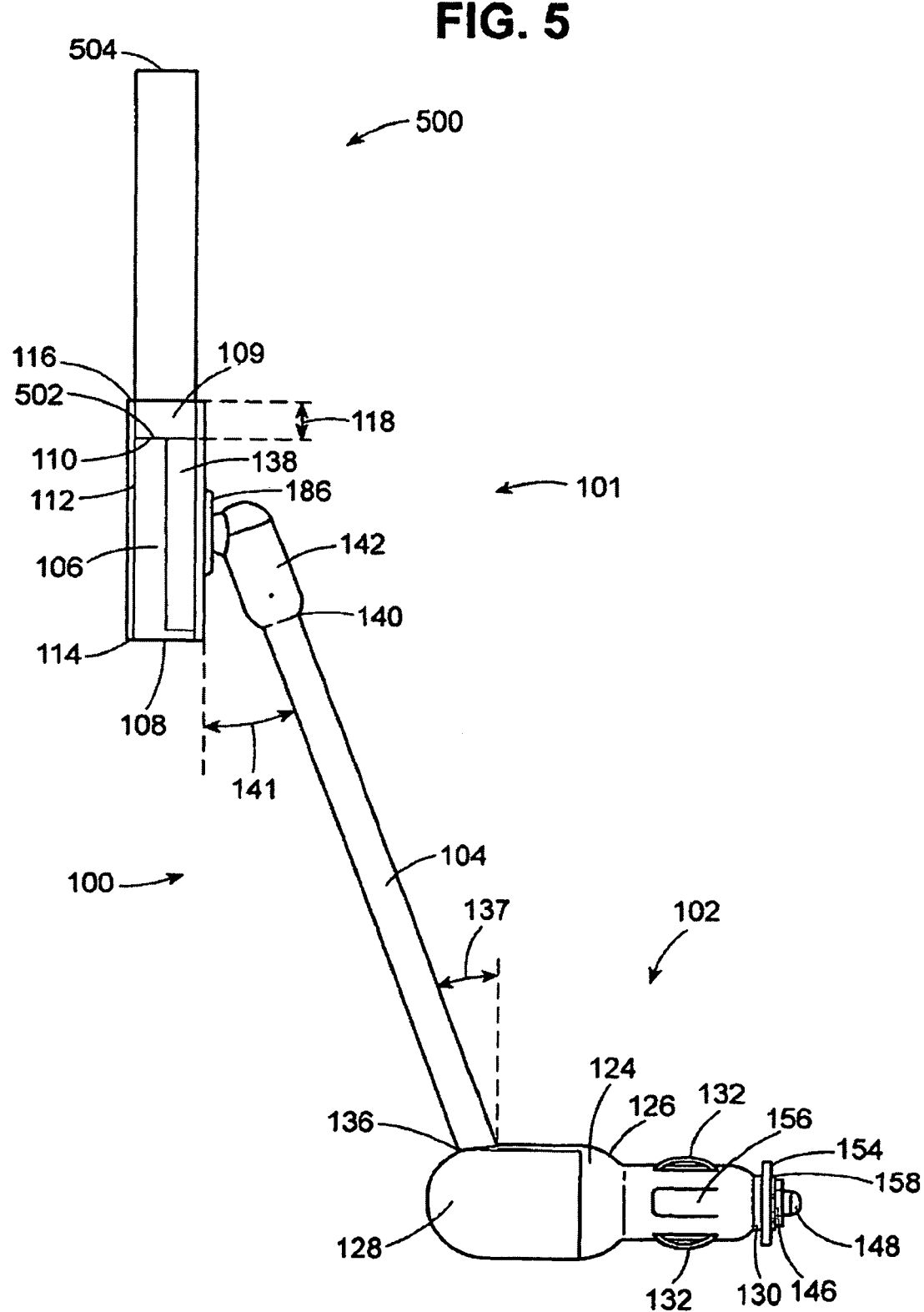
FIG. 5 is a right-side elevational view of the unit, with an iPod mini MP3 player attached.
Figure 6:
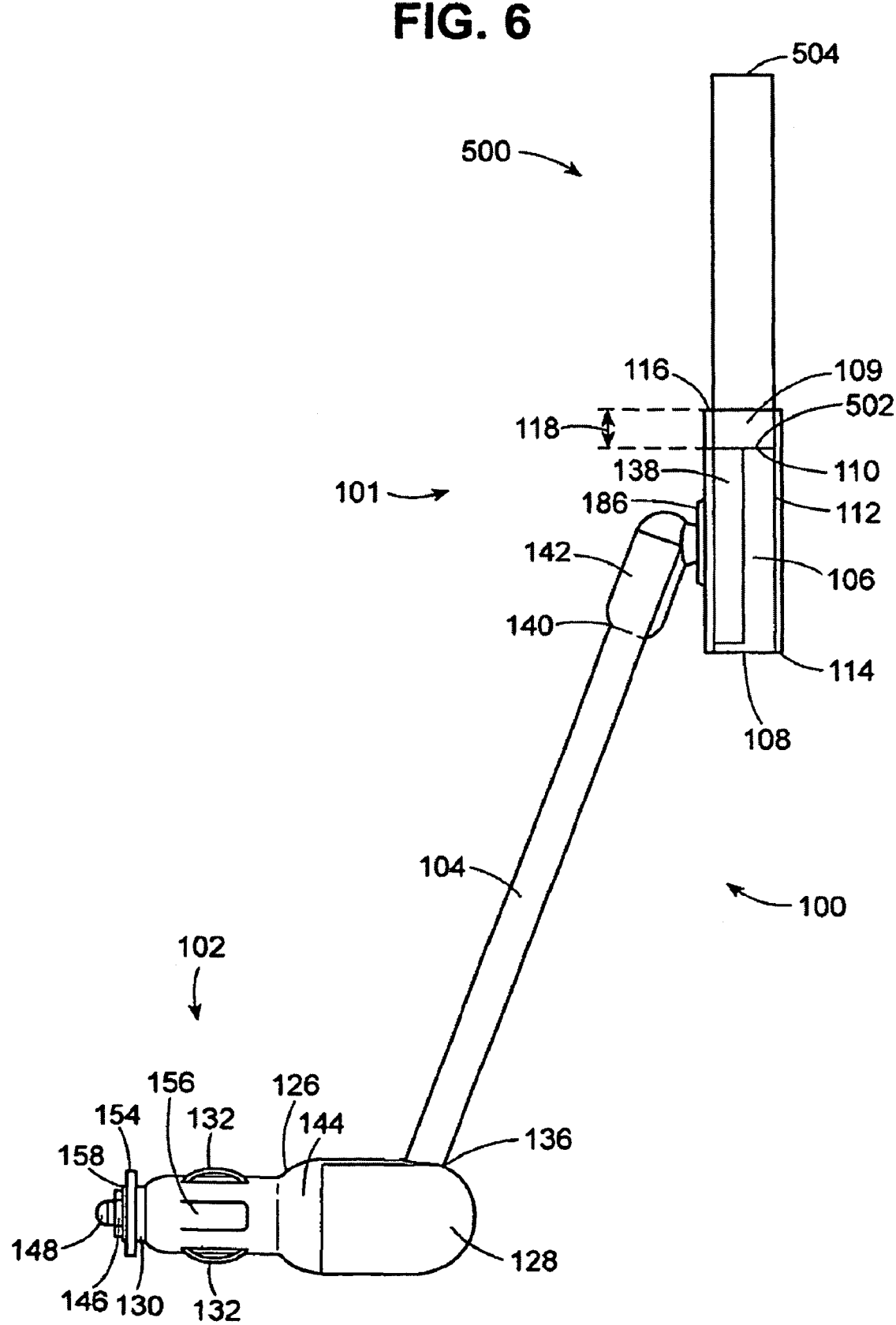
FIG. 6 is a left-side elevational view of the unit, with an iPod mini MP3 player attached.
Figure 7:
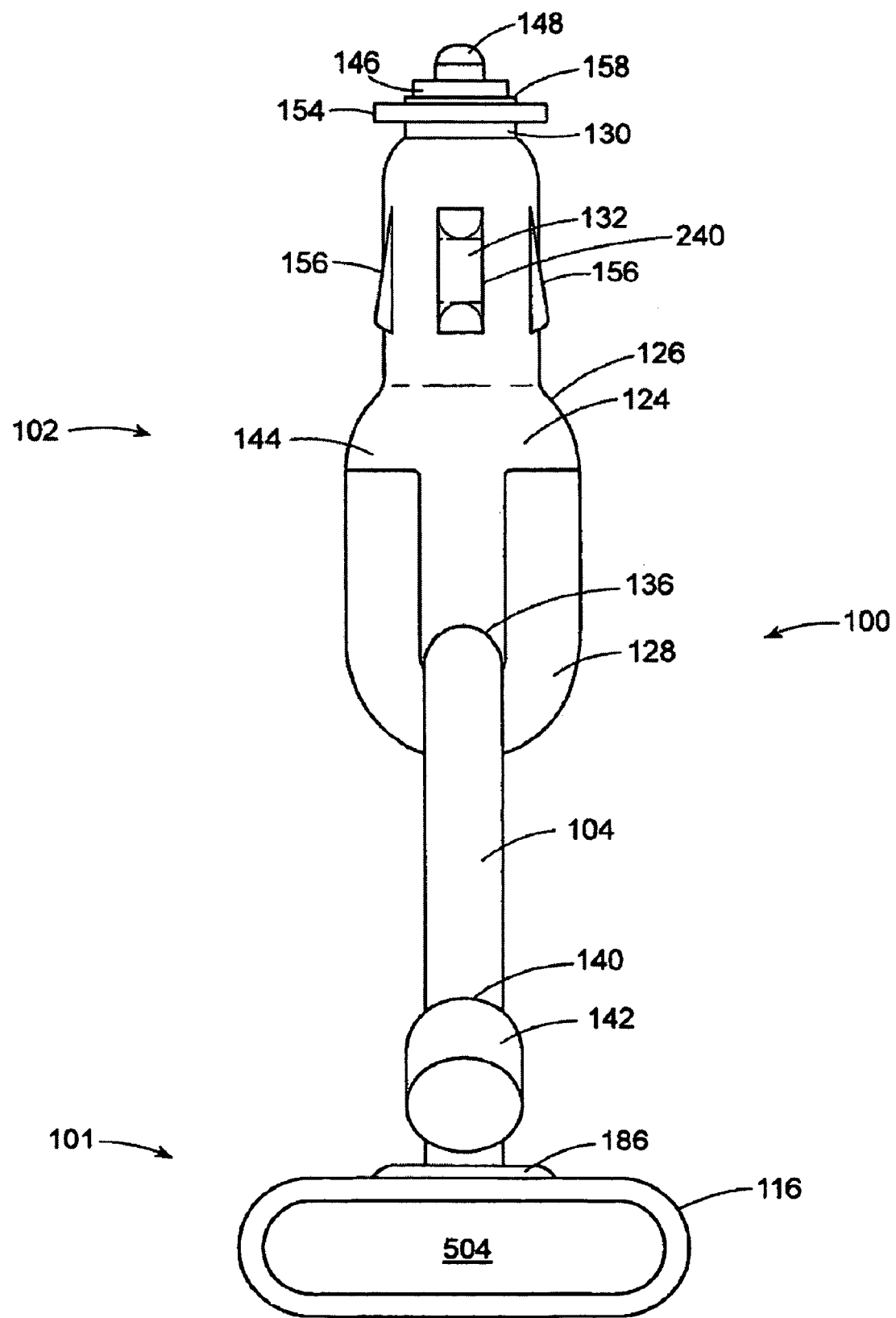
FIG. 7 is a top view of the unit, with an iPod mini MP3 player attached.
Figure 8:
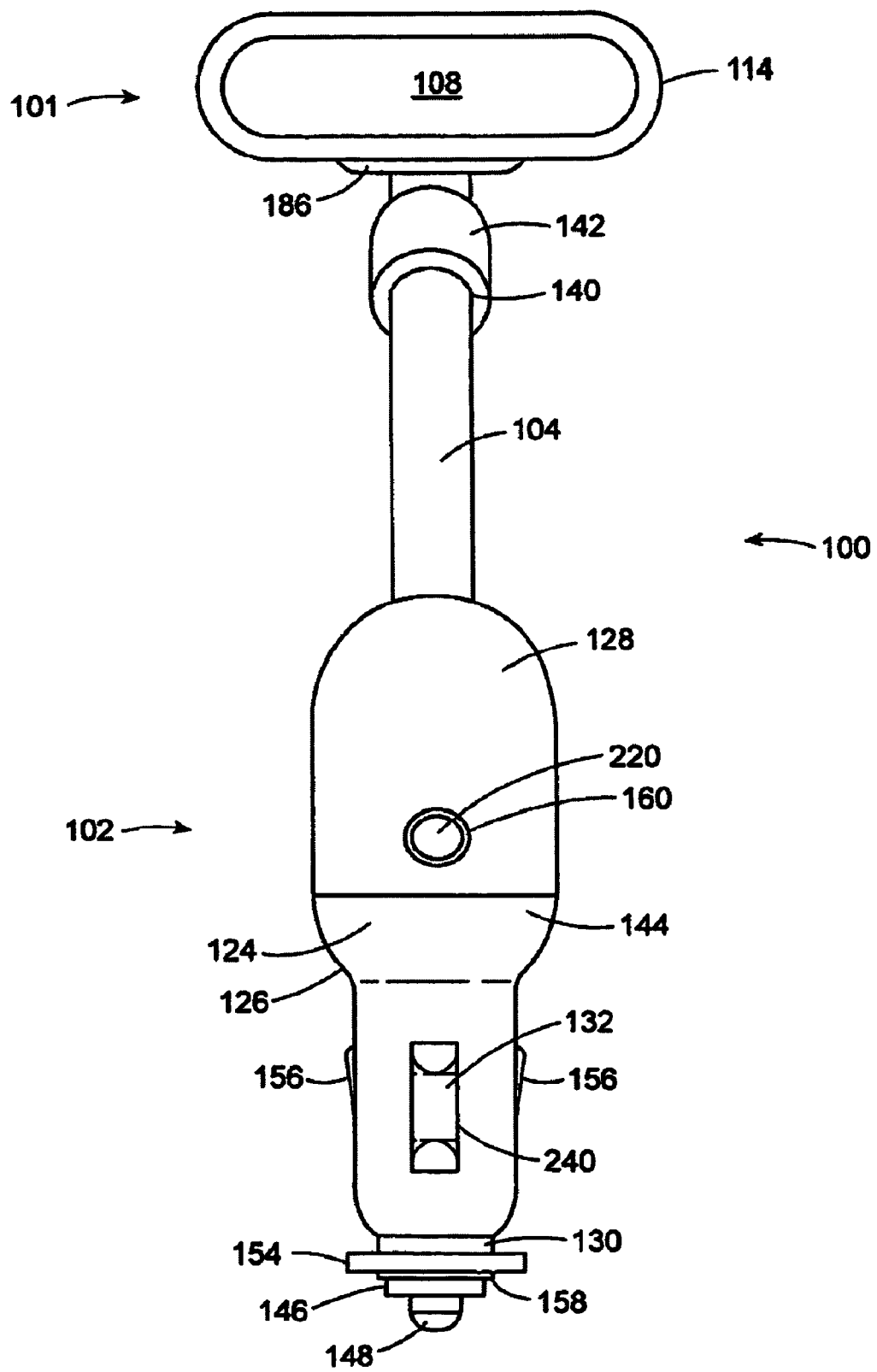
FIG. 8 is a bottom view of the unit, with an iPod mini MP3 player attached.

Swivel connector 142 and connector 104 are hollow, thereby allowing electrical wires to be run through them, e.g., from power acquisition sub-unit 102 up to holder 101. Swivel connector 142 is attached to top 140 of connector 104 by any suitable means, e.g., press fitting, screws, adhesive, swaging, or any combination thereof. As best seen in FIG. 5, swivel connector 142 is desirably at an angle 141 (preferably fixed) of approximately 20 degrees to the back of holder 101, although smaller or larger angles may be used in some cases. That angle facilitates positioning the holder (and, therefore, the electronic device) away from the knobs, levers, etc. that are typically on or near the console of a vehicle.

Connector 104 is preferably a gooseneck, which is compliant (or obedient) flexible tubing, and is preferably metallic or metal covered with, e.g., plastic or elastic material on its outside. A gooseneck may be considered to be a coiled layered construction in which adjacent coils overlap but can be moved with respect to each other (in a sense, slide on each other). The gooseneck tends to hold the position into which it is bent (i.e., it is semi-permanently adjustable or repositionable), unless it is bent beyond its limit. The two "layers" of the gooseneck may be considered to have different thicknesses. Thus, the gooseneck has two outer diameters, the outer diameter of the thicker layer, and the outer diameter of the thinner layer, which alternate in the gooseneck. In the preferred embodiment of FIG. 1 et seq., the metallic gooseneck is approximately 19.5 centimeters long, its larger outer diameter is approximately 9 millimeters, its smaller outer diameter is approximately 8.2 millimeters, its inner diameter is approximately 4.5 millimeters, the center-to-center spacing between the larger diameter portions is approximately 3.5 millimeters, the longitudinal gap between the larger diameter portions is approximately 1 millimeter, and the material of construction is steel.

The gooseneck must not be so stiff that it cannot be readily repositioned by the user; however, it must be stiff enough to maintain the holder (containing the electronic device) in position with respect to the power acquisition sub-unit after the holder and gooseneck have been put into their desired position. The gooseneck is stiff enough so that a 19.5 centimeter-long section (the length of the gooseneck in the preferred unit for holding an iPod mini MP3 player) when oriented horizontally and fixed at one end can hold a mass of just under about 436 to 486 grams at the other end before deflecting downwardly, i.e., before gravity pulls that weighted end down, away from the horizontal. For comparison, the preferred holder having an FM transmitter inside and holding an iPod mini MP3 player has a total mass of about 200 grams. Thus, the preferred unit has a design safety factor with respect to gooseneck deflection of about 100% (200 grams compared to a minimum deflection-causing mass of about 436 grams).

Goosenecks that can be used in some preferred embodiments of this invention are available in varying dimensions (e.g., outer diameters of 2 millimeter or less to over 16 millimeters). One skilled in the art will know the gooseneck design, dimensions, and materials of construction to select for any particular usage based on the desired length of connector 104, the weight of holder 101 and the electronic device to be held in it, whether the gooseneck is to function as a broadcast antenna and, if so, for what range of radio frequencies.

Figure 15:
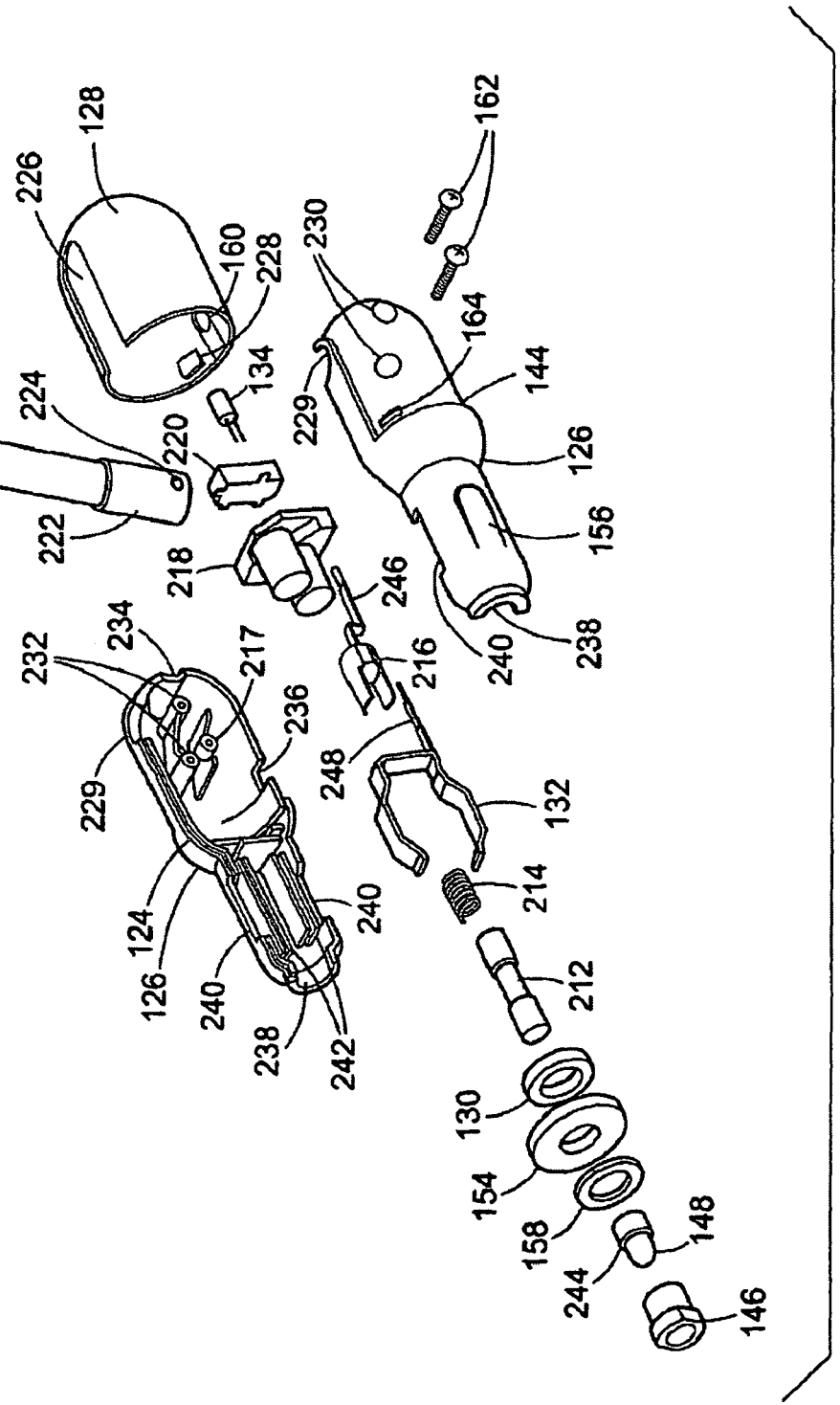
FIG. 15 is an exploded view of the cigarette lighter adapter.
Figure 16:
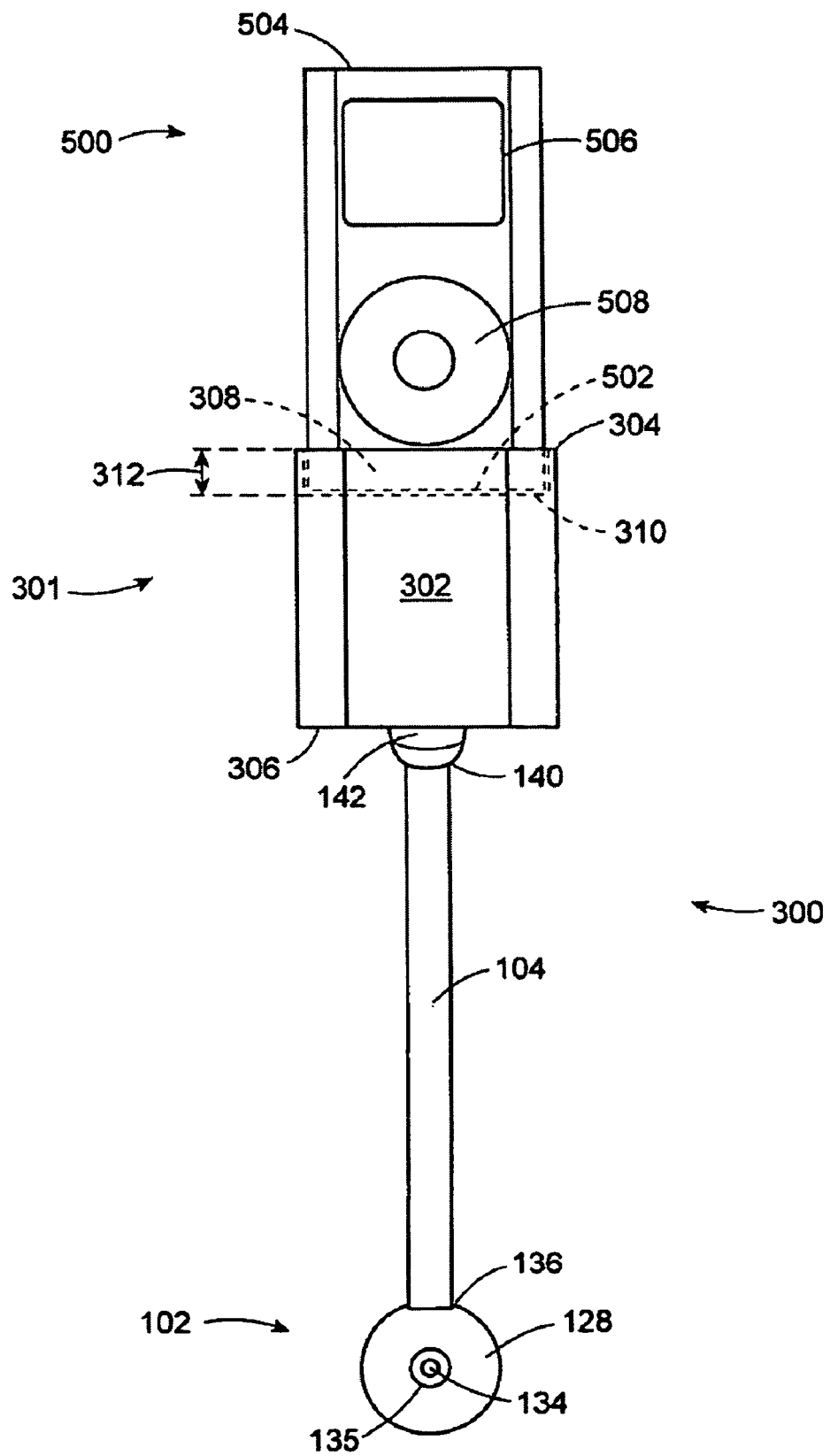
FIG. 16 is a front elevational view of a second preferred embodiment, with an iPod mini MP3 player attached, which embodiment supplies power to the iPod mini MP3 player but does not contain an FM transmitter, the audio output being available, e.g., via a jack in the cigarette lighter adapter.
Figure 17:
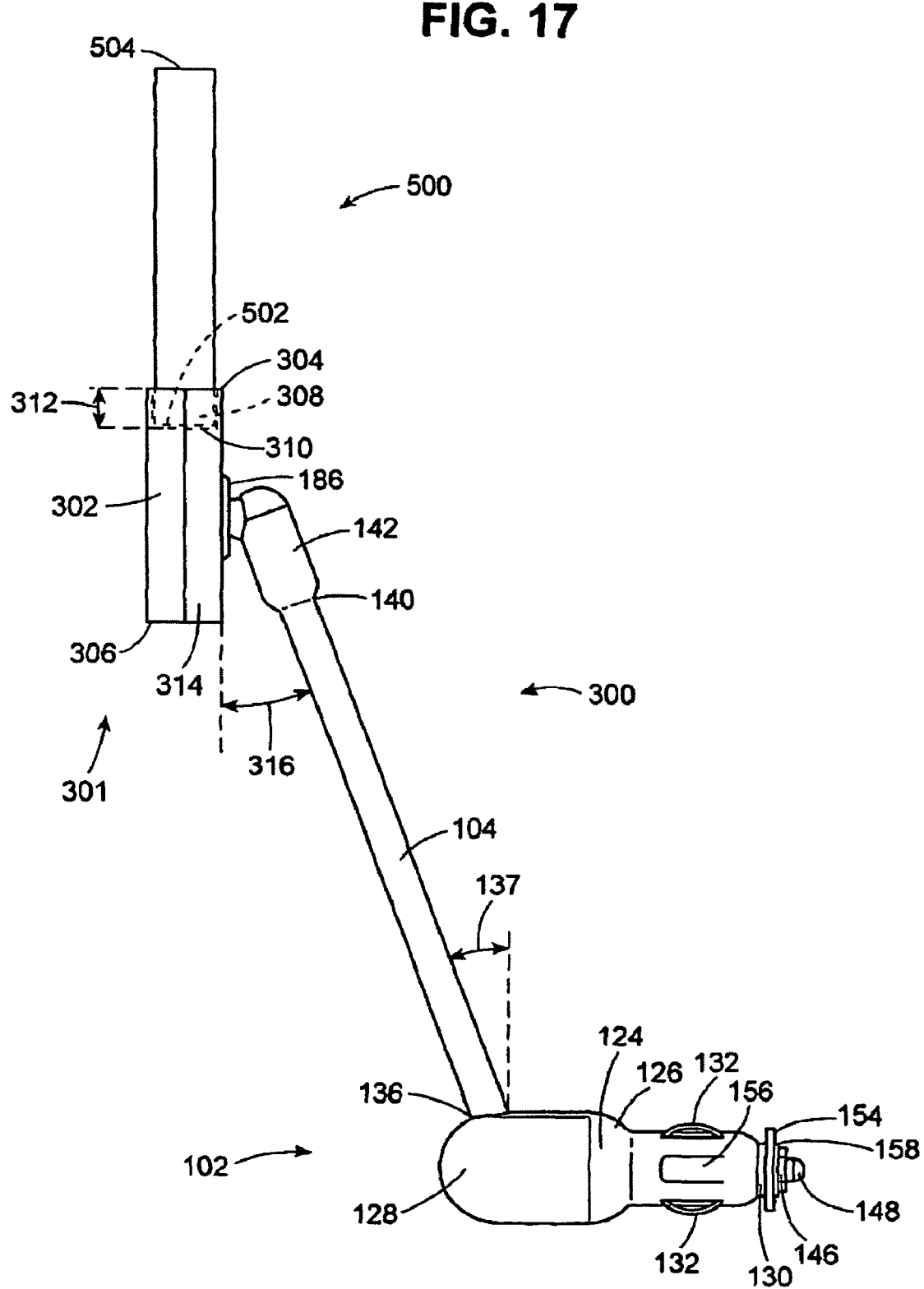
FIG. 17 is a right-side elevational view of the unit of FIG. 16, with an iPod mini MP3 player attached.
Figure 18:
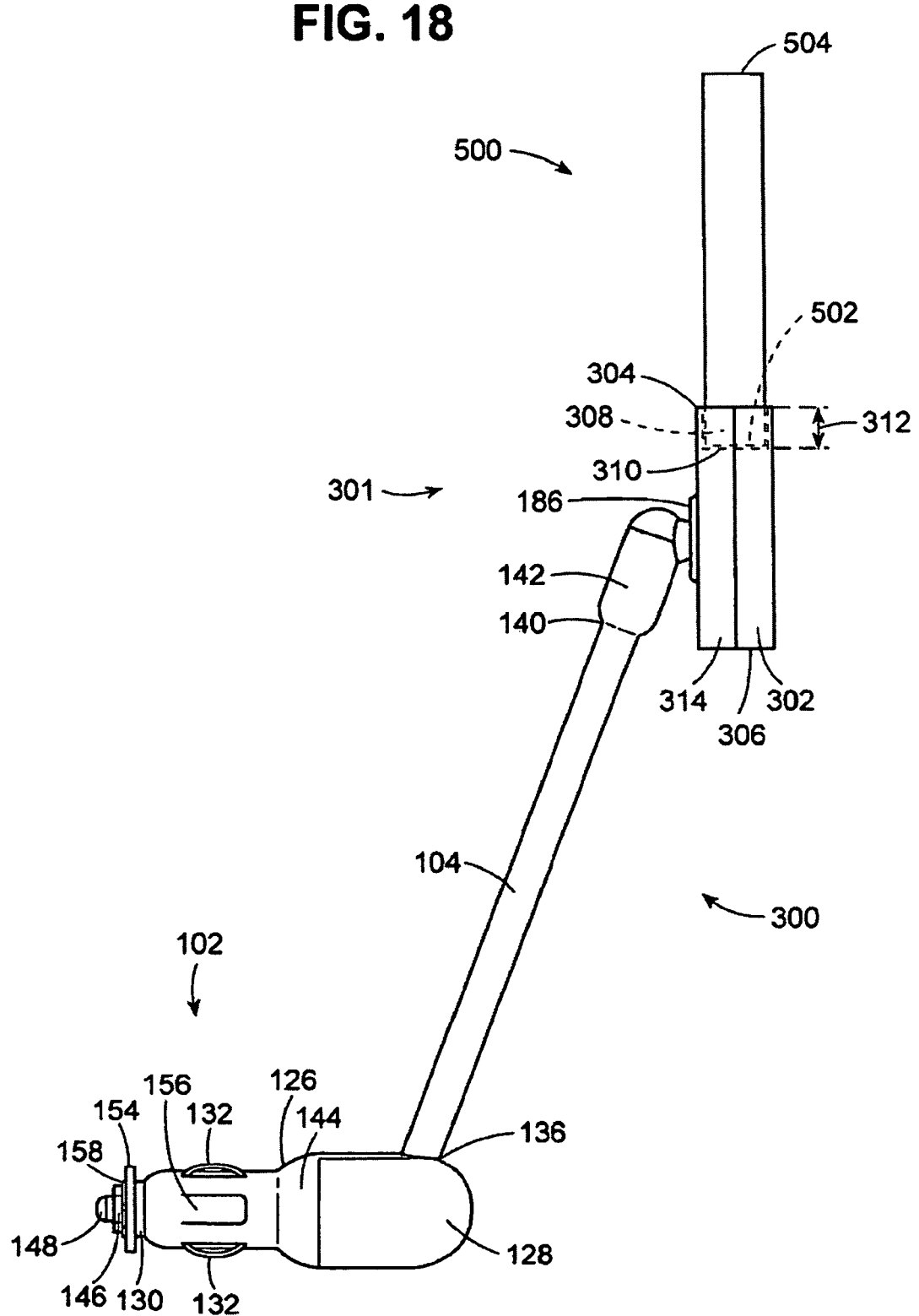
FIG. 18 is a left-side elevational view of the unit of FIG. 16, with an iPod mini MP3 player attached.
Figure 19:
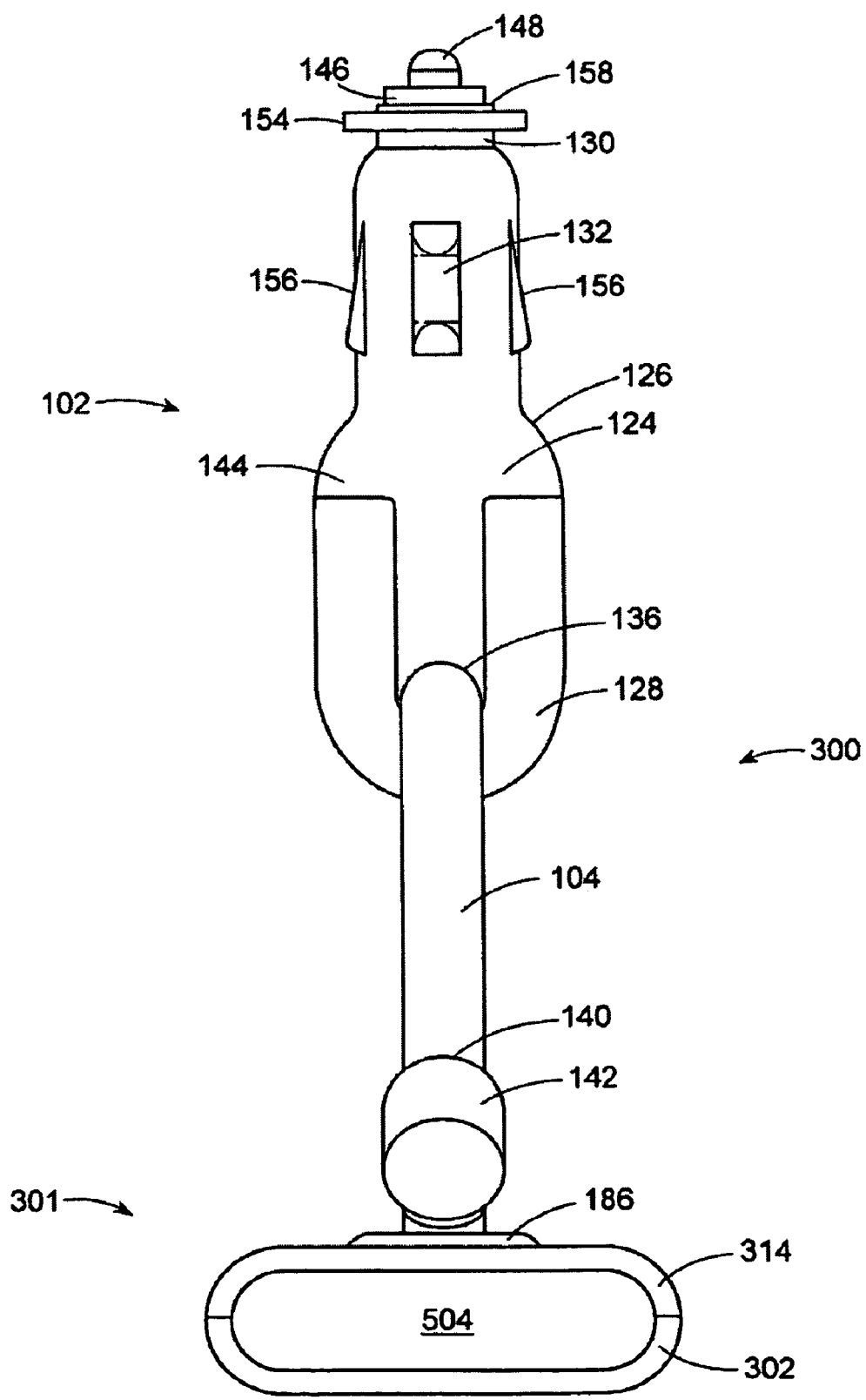
FIG. 19 is a top view of the unit of FIG. 16, with an iPod mini MP3 player attached.

With reference also to FIG. 15, the bottom of connector 104 is press-fit or swaged into swage 222 (connector 104 into put into swage 222, which is then radially compressed to tighten it around connector 104). Two oppositely disposed screw holes 224 (only one of which is visible in FIG. 15) in swage 222 mate with two pins 217 (only one of which is visible in FIG. 15), one in each side of the power acquisition sub-unit, i.e., right side 124 and left side 144. That keeps connector fixed in power acquisition sub-unit 102, both longitudinally and rotationally (connector 104 is also fixed both longitudinally and rotationally in swivel connector 142). In the preferred embodiment being described, swage 222 is about 1.8 centimeters long and has an inner diameter of about 9 millimeters, and outer diameter of about 1.1 centimeters in its lower half (the upper half, which has been radially compressed to tighten it around the bottom of connector 104, has a slightly smaller outer diameter).

Because of the rotational play (allowable movement, in this case, inherently allowable movement) in the coil of gooseneck 104, in the preferred unit, holder 101 is able to rotate around the axis of the gooseneck at least about 90 degrees in each direction (i.e., clockwise and counterclockwise when viewed from above) from the straight-ahead position shown in FIGS. 2 through 8. That is more than sufficient to allow the front of the holder with the electronic device held therein (as in those figures) to be rotated for ease of viewing and use by the driver of the vehicle or by a passenger in the front seat of the vehicle.

Power acquisition sub-unit 102 comprises two housing pieces (right side 124 and left side 144 of cigarette lighter adapter enclosure) and end cap 128. In this embodiment, the internal cavity formed by the two sides being joined contains the circuitry for obtaining power from an external power source such as a cigarette lighter and then processing it (further described below) before it is sent to the RF transmitter and/or the electronic device. As readily seen in FIG. 5, the housing has a smaller diameter portion and a larger diameter portion, with flange 126 in between and defining the end of the larger housing portion adjacent the smaller diameter portion. As will be described below, the flange limits the longitudinal amount of the power acquisition sub-unit that can be inserted into a power source such as a cigarette lighter if some part of the flange is of larger diameter than the corresponding part of the power source.

When right side 124 and left side 144 are joined (as in, e.g., FIG. 1), swage 222 is held in the inner cavity formed by the assemblage of the two sides and connector 104 passes up through circular alignment opening 229. One half (semicircle) of opening 229 is at the top, near the proximal end, of each of sides 124 and 144. Two sets of two raised members project from the inner surface of each of right side 124 and left side 144 into the inner cavity, one set of members on each side. There are two sets of two corresponding concave semicircular cut-outs, one cut-out at the end of each of the four members. When the two sides 124 and 144 are brought together, they form two circular holes that receive and hold the outer cylindrical surface of swage 222. The members (and therefore the cut-outs) are positioned such that swage 222 is held at an angle of elevation of approximately 70 degrees with respect to the longitudinal axis of the power acquisition sub-unit, which causes visible bottom 136 of connector 104 to exit through alignment opening 229 at complementary angle 137 (FIG. 5) of approximately 20 degrees declination with respect to a normal (i.e., a line perpendicular) to the longitudinal axis of the power acquisition sub-unit. Angles smaller or larger than 20 degrees may be used in some cases. Having connector 104 at such an angle (e.g., 20 degrees) facilitates positioning holder 101 (and, therefore, the electronic device) away from the knobs, levers, etc. that are typically on or near the console of a vehicle.

The inner cavity of the power acquisition sub-unit contains the circuitry for obtaining power from an external power source such as that found in a vehicle. One electrode comprises tip 148 (see also FIG. 9), which passes through opening 238 at the distal end of the power acquisition sub-unit and has enlarged integral collar or flange 244. The flange defines a cavity into which the distal end of fuse 212 resides after assembly (so as to be electrically coupled to tip 148), and the proximal end of the fuse contacts the distal end of tensioning spring 214, the other end of which spring resides between the two parallel legs of fuse contact 216 and electrically contacts the short spacing member between the two legs. Fuse contact 216 may be made of copper or of any other suitable conductive material. Fuse contact 216 terminates in connection arm 246, which is electrically coupled to printed circuit board 218. Tensioning spring 214 can move longitudinally (i.e., along the major axis of the power acquisition sub-unit) and biases tip 148 outwardly (i.e., against contact 149 when the power acquisition sub-unit has been inserted fully into the power source, e.g., cigarette lighter (FIG. 11), to help insure good electrical coupling of the power acquisition sub-unit with the power source.

The other electrode comprises two contact springs 132, which are joined and terminate in connection arm 248, which is also electrically coupled to printed circuit board 218. The contact springs desirably are made of any suitably springy conductive material, e.g., plated brass, steel, or copper. The two contact springs extend beyond the outer diameter of the distal end of the power acquisition sub-unit (see also FIGS. 2 and 3) through rectangular openings 240 (see also FIGS. 7 and 8), which are formed by corresponding rectangular cut-outs in each of sides 124 and 144.

The processing of the electrical power by printed circuit board 218 in this embodiment is described below. After processing the power, it is sent by wires (not shown) connected to the printed circuit board that pass through swage 222 and connector 104 to the electronic device (iPod mini MP3 player 500) and/or the circuitry on printed circuit board 170 in holder 101 (FIG. 22), e.g., RF transmitter.

The smaller diameter section of the power acquisition sub-unit may be inserted into an external power source such as the cigarette lighter of a vehicle, which are usually cylindrical cavities. To help position and stabilize the power acquisition sub-unit in such a cavity, non-conductive stabilizing springs 156 are provided on opposite side of the smaller diameter portion of the power acquisition sub-unit (see FIGS. 5, 7, and 15). Springs 156 may be cantilevered tabs formed by making three cuts along the housing wall and having the tabs be thicker than the other parts of the wall so that they extend farther from the longitudinal axis of the power acquisition sub-unit. Any other suitable biasing means may be used.

Because springs 156 may be insufficient to stabilize the power acquisition sub-unit in all of the various size cigarette lighters that are found in vehicles, and particularly because of the cantilevered weight of the electronic device, holder, and connector (e.g., gooseneck), stabilizer 154 is used. As will be further described below, stabilizer 154 preferably comprises a deformable resilient member that is larger than the inner circumference of essentially all known vehicle cigarette lighters so that pushing the distal end of the cigarette lighter adapter into the cigarette lighter causes the outer circumference of the deformable resilient member to bend away from the distal end of the cigarette lighter adapter and towards the proximal end of the cigarette lighter adapter while at least some of the deformable resilient member even after such deformation continues to push against the inner circumference of the cigarette lighter. Stabilizer 154 is held near the distal end of the power acquisition sub-unit between collar 130 and retaining washer 158. All of them are locked in place longitudinally by nut 146, which has a center hole to allow electrode tip 148 to pass through and external threads on its smaller diameter rear portion that mate with internal threads in opening 238 at the distal end of the power acquisition sub-unit. Light-emitting diode 134, the leads of which are connected to printed circuit board 218 and the light from which is visible through opening 135 (see FIG. 2), indicates when power is being obtained by the power acquisition sub-unit. Light-emitting diode 134 is held in opening 234 at the proximal end of the power acquisition sub-unit (FIG. 15), opening 234 aligning with opening 135 at the proximal end of end cap 128 (FIG. 2) so that light from the light-emitting diode will be visible.

The two sides 124 and 144 of the cigarette lighter adapter of power acquisition sub-unit 102 have grooves and raised portions to help align them (e.g., slots 242) as they are brought together for assembly. Two screws 162 pass through holes 230 in left side 144, into the internal cavity of the power acquisition sub-unit, and into two corresponding threaded receiving cavities 232 in right side 124, so that tightening the two screws tightly affixes sides 124 and 144 together. Proximal end cap 128 slides onto the proximal end of the power acquisition sub-unit and four tabs 228 (only one of which is shown) near the circular edge of end cap 128 snap into retaining slots 164 (only one of which is shown) on the recessed (lowered) portion of the proximal end of the power acquisition sub-unit. That holds the end cap on the assemblage of the two sides 124 and 144 (thereby helping to hold the two sides together and present a neat appearance). Various openings in end cap 128 are provided, e.g., gooseneck swage receiving slot 226, audio output access opening 160 (which when the end cap is in place aligns with opening 236 in the housing formed by right side 124 and left side 144) through which audio output jack 220 is accessible (see FIG. 8), and opening 135 in the rounded end of the end cap through which the proximal end of light-emitting diode 134 is visible (see FIG. 2).

Figure 9:
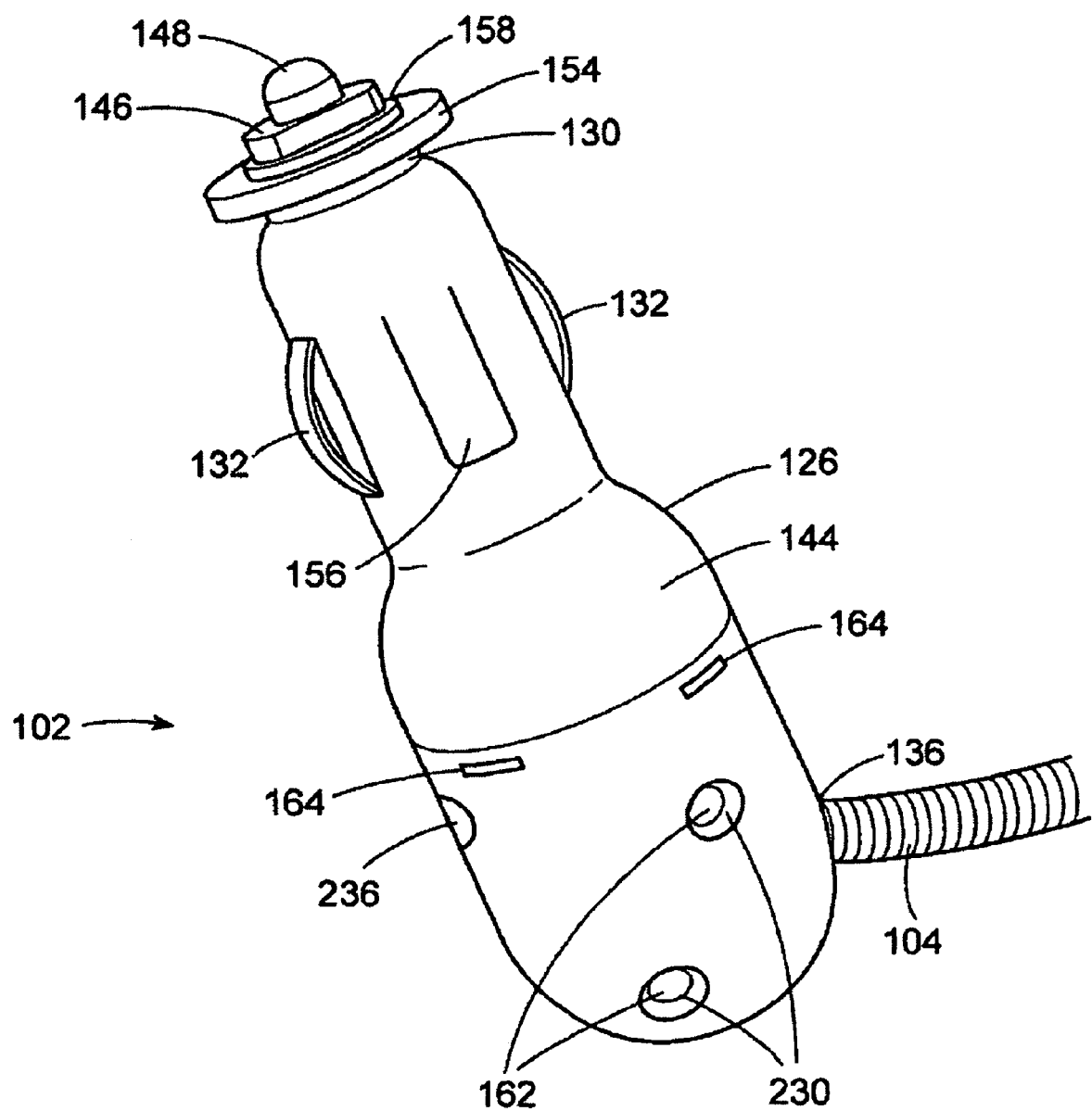
FIG. 9 is a close-up view of the power acquisition sub-unit (which comprises a cigarette lighter adapter) of the unit with part of its outer housing (end cap) removed.

FIG. 9 shows the assemblage of the two sides of power acquisition sub-unit 102; with connector (gooseneck) 104 attached but before end cap 128 is in place. Nut 146 has been tightened so that tip 148 (which comprises the first electrode) extends beyond the front face of the nut and so that stabilizer 154 is held tightly between retaining washer 158 and collar 130 and along the longitudinal axis of the power acquisition sub-unit. The three cuts to provide one of the non-conductive springs 156 are visible, as are the two conductive springs 132, which comprise the second electrode. Screws 162 in holes 230 help keep the two sides 124 and 144 together (see also FIG. 15).

Figure 10:
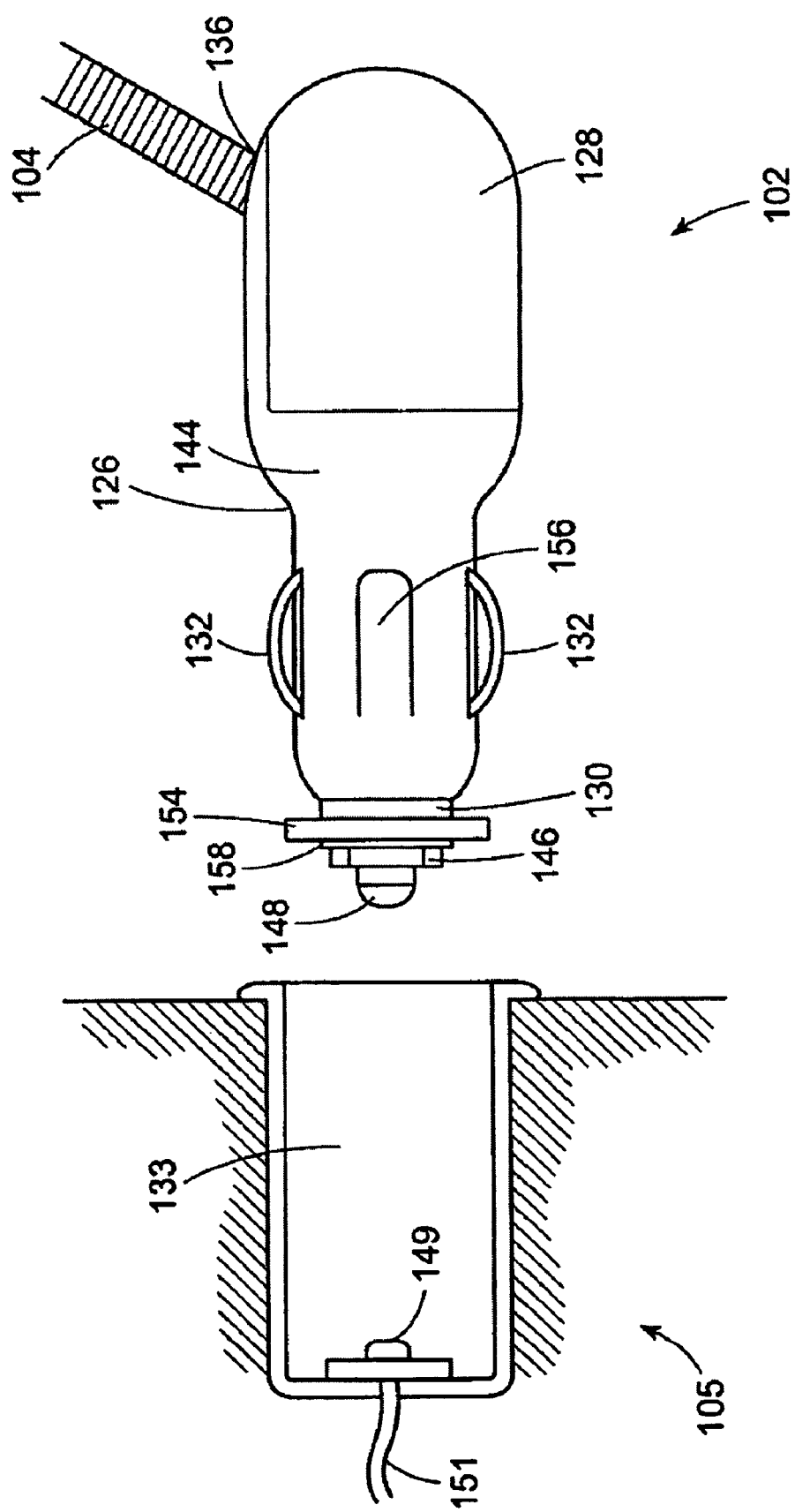
FIG. 10 shows the cigarette lighter adapter just prior to insertion of its distal end into the cigarette lighter of an automobile (i.e., an external source of power)

The preferred power acquisition sub-unit has the following approximate dimensions (see FIGS. 9, 10, and 15). The overall length (from the distal end of tip 148 to the proximal rounded end of end cap 128) is about 9.5 centimeters. End cap 128 is about 3.8 centimeters long and 3 centimeters in outer diameter, and its slot 226 is about 3 centimeters long and 1 centimeter wide. Flange 126 is about 1 centimeter long (axial length), 3 centimeters in outer diameter at its widest point (its proximal end, where it abuts the distal end of end cap 128), and about 2 centimeters in outer diameter at its narrowest point (its distal end, where it abuts the smaller diameter distal portion of the power acquisition sub-unit). The recessed portion of the proximal end of the power acquisition sub-unit is recessed about 2 millimeters, to account for the thickness of end cap 128 so that the outer surface of end cap 128 will lie flat with the non-recessed portion of the proximal end of the sub-unit when the end cap is in place. The distal portion (smaller diameter part) of the sub-unit is about 3.2 centimeters long and about 2 centimeters in outer diameter. Collar 130 is about 3 millimeters long or thick (axial length) and about 1.5 centimeters in outer diameter. Stabilizer 154 is about 2.35 centimeters in outer diameter and about 2 millimeters long or thick (axial length); its center hole has a diameter of about 9 millimeters, which allows the stabilizer to fit over the smaller diameter, proximal, threaded portion of nut 146. Retaining washer is about 1.3 centimeters in outer diameter and about 1 millimeter long or thick (axial length). The portion of nut 146 that is visible in the assembled sub-unit (the larger diameter, distal portion) is about 1.2 centimeters in outer diameter, with two oppositely disposed straight sides to provide purchase for a tightening tool, e.g., pliers (see FIG. 15), and about 4 millimeters long or thick (axial length). Without longitudinal compression of spring 214, tip 148 extends beyond the distal surface of nut 146 about 5 millimeters.

Figure 11:
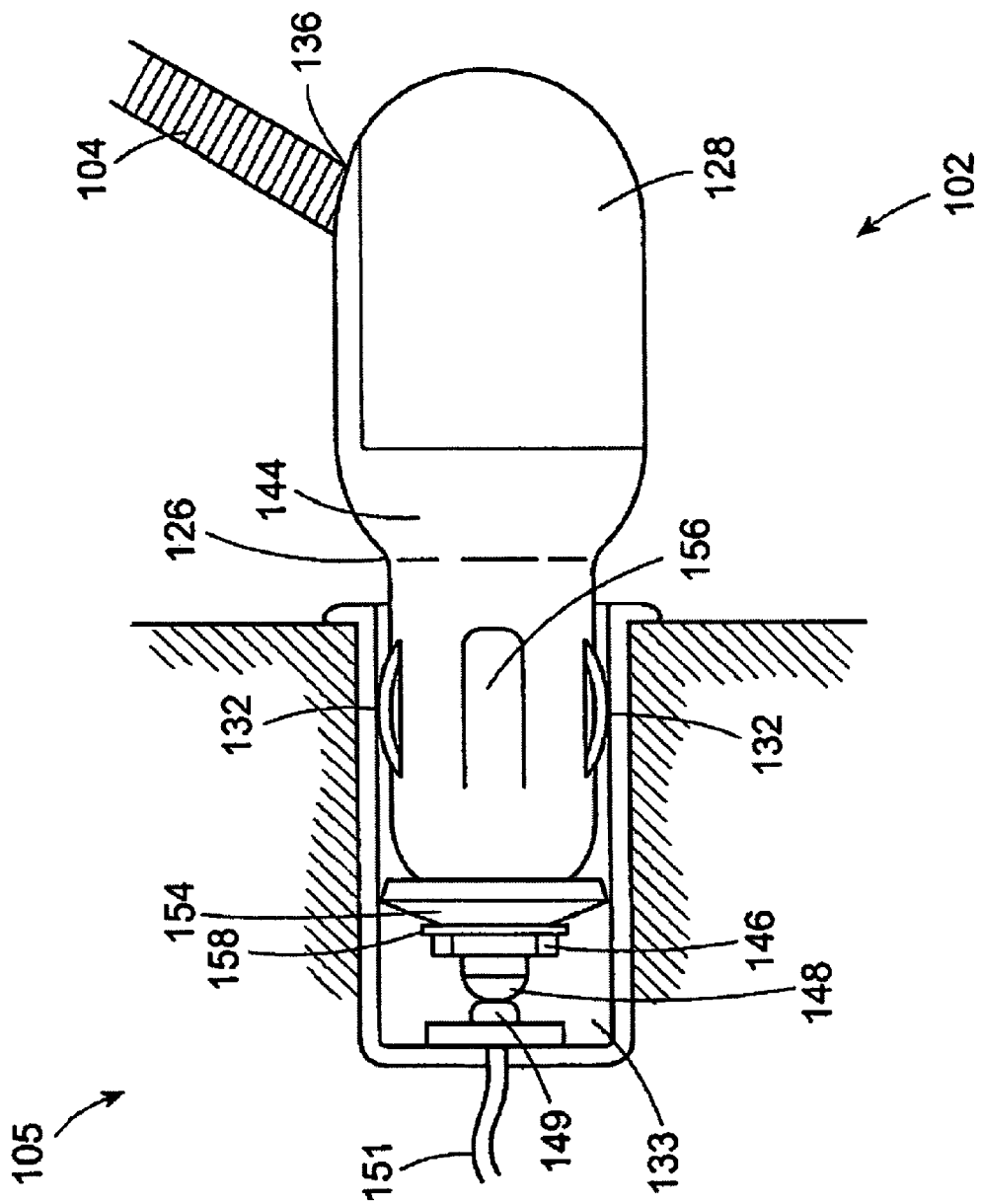
FIG. 11 depicts the unit's cigarette lighter adapter after its distal end has been fully pushed into the cigarette lighter.

With reference also to FIG. 11, one of the features of this invention is the stabilizer, which allows the power acquisition sub-unit to fit the cigarette lighter of virtually any vehicle to mechanically and electrically semi-permanently (firmly but removably) couple the unit of this invention to keep the unit in the desired position and maintain good electrical contact with the power source. The stabilizer retards or prevents undesired rotation, wobbling, and longitudinal movement of the power acquisition sub-unit in the cigarette lighter. Thus, the stabilizer tends to prevent normal vibration, centrifugal forces (from the vehicle's turning), and bumps in the road from moving the unit (and therefore the electronic device) from its desired position.

FIG. 10 shows power acquisition sub-unit 102 poised to be pushed into power receptacle 105 (like a vehicle's cigarette lighter), which comprises cylindrical conductive ground sleeve 133 and contact 149, which is coupled to power lead 151. Stabilizer 154 is substantially flat, i.e., a plane contains its major face, including its outer circular circumference and its central region. Stabilizer 154 is fixed at its central region along the longitudinal axis of the power acquisition sub-unit so that it (e.g., its outer circumference) is generally perpendicular to the length of the housing. Accordingly, when the power acquisition sub-unit is pushed into the power receptacle (as in FIG. 11), the central portion of stabilizer 154 does not move because collar 130 etc. keep the central portion from being forced back towards the proximal end, which in FIG. 11 is to the right.

Because stabilizer 154 is flexible, as the stabilizer is pushed into the power receptacle, it deforms, i.e., its central portion remains fixed in position but its outer periphery is bent back away from the distal end and towards the proximal end (FIG. 11). Furthermore, because stabilizer 154 is also resilient, because it and ground sleeve 133 are round, and because the stabilizer is of larger diameter than the ground sleeve, a circular portion of the stabilizer (away from its central portion) pushes against the ground sleeve 133 around all 360 degrees of the ground sleeve's inner surface. That helps keep the power acquisition sub-unit's longitudinal axis aligned with the longitudinal axis of the ground sleeve, thereby helping to keep tip 148 axially aligned with the receptacle's inner contact 149. Because of the friction between the stabilizer and the inner surface of the ground sleeve (in addition to the friction between stabilizing springs 156 and the ground sleeve), the stabilizer helps keep the power acquisition sub-unit (and therefore the unit) from sliding out of the receptacle. Moreover, the longitudinal spacing between the points of contact of the sleeve and stabilizer, on the one hand, and the points of contact between the sleeve and non-conductive springs 156 and ground contact springs 132, on the other hand, help keep the power acquisition sub-unit from wobbling. That is why the stabilizer is desirably located farther from rather than closer to springs 156 and 132. Both of those features (no sliding and no wobbling) help to keep tip 148 in contact with the receptacle's inner contact 149. The stabilizer cannot rotate easily on the power acquisition sub-unit because it desirably is held tightly between collar 130 and retaining washer 158. That in combination with the friction between the sleeve and the stabilizer helps prevent rotation of the power acquisition sub-unit (and, therefore, the electronic device).

When the power acquisition sub-unit is pulled out of the power receptacle, stabilizer 154 will not be moved distally (i.e., towards the distal end) or pulled off and left behind because retaining washer 158 helps hold it in place. In other words, the power acquisition sub-unit carries a retainer (washer 158) between the deformable resilient member (stabilizer 154) and the distal end of the power acquisition sub-unit to fix the deformable resilient member in position on the power acquisition sub-unit along its length.

Because the outer diameter of the stabilizer is greater in at least one place than the inner diameter of the sleeve, the stabilizer allows the power acquisition sub-unit (and therefore the unit of this invention) to be used in the cigarette lighter (power source) of virtually any vehicle. Thus, as noted above, the expression "the outer circumference of the deformable resilient member being larger than the inner circumference of the cigarette lighter" should be broadly understood to mean that at least some (but not necessarily all) of the periphery of the deformable resilient member extends radially beyond at least some of the periphery of the cigarette lighter.

It will be apparent to one skilled in the art that the stabilizer can have any cross-sectional shape (although substantially circular is preferred), any three-dimensional shape, e.g., a conical section, such as a frustum of a cone (although squat cylindrical is preferred), and any size (although larger in outer periphery than the power source cavity, i.e., cigarette lighter cylindrical cavity, is preferred) that allow the benefits of this invention to be achieved. For example, the stabilizer could have radial arms (e.g., like a starfish). The stabilizer should be deformable yet resilient (and with enough stiffness to push firmly against the wall of the power source's concavity and with enough tack to provide sufficient friction against the wall of the concavity). The stabilizer is desirably non-conductive, at least in units in which it would otherwise be electrically coupled with the tip of the power acquisition sub-unit, because the tip is usually in contact with one electrode of the power source, the stabilizer contacts the sleeve when inserted into the power source, and the sleeve is usually the other electrode; the stabilizer should not be electrically coupled to both electrodes. Thus, the material of construction of the stabilizer will usually be polymeric, e.g., elastomeric, such as rubber (e.g., silicone rubber, ethylene-propylene monomer polymers, ethylene-propylene-diene monomer polymers, styrene-butadiene polymers). One preferred stabilizer for use in the preferred power acquisition sub-unit described above is made of silicone rubber having a Shore Durometer value of 80 (Shore A scale) and has the dimensions noted above (i.e., about 2.35 centimeters in outer diameter, about 2 millimeters long or thick (axial length), and a center hole diameter of about 9 millimeters).

FIGS. 16 through 20 concern a second preferred embodiment of the present invention for holding iPod mini MP3 player 500. Cigarette lighter adapter-gooseneck 300 differs from the previously described cigarette lighter adapter-gooseneck-transmitter 100 in that unit 300 does not have a transmitter. Cigarette lighter adapter-gooseneck 300 comprises holder (support assembly) 301, gooseneck 104 (connector), and power acquisition sub-unit 102 (comprising a cigarette lighter adapter), which can be plugged into (i.e., coupled to) cigarette lighter 105 (i.e., an external power source) in the same way power acquisition sub-unit 102 (and unit 100) was plugged in. (For convenience and ease of understanding, parts of unit 300 that are essentially the same as the corresponding parts of unit 100 may have the same reference numerals in FIGS. 16 through 20 as used in FIGS. 1 through 15.) Connector (gooseneck) 104 and power acquisition sub-unit 102 of this unit 300 are essentially the same as in unit 100, except for changes stemming from not having an RF transmitter.

Holder 301 has enclosure front 302 and enclosure back 314, top 304, and bottom 306. Cavity 308, which holds the bottom portion of iPod mini MP3 player 500, has cavity bottom 310, which lies below top 304 the amount indicated as depth 312. Bottom 502 of the MP3 player rests on cavity bottom 310. Holder 301 is connected to gooseneck 104 through swivel connector 142, which is preferably connected to the holder at angle 316 of 20 degrees, and connector 104 is preferably connected to the gooseneck at angle 137 of 20 degrees (a smaller or larger angle can be used for either or both).

Figure 20:
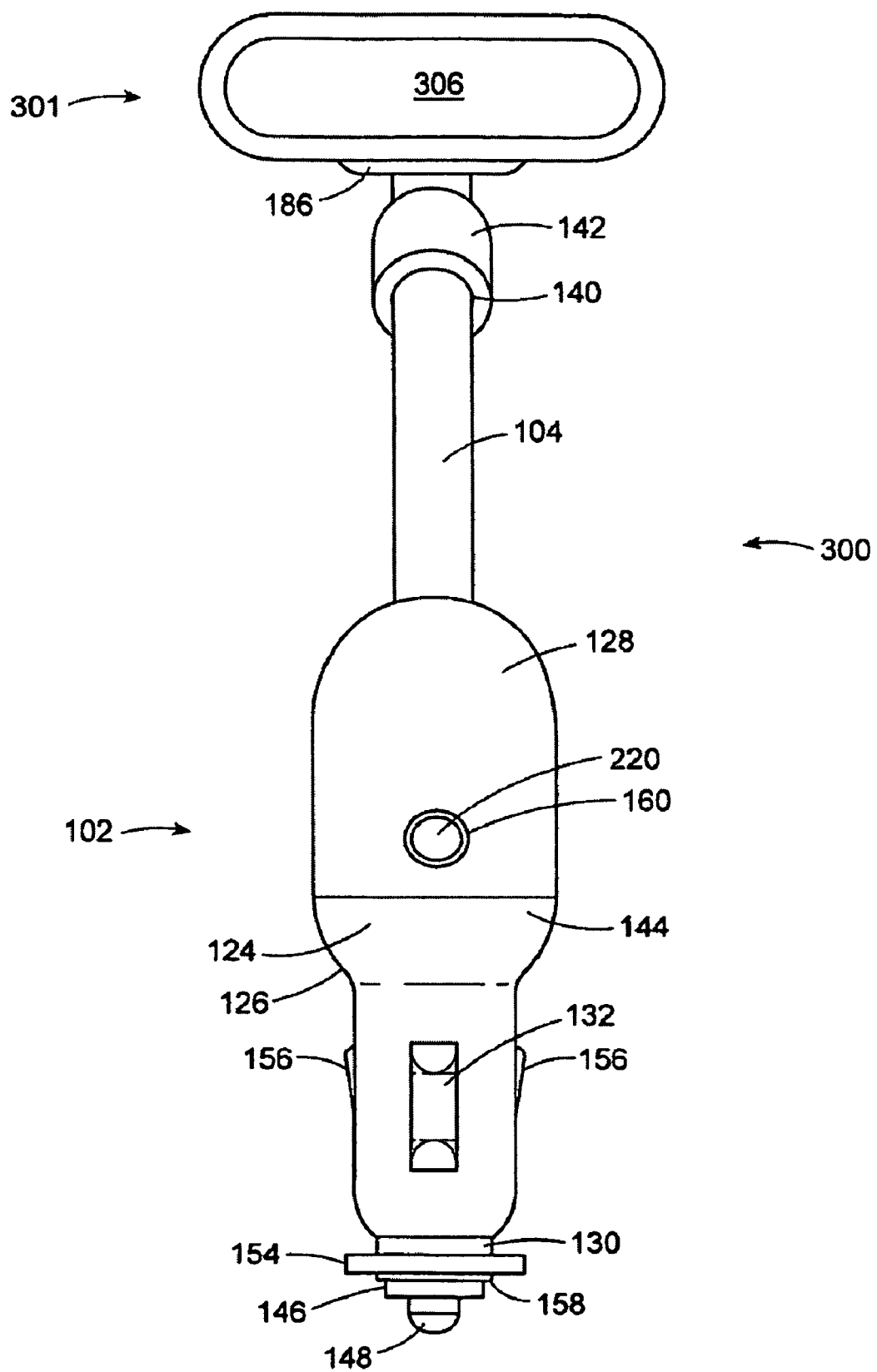
FIG. 20 is a bottom view of the device of FIG. 16, with an iPod mini MP3 player attached.

This embodiment (without the RF transmitter) may be used for embodiments in which an RF transmission system is not needed, e.g., if the electronic device has its own RF transmission system (e.g., a Bluetooth system) and/or if the output data signal is to be made available at an output jack, e.g., output jack 220 (see FIG. 20). Power is still supplied to the electronic device from the external power source (e.g., a vehicle's cigarette lighter) and processed to the extent needed by circuitry in the unit and sent up the gooseneck to holder 301, where it is conveyed to the electronic device through, e.g., a dock connector that mates with a multi-pin connector in the electronic device. The gooseneck allows the position of the holder to be semi-permanently adjusted with respect to the power acquisition sub-unit, and the power acquisition sub-unit functions in this embodiment as in the previous embodiment to securely semi-permanently hold the unit at only one attachment point to the vehicle (i.e., the cigarette lighter) and at the same time supply power to the electronic device.

Figure 21:
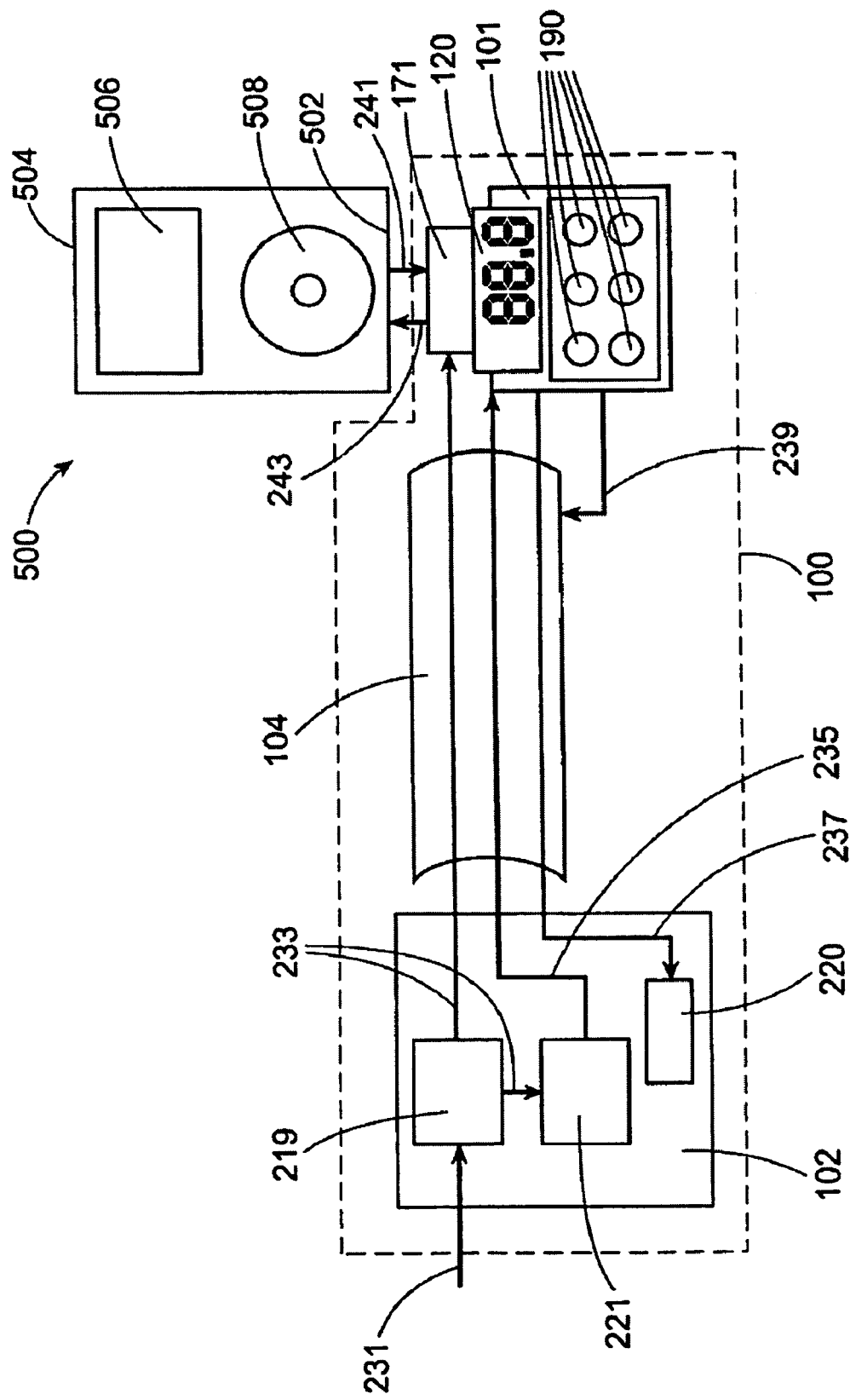
FIG. 21 is a block diagram of the embodiment of FIG. 1, with an iPod mini MP3 player attached.

Turning now to the electrical system (for power and data flow and processing) of preferred cigarette lighter adapter-gooseneck-transmitter 100, FIG. 21 is a basic block diagram of that unit coupled with iPod mini MP3 player 500. Unit 100 of this invention includes power acquisition sub-unit 102, gooseneck 104 (which functions as an adjustable mechanical support, a connector of the power acquisition sub-unit to the holder, a conduit for electrical wires, and an antenna for the RF transmission), and holder 101. Power acquisition sub-unit 102 comprises power conditioning circuit 219, voltage regulator 221, and stereo audio output 220 (e.g., a jack). Holder 101 comprises six momentary pushbutton switches 190, liquid crystal display 120 (which is displaying "88.8," the carrier frequency of the RF transmitter), and dock connector 171.

iPod mini MP3 player 500 is coupled to holder 101 via a dock connector 171. As previously noted, as used herein, the term "couple," "coupled," "couples," "coupling," and the like should be broadly understood and refer to connecting two or more elements or signals, electrically and/or mechanically, either directly or indirectly through intervening circuitry and/or elements. The iPod mini can be coupled to holder 101 by any suitable means, including the use of a serial port, a parallel port, a Universal Serial Bus (USB) port, or by an IEEE (Institute of Electrical and Electronic Engineers) 1394 connection (IEEE 1394 is a standard for a fast external bus that supports high data transfer rates), such as Apple Computer's FireWire connection.

Holder 101 receives data signal 241 from iPod mini MP3 player 500, which becomes data signal 247 inside the holder, and data signal 247 is split, with one branch being sent as signal 237 to the power acquisition sub-unit's stereo audio output 220 (see also FIG. 22). That provides an optional interface to any accessory that utilizes a stereo jack, such as, headphones or a tape cassette adapter, or for a line-input on a stereo audio system.

The other branch of data signal 247 is modulated onto an FM frequency or carrier wave, which is transmitted after attenuation (described below) as signal 239 to a receiver (e.g., a vehicle's FM receiver) through the use of gooseneck antenna 104. The particular frequency onto which data signal 241 is modulated is controlled by the end user (e.g., driver of or passenger in a vehicle) through the use of momentary pushbutton switches 190. The frequency chosen by the end user is shown in the liquid crystal display 120. For example, if the end user chooses to transmit the MP3 player's data signal at 88.8 MHz, then "88.8" will be displayed on the liquid crystal display (as in FIG. 21).

Holder 101 receives operating power from power acquisition sub-unit 102, which in the preferred embodiments described above, comprises a cigarette lighter adapter. However, one of ordinary skill in the art will appreciate that holder 101 can receive operating power (e.g., for its microprocessor and/or RF transmitter) from any suitable power source, including the electronic device held in the holder or from any other external power source. In that case, power could flow down from the electronic device through, e.g., the dock connector, and the power acquisition sub-unit could supply power to the electronic device all the time, some of the time, or possibly not at all, i.e., all power for the unit of this invention could come from the electronic device. Allowing the electronic device to supply power some of the time, e.g., when there was an interruption in the flow of power from the power acquisition sub-unit, would allow the unit to continue to broadcast an RF signal even if there were such a momentary interruption in the power supply from the power acquisition sub-unit.

One skilled in the art will appreciate that if the characteristics of the external power (i.e., the power available from the external power source) do not match the characteristics of the power required for the unit of this invention, the characteristics of the external power will need to be modified before being used. For example, a step-up or step-down voltage regulator may be needed to increase or decrease the voltage of the external power before that power is used in the unit of this invention. Such a voltage regulator may be of any suitable design and may be located within the unit of this invention.

Power conditioning circuit 219 in power acquisition sub-unit 102 receives external power 231 and filters it to remove any extraneous noise. The power conditioning circuit comprises an LC (inductance-capacitance) filter, which receives an input voltage signal between 11-16 volts (e.g., from a car's electrical system). The inductor is approximately 2.0 mH (millihenrys) and the capacitor is approximately 330 µF (microfarads). Because of the limited size of the power acquisition sub-unit's printed circuit board, it is desirable to use as physically small an inductor as possible. The preferred embodiment utilizes such an inductor, which was purchased from Formosa Inductor Corporation, Part No. T9X5X3 (the specifications for this and all other elements are incorporated by reference herein in their entireties).

Output 233 of power conditioning circuit 219 is coupled to voltage regulator 221. Output 235 of voltage regulator 221 is coupled to and used to power the electronics of holder 101 (described in further detail below). Voltage regulation circuits are well-known in the art. In the preferred embodiment, voltage regulator 221 is a low-dropout voltage regulator from Texas Instruments Inc., Part No. TL750L, TL7501L Series. The specific voltage regulator used is a matter of design choice based upon the needs of the particular application. For instance, use of the above-described Texas Instruments voltage regulator was dictated in part by the need to power the holder's printed circuit board 170 (FIG. 22) with 5 volts.

Output 233 of power conditioning circuit 219 is also coupled to dock connector 171 and is used to supply power to iPod mini MP3 player 500 (power supply 243). The MP3 player uses this power to operate and to charge the MP3 player's battery with its own internal charging circuitry. The cigarette lighter adapter-gooseneck-transmitter and cigarette lighter adapter-gooseneck of the present invention preferably do not include circuitry to charge the MP3 player's battery or the battery of any other electronic device.

FIG. 22 is a block diagram of the electronics of the holder of cigarette lighter adapter-gooseneck-transmitter 100. Main printed circuit board 170 is located within holder 101 and comprises stereo modulator and FM transmitter unit (FM transmitter circuitry) 225, liquid crystal display 120, six momentary pushbutton switches 190, microprocessor 223, and attenuation circuit 227. Input power (output 235 from voltage regulator 221—see FIG. 21) is fed to microprocessor 223 and stereo modulator and FM transmitter unit 225.

Stereo modulator and FM transmitter unit 225 receives data signal 247 (which is the iPod mini MP3 player's data output signal 241 that has passed through dock connector 171) and modulates data signal 247 onto an FM frequency or carrier wave. Suitable designs for stereo modulator and FM transmitter are well-known in the art. See, for example, Rohm's Wireless Audio Linx IC, Part No. BH1415F. Accordingly, the design or choice of a particular stereo modulator and FM transmitter is within the ordinary skill in the art and need not be detailed here. Also, as indicated above, and as one of skill in the art will understand, the present invention is not limited to the use of an FM transmitter, but can be used with any type of RF transmitter, including an AM transmitter, Bluetooth transmitter (see, e.g., www.bluetooth.org and www.bluetooth.com), or any other type of suitable RF transmitter.

To comply with FCC (Federal Communications Commission) requirements, output 245 of stereo modulator and FM transmitter 225 (an FM signal) is coupled to attenuation circuit 227. As will be understood by one skilled in the art, the amount of attenuation that is needed to comply with FCC requirements is dictated by the output of the particular FM transmitter, the quality and type of antenna that is being utilized, and the environment in which the FM transmitter is being used. Consequently, the specific design of attenuation circuit 245 is a matter of design choice depending upon the needs of the particular application. For some types of RF signals to be broadcast by an embodiment of this invention, an attenuation circuit will not be needed.

The output of attenuation circuit 227 (attenuated FM data signal 239) is coupled to gooseneck antenna 104, which broadcasts the FM data signal to a stereo receiver. There are numerous benefits to using a metal gooseneck antenna. For example, using the metal gooseneck antenna creates a consistent radiation pattern, which improves the strength of the FM data signal. Broadly speaking, the stronger the FM data signal, the better the sound quality. Other antenna designs, such as having the antenna enclosed in the metal gooseneck or having the antenna within the housing of holder 101, would not generate as consistent a radiation pattern. This is because the gooseneck and iPod mini MP3 player (or other electronic device) would act as metal shields, thereby weakening the strength of the FM data signal. Another benefit of using the gooseneck as an antenna is that it simplifies the design and is cost-effective (because it also acts as a flexible but semi-permanently positionable connector and is relatively inexpensive and aesthetically pleasing).

Microprocessor 223 is coupled to stereo modulator and FM transmitter 225 (digital interface 249), as well as to liquid crystal display 120 and momentary pushbutton switches 190 (bi-directional interface 250). Suitable designs for microprocessor 223 are well known in the art. See, for example, ST's 8-Bit MCU with Flash or ROM Memory, ADC, Two 16-Bit Timers, I²C, SPI, SCI Interfaces, Part Nos. ST722606, ST722626, and ST722646 ("ST" indicates Singapore Technologies, also known as "Singapore Technologies Electronics" and "ST Electronics"), e.g., ST Microcontroller ST72F264G2H1. The specific microprocessor used will be a matter of design choice depending upon the needs of the particular application and is well within the ordinary skill in the art.

As discussed above, an end user can choose, through the use of pushbuttons 168 (which activate momentary pushbutton switches 190) the particular frequency onto which data signal 241 is modulated (e.g., an end user can choose to broadcast or transmit the audio signal at 88.8 MHz). The end user's choice is sent to microprocessor 223, which utilizes this information to control the transmission frequency of stereo modulator and FM transmitter 225. Microprocessor 223 also utilizes this information to display on LCD 120 the frequency the end user has chosen (e.g., "88.8"). Hence the need for bi-directional interface 250 but only a one-way interface between stereo modulator and FM transmitter 225 and microprocessor 223.

Figure 23:
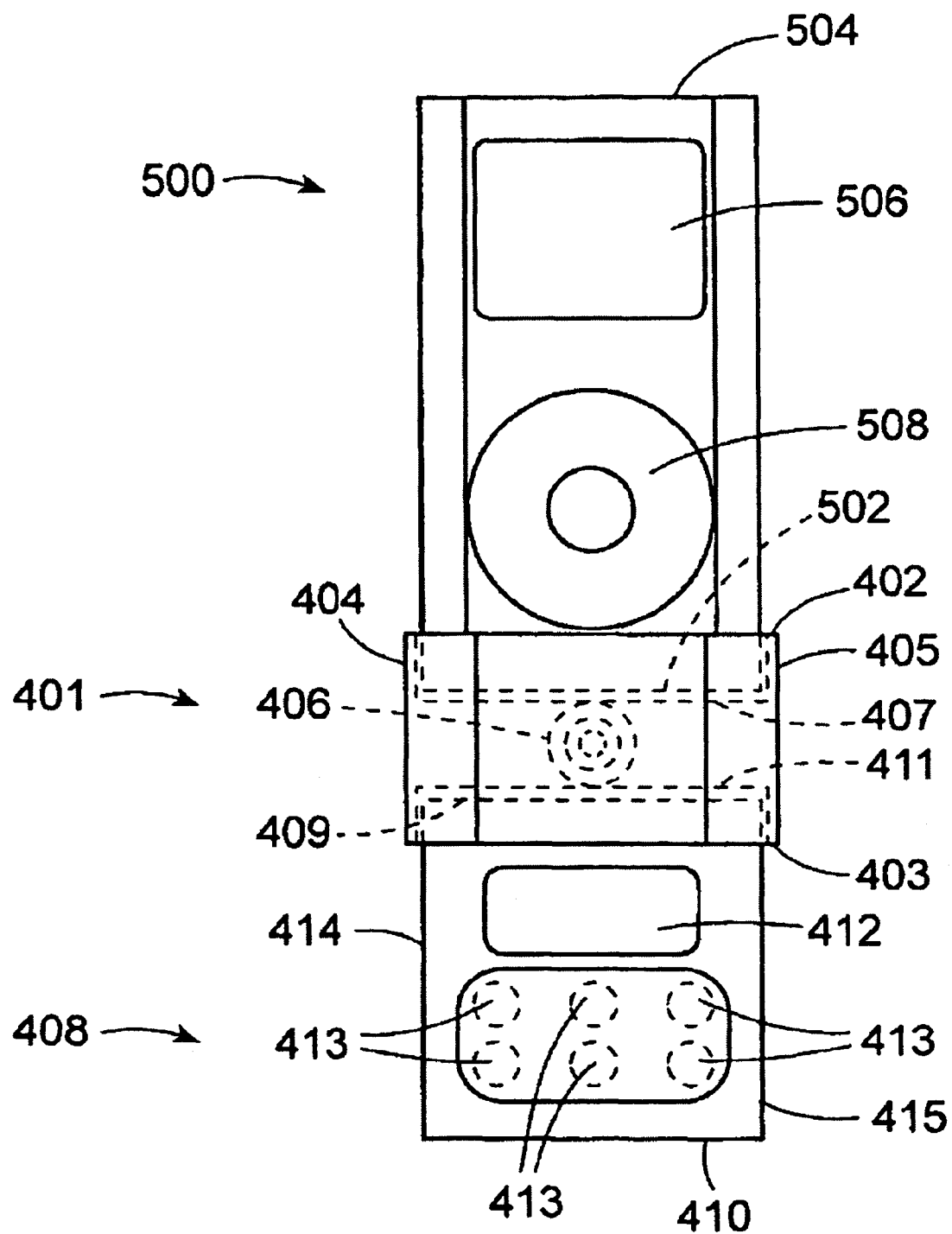
FIG. 23 is a front elevational view of a third embodiment, with an iPod mini MP3 player attached.

FIG. 23 shows a third embodiment in which both the iPod mini MP3 player 500 (electronic device) and FM transmitter (RF transmitter) are semi-permanently held by this invention (both are removable from the holder). Holder 401 has top edge (surface) 402, bottom 403, left side 404, right side 405 and is connected to a gooseneck (not shown) by connector 406, which is similar to the swivel connector of the previously described embodiments (e.g., indicated by reference numeral 142 in FIG. 5). Cavity 407, whose opening is at the top of the holder, receives and semi-permanently holds the bottom portion of iPod mini MP3 player 500, which has bottom 502, top 504, liquid crystal display 506, and control wheel 508. Cavity 411, whose opening is at the bottom of the holder, receives and semi-permanently holds the top portion of FM transmitter 408, which has top 409, bottom 410, left side 414, right side 415, liquid crystal display 412, and pushbuttons 413. (In this and other drawings, the space between the walls of a cavity and an object held therein may be shown as being larger than it would actually be. For example, bottom 502 of iPod mini MP3 player 500 abuts the bottom of cavity 407 but is shown in FIG. 23 spaced therefrom for clarity.)

Holder 401 functions in much the same way as the previously described holders, except that both the electronic device and the RF transmitter are removable. Thus, in one embodiment of holder 401, power is brought up through a power acquisition sub-unit (not shown), which is like those previously described (e.g., power acquisition sub-unit 102 in FIG. 1). The acquired power may be LC filtered and then some of it sent directly to the electronic device and some sent to a voltage regulator (if needed) and from there to the RF transmitter. Alternatively, the acquired power may be LC filtered and then all of it sent to the electronic device, which could then supply power to the RF transmitter. Other schemes may be used.

Both cavities of the holder are shown firmly holding only an end portion of their respective devices (i.e., the bottom portion of the MP3 player and the top portion of the RF transmitter); however, the top and/or bottom portions of the holder may be modified to contact and hold larger portions of the electronic device and/or RF transmitter. For example, cavity 411 of holder 401 may be modified so that it encircles most or all of the periphery of the RF transmitter.

In this embodiment, the 30-pin connector at the bottom the iPod mini MP3 player couples to a dock connector at the bottom (innermost wall) of cavity 407 (neither connector is shown). That dock connector may be the same as or similar to dock connector 171 (best seen in FIGS. 12 and 13). A dock connector at the top of FM transmitter 408 couples to a 30-pin connector at the bottom (innermost wall) of cavity 411 (neither connector is shown). That dock connector may be the same as or similar to dock connector 171, and that 30-pin connector may be the same as or similar to the 30-pin connector used as the bottom of the MP3 player. Thus, power entering holder 401 through connector 406, which power may be already been LC filtered and whose voltage may already have been adjusted, can flow up through the mating connectors into iPod mini MP3 player 500 and down through the mating connectors into FM transmitter 408.

The FM transmission system can operate as in the embodiment of FIGS. 1 through 15. A data (audio) signal leaving iPod mini MP3 player 500 flows down through the two sets of coupled connectors (the first set comprising the 30-pin connector in the bottom of the MP3 player and the mating dock connector in the bottom of cavity 407, and the second set comprising the 30-pin connector in the bottom of cavity 411 and the mating dock connector in the top of FM transmitter 408) into FM transmitter 408, is modulated onto a carrier signal, attenuated (if required), and broadcast by a gooseneck antenna (not shown), which is coupled to the FM transmitter through connector 406. The six pushbuttons 413 allow the carrier frequency to be selected and programmed into pre-sets (the two center pushbuttons adjust the frequency up and down, and the other four pushbuttons control the pre-sets); liquid crystal display 412 shows the carrier frequency to which the FM transmitter is set.

One feature of this embodiment is that both the MP3 player and the FM transmitter can both be removed from the holder and coupled to each other via the 30-pin connector in the bottom of iPod mini MP3 player 500 and the dock connector in the top of FM transmitter 408. The coupled assemblage can then be removed from the vehicle or other environment in which the holder (with coupled power acquisition sub-unit and gooseneck) was being used and placed near another FM receiver, e.g., in a home, office, or another vehicle, so that FM transmitter 408 can broadcast its signal to that second FM receiver.

In this embodiment, power must be supplied to the FM transmitter after it has been removed from its holder 401. For example, it may be plugged into a mating holder in another location (e.g., another vehicle) and draw power through the power acquisition sub-unit associated with the second holder. Alternatively, if plugged directly into the electronic device (e.g., iPod mini MP3 player 500) after the electronic device has also been removed from holder 401, the FM transmitter can draw power from the electronic device. Also, because the gooseneck between the holder and power acquisition sub-unit desirably functions as the broadcast antenna for the FM (RF) signal, uncoupling the FM transmitter from the holder also uncouples the FM transmitter from its gooseneck antenna. Therefore, another antenna would have to be used, e.g., a wire inside the FM transmitter housing that is used (activated) at the same time the gooseneck is used as the antenna or only when the gooseneck is not being used as the antenna (because the FM transmitter has been removed from the holder).

Figure 24:
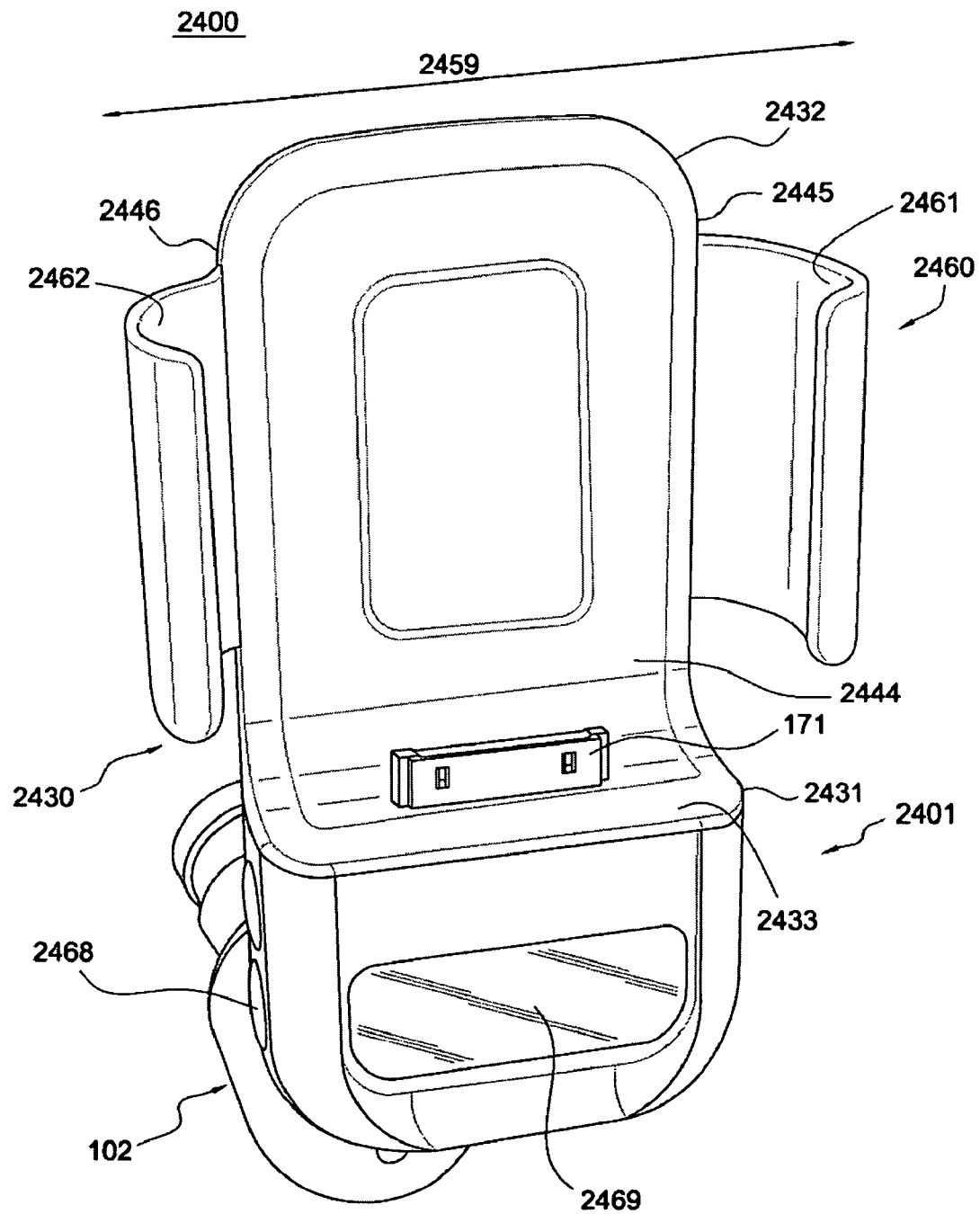
FIG. 24 is a front perspective representational view of a fourth embodiment of the electronic device.
Figure 25:
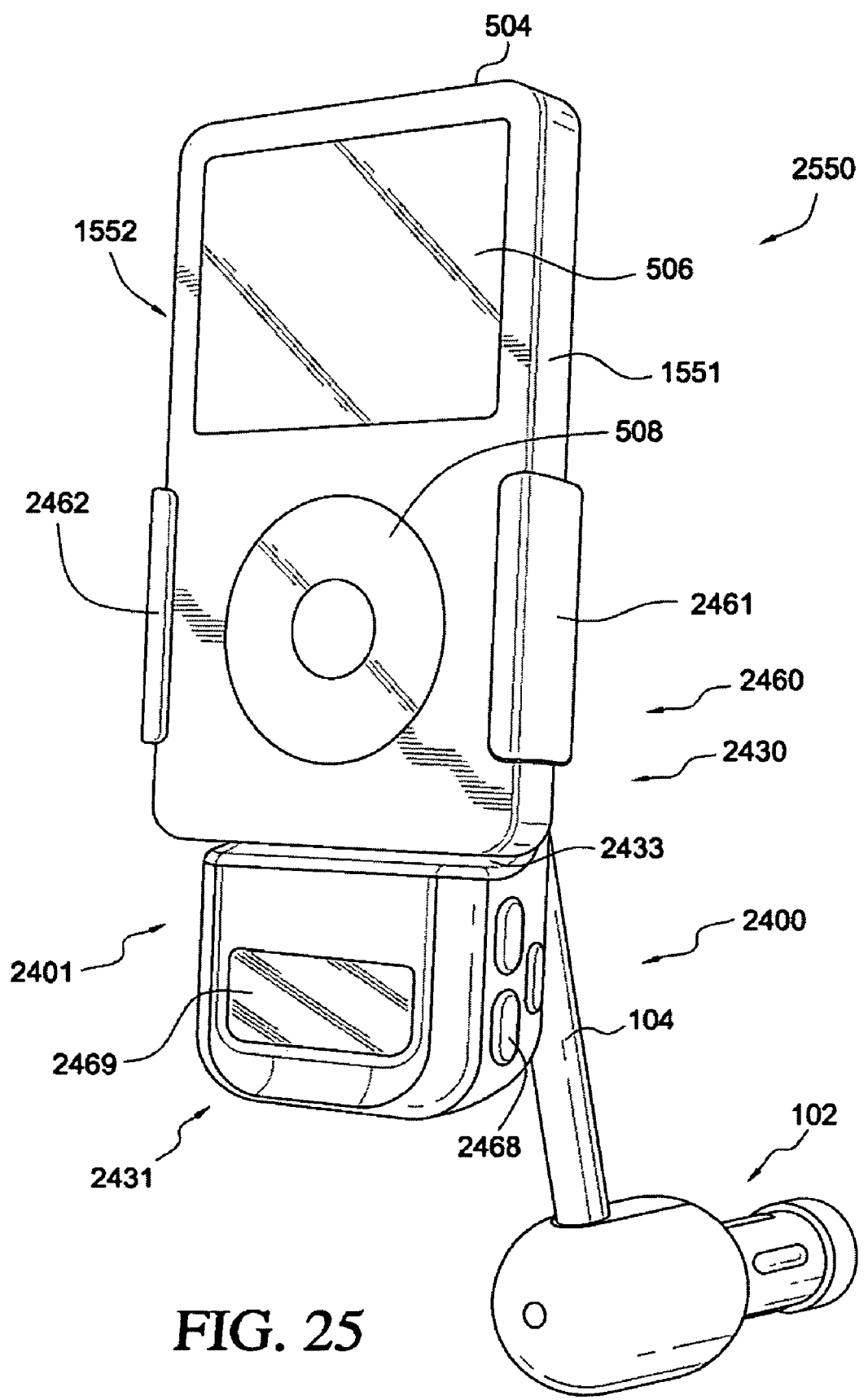
FIG. 25 is a front perspective, representational view of FIG. 24 attached to a media player, according to the fourth embodiment of the electronic device.
Figure 26:
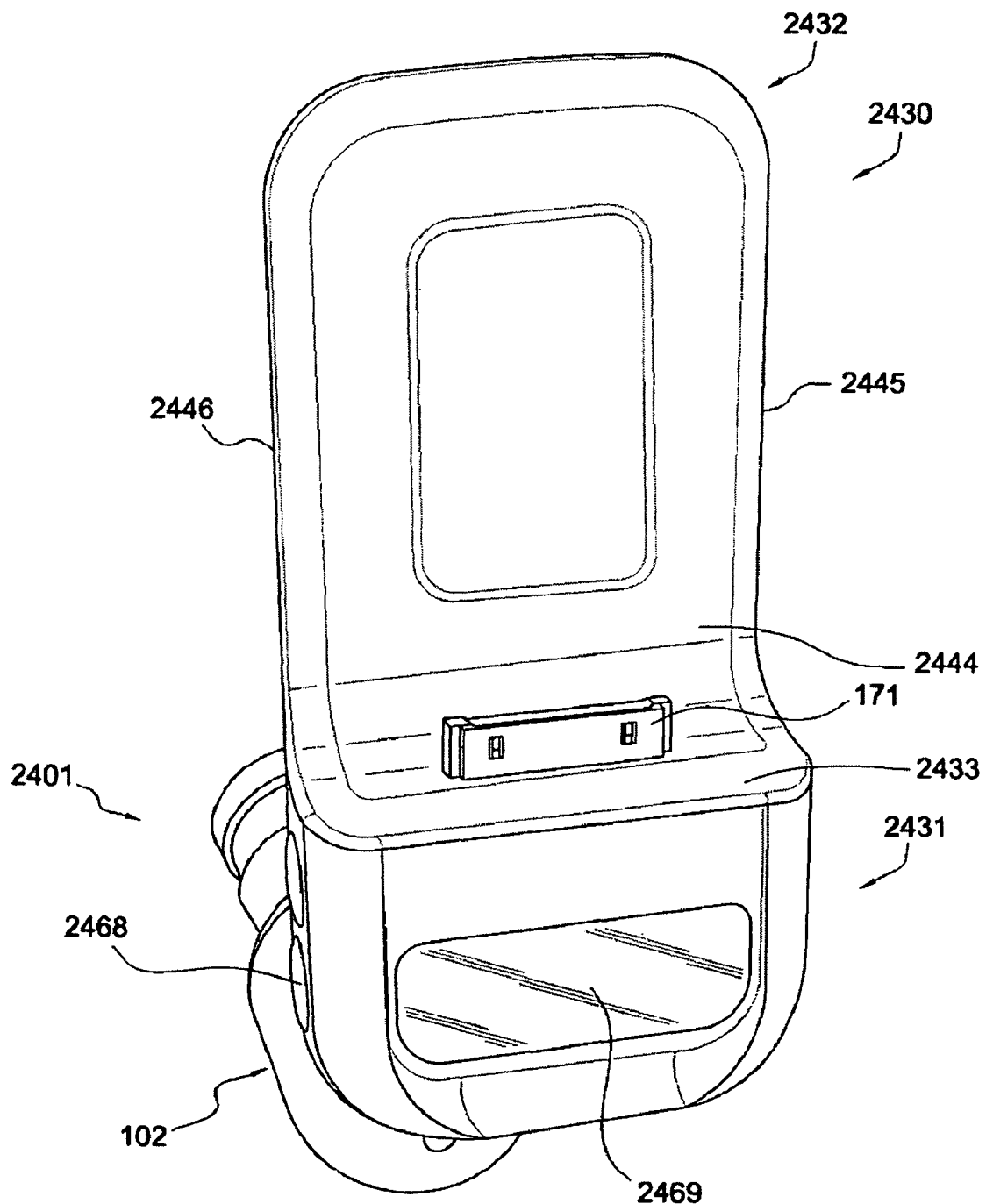
FIG. 26 is a front perspective, representational view of the electronic device of FIG. 24, where the side supports are uncoupled from the electronic device, according to the fourth embodiment.
Figure 27:
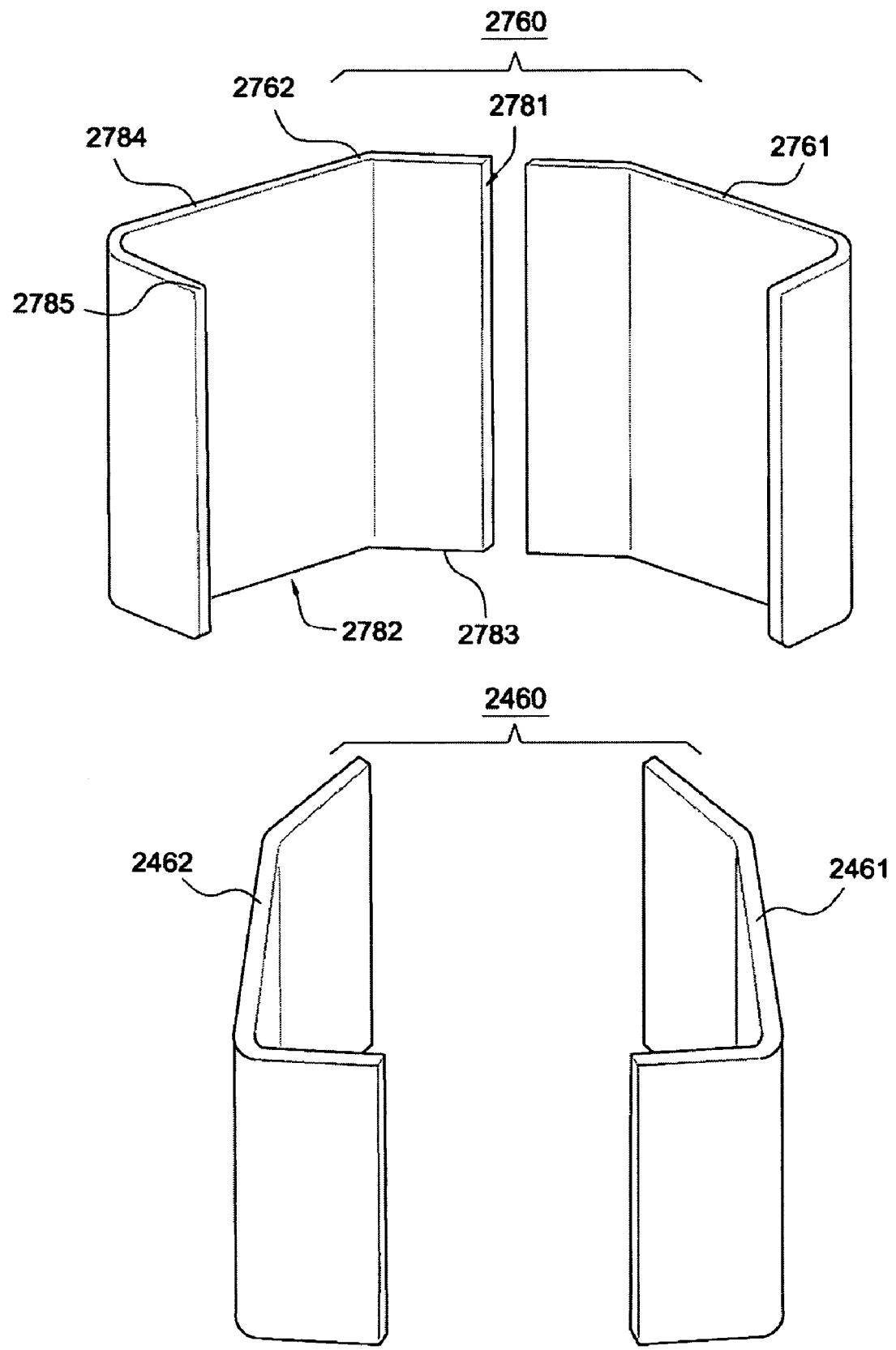
FIG. 27 is a front perspective view of two pairs of side supports for the electronic device, according to the fourth embodiment.

Turning to a further embodiment, FIG. 24 is a front perspective, representational view of an electronic device 2400, according to a fourth embodiment. FIG. 25 is a front perspective, representational view of electronic device 2400 attached to at least one media players 2550, according to the fourth embodiment. FIG. 26 is a front perspective representational view of electronic device 2400, where side supports 2460 are uncoupled from side supports 2460 (FIGS. 24 and 27), according to the fourth embodiment. FIG. 27 is a front perspective view of two pairs of side supports 2460 and 2760 according to the fourth embodiment.

In some examples, an electronic accessory or device 2400 is configured to hold at least two media players 2550 (FIG. 25). That is, electronic device 2400 is configured to couple to at least a first media player and a second media player. In the same or different examples, electronic device 2400 is configured to couple media players 2550 to external power supply 105 (FIG. 10).

Figure 28:
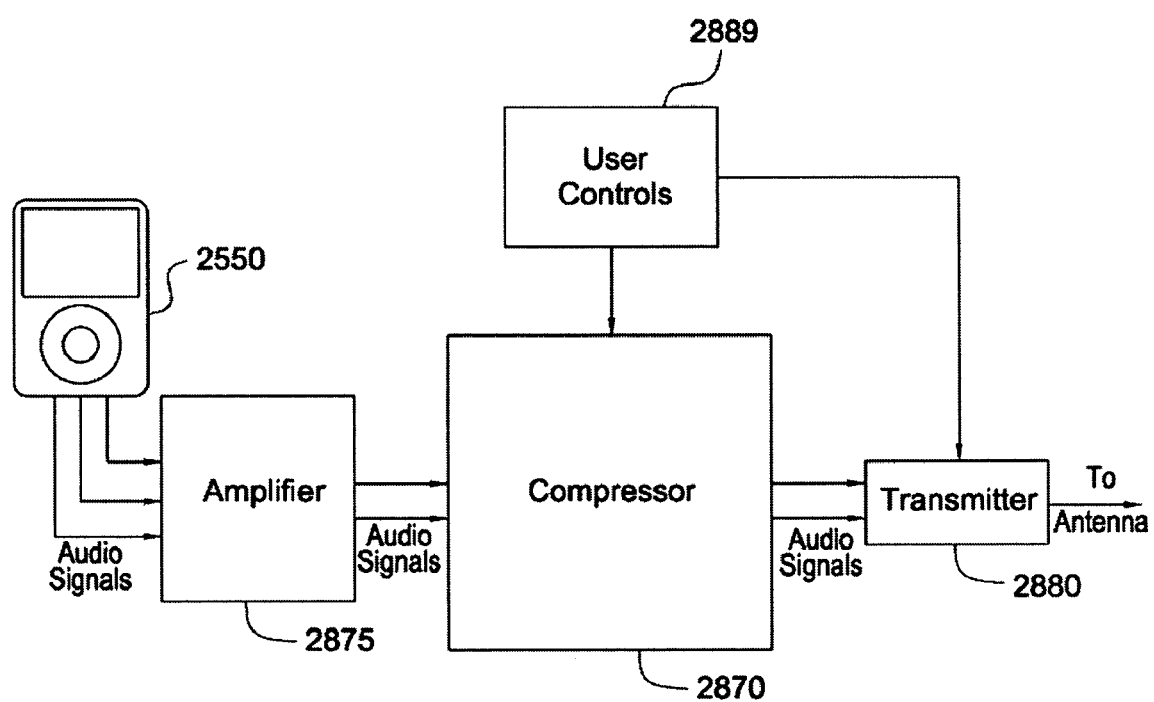
FIG. 28 is a block diagram of an audio system of the electronic device of FIG. 24, according to the fourth embodiment.

In many embodiments, electronic device 2400 can include: (a) a holding structure or a holder 2401 configured to hold media players 2550; (b) a power unit 102; (c) a transmitter 2880 (FIG. 28) mechanically coupled to holder 2401; (d) a compressor 2870 (FIG. 28) for modifying electrical signals from media players 2550; (e) an amplifier 2875 (FIG. 28); (f) user controls 2889 (FIG. 28); and (g) a connector 104. Holder 2401 can be configured to hold, at a given time, only one of media players 2550.

As illustrated in FIG. 25, each of media players 2550 can include: (a) a bottom side; (b) a front side having a display and adjacent to the bottom side; (c) a back side adjacent to the bottom side and opposite the front side; (d) a first side adjacent to the front side, the back side, and the bottom side; and (e) a second side opposite the first side. In one example, the first media player can be an iPod mini MP3 player 500 (FIG. 1). In the same example, the second media player can be one of an iPod nano, an iPod with video, an iPod with color display, an iPod classic, an iPod touch, and an iPhone, all manufactured by Apple Computers. In other examples, the first media device and/or the second media device can be other media players such as the Microsoft Zune® media player. In alternative examples, the first media device and/or the second media device can be pagers, cell phones, personal digital assistants, eBook readers, or the like.

Power unit 102 is electrically coupled to the power coupling of dock connector 171 and configured to removably couple to the external power source such as external power supply 105 (FIG. 10). In some embodiments, power unit 102 is electrically coupleable to media players 2550 through holder 2401.

The signal coupling of dock connector 171 can be electrically coupled to transmitter 2880 and be configured to transmit data from media players 2550 to transmitter 2880.

As illustrated in FIG. 24, holder 2401 can include: (a) a base or cradle 2430 configured to couple to at least two of media players 2550; (b) dock connector 171 (FIGS. 24 and 26); and (c) two or more clasps or side supports 2460. Each of the two or more side supports 2460 are configured to removably couple to cradle 2430. Cradle 2430 can be configured to couple to, at a given time, only one of media players 2550. Similarly, side supports 2460 can be configured to couple to only one of media players 2550, at a given time. In another embodiment, a portion of cradle 2430 and one or more of side supports 2460 are a unitary or single piece.

In some examples, dock connector 171 (FIGS. 24 and 26) can include a power coupling and a signal coupling. In one example, the power coupling and the signal coupling can each be one or more pins on dock connector 171.

In numerous embodiments, cradle 2430 can include: (a) a base portion 2431 coupled to power unit 102 and include dock connector 171; and (b) an extension portion 2432 extending away from base portion 2431 and configured to removably couple to side supports 2460.

Base portion 2431 is configured to couple to the bottom side of one of media players 2550. In the example illustrated in FIGS. 24-26, base portion 2431 includes a substantially level top surface 2433 with dock connector 171 protruding from an aperture in base portion 2431. In this example, media players 2550 can be placed on top surface 2433 and coupled to dock connector 171. In other examples, dock connector 171 can protrude from extension portion 2432 and/or one of side supports 2460. In a further example, base portion 2431 can be identical to or substantially similar to holder 101, as shown in FIGS. 1-8 and 12.

Referring again to FIGS. 24-26, extension portion 2432 includes: (a) a side 2444 coupled to base portion 2431; (b) a side 2445 adjacent to side 2444 and configured to removably couple to a first support of side supports 2460; (c) a side 2446 adjacent to side 2444 and opposite side 2445; and (d) a side 2447 adjacent to sides 2444, 2445, and 2446. Side 2446 is configured to removably couple to a second support of side supports 2460.

In some embodiments, sides 2445 and 2446 can each include a vertical groove (not shown) in which a portion of a side support can be placed or slid to couple the side support to extension portion 2432. In the same of different embodiment, extension portion 2432 includes a groove that extends from side 2446 through side 2447 into side 2445. That is, in this embodiment, extension portion 2432 includes a single groove that extends through sides 2445, 2446, and 2447. In other embodiments, sides 2445 and 2446 can include other connection mechanisms, and side supports 2460 can include complementary connection mechanisms. For example, the attachment mechanisms can be screws, Velcro®, string ties, snap buttons, other clasping mechanisms, or the like.

As shown in FIG. 27, in some embodiments, side supports 2460 can include side supports 2461 and 2462. Side supports 2760 can include side supports 2761 and 2762. In various examples, each of side supports 2461, 2462, 2761, and 2762 can include: (a) a connection mechanism 2781 configured to removably couple to extension portion 2432; and (b) an arm 2782. Arm 2782 can include: (a) a proximal end 2783 coupled to connection mechanism 2781; (b) a distal end 2785; and (c) a body 2784 extending between distal end 2785 and proximal end 2783. Body 2784 can be curved, bent, or arced in one or more places to better hold media players 2550. For example, body 2784 can be bent to conform to the shape of media players 2550. In a different embodiment, one or more of side supports 2460 and 2760 can be unitary or single piece. Regardless of these physical configurations, side supports 2460 and 2760 can be comprised of the same or different materials used for holder 101 of FIGS. 1-8 and 12.

In the illustrated embodiment, cradle 2430 is configured to couple, at any particular time, to only side supports 2460 or side supports 2760. In some examples, side supports 2761 and 2762 can be configured to couple and/or securely hold the first media player to electronic device 2400.

Side supports 2761 and 2762 can also be coupled to cradle 2430 in the same manner that side supports 2461 and 2462 are coupled to cradle 2430. Assuming media players 2550 shown in FIG. 25 is the first media player, cradle 2430 can be coupled to the bottom side of the first media player, distal end 2785 of arm 2782 of side support 2761 is adjacent to the front side of the first media player, a portion of body 2784 of side support 2761 is adjacent to the first side of the first media player, and proximal end 2783 of arm 2782 of side support 2761 is adjacent to the back side of the first media player.

Likewise, distal end 2785 of arm 2782 of side support 2762 can be adjacent to the front side of the first media player, a portion of body 2784 of side support 2762 is adjacent to the second side of the first media player, and the proximal end 2783 of arm 2782 of side support 2762 is adjacent to the back side of the first media player.

In the same or a different embodiment, side supports 2461 and 2462 can be configured to couple and/or securely hold the second media player to electronic device 2400. That is, as illustrated in FIGS. 24 and 25, side support 2461 is configured to couple to a first side of the second media player and side 2445 of extension portion 2432. Side support 2462 is configured to couple to a second side of the second media player and side 2446 of extension portion 2432.

The size and shape of side supports 2461, 2462, 2761, and 2762 can correspond to the size and shape of media players 2550. That is, in some embodiments, a distance 2459 (FIG. 24) between distal ends 2785 and/or bodies 2784 of side supports 2461 and 2462 when coupled to cradle 2430 is different than a distance between distal ends 2785 and/or bodies 2784 of side supports 2761 and 2762 when coupled to cradle 2430. In some embodiments, if the width of the first media player is larger than the width of the second media player, distance 2459 between distal ends 2785 and/or bodies 2784 of side supports 2461 and 2462 when coupled to cradle 2430 can be larger than the distance between distal ends 2785 and/or bodies 2784 of side supports 2761 and 2762 when coupled to cradle 2430. For example, distance 2459 can be approximately 5.5 centimeters and the distance between distal ends 2785 of side supports 2462 and 2461 can be 4.3 cm.

In various embodiments, electronic device 2400 can be designed and configured such that holder 2401 and transmitter 2880 can be rotated relative to power unit 102. In many examples, holder 2401 can be rotated at least approximately ninety degrees relative to power unit 102.

In one embodiment, holder 2401 can be coupled to connector 104 in a manner identical to or similar to the coupling of connector 104 to holder 101, as illustrated in FIGS. 13 and 14. That is, holder 2401 is coupled to connector 104 through a swivel connector 142 (FIG. 14), which includes swivel connector flange 186 (FIGS. 13 and 14) and hollow protrusion 188 (FIGS. 13 and 14). In alternative embodiments, other mechanism can be used to rotatably couple connector 104 to holder 2401.

In the embodiment illustrated in FIGS. 24-27, side supports 2460 and 2760 can keep media players 2550 in holder 2401 while holder 2401 and transmitter 2880 are rotated relative to power unit 102. For example, side supports 2761 and 2762 can inhibit the first media device from falling out of cradle 2430 when holder 2401 is rotated.

In many embodiments, holder 2401 can also include one or more buttons 2468 and a video screen 2469. In some embodiments, user controls 2889 (FIG. 28) include buttons 2468 and video screen 2469. In some examples, some of buttons 2468 can be semi-permanently set to select a carrier frequency for transmitter 2880 to transmit the audio signal. In the same examples, the rest of buttons 2468 can be semi-permanently set to select an audio mode for the audio signals. In some embodiments, buttons 2468 can be covered with a protective membrane similar to buttons 150 of FIG. 4. In other embodiments, buttons 2468 are devoid of a protective membrane and protrude from holder 2401.

Video screen 2469 can be used to display information about the selected carrier frequency or audio mode. For example, video screen 2469 can display the carrier frequency in the format "XXX.X." In the same or different example, video screen can either display a predetermined name for an audio mode (e.g., "SPOKEN WORD MODE") or a list of settings (e.g., "Dynamic Compressor On" and/or "Output Mode: Stereo"). In some embodiments, video screen 2469 can show the carrier frequency and audio mode information simultaneously. In other embodiments, the information shown on video screen 2469 is related to the last pressed button of buttons 2468 or predetermined default information. In many examples, video screen 2469 is an LCD (liquid crystal display) screen similar to liquid crystal display 120. In other examples, video screen 2469 can be a touch screen.

FIG. 28 is a block diagram of an audio system 2800 of electronic device 2400, according to the fourth embodiment. That is, FIG. 28 illustrates a block diagram of the system used to handle the audio signals received from media players 2550. In the illustrated example, after the audio signal are received by electronic device 2400 through dock connector 171 from the first or second media device, the audio signals are transferred to amplifier 2875.

Different media player output audio signals with different signal strengths. Accordingly, amplifier 2875 can adjust the audio output level of the audio signals such that the audio signals have at least a minimum and/or a maximum strength. In other embodiments, amplifier 2875 can adjust the audio signals such that the audio signals have a predetermined strength.

Compressor 2870 is configured to receive an audio signal from media players 2550 and, when instructed by a user, output a modified audio signal to transmitter 2880. In some examples, compressor 2870 receives the audio signals from media players 2550 through amplifier 2875. In other examples, compressor 2870 receives the audio signals from dock connector 171 without passing through amplifier 2875. In some examples, the user can configure compressor 2870 and/or amplifier 2875 through user controls 2889.

Compressor 2870 can set a compression level for the audio signal and the type and amount of gain. In one example, when instructed by the user, compressor 2870 is configured to apply to the audio signal at least one of a dynamic compression and a pre-gain compression. In the same or different example, compressor 2870 can also apply hard knee compression, soft knee compression, and/or make-up gain. For example, compressor 2870 and user controls 2889 can allow a user to select a level of compression (e.g., high, medium, or low). In some embodiments, user controls 2889 allow the user to select one of a plurality of audio modes. For example, a user could select a first audio mode with dynamic compression off or a second audio mode with dynamic compression on, the pre-gain compression set low, a compression ratio set to medium, and the output signal in stereo. Compressor 2870 can then select the specific combination and types of gain and compression based on the user choice of audio mode. In alternative embodiments, user controls 2889 allow the user to select the specific amount and type of gain and compression.

After the application of compression and gain to the audio signal, the modified audio signal is communicated to transmitter 2880. As discussed above in relation to the transmitter in the embodiment shown in FIGS. 1-23, transmitter 2880 can transmit the audio signal over an RF frequency to a receiver.

Figure 29:
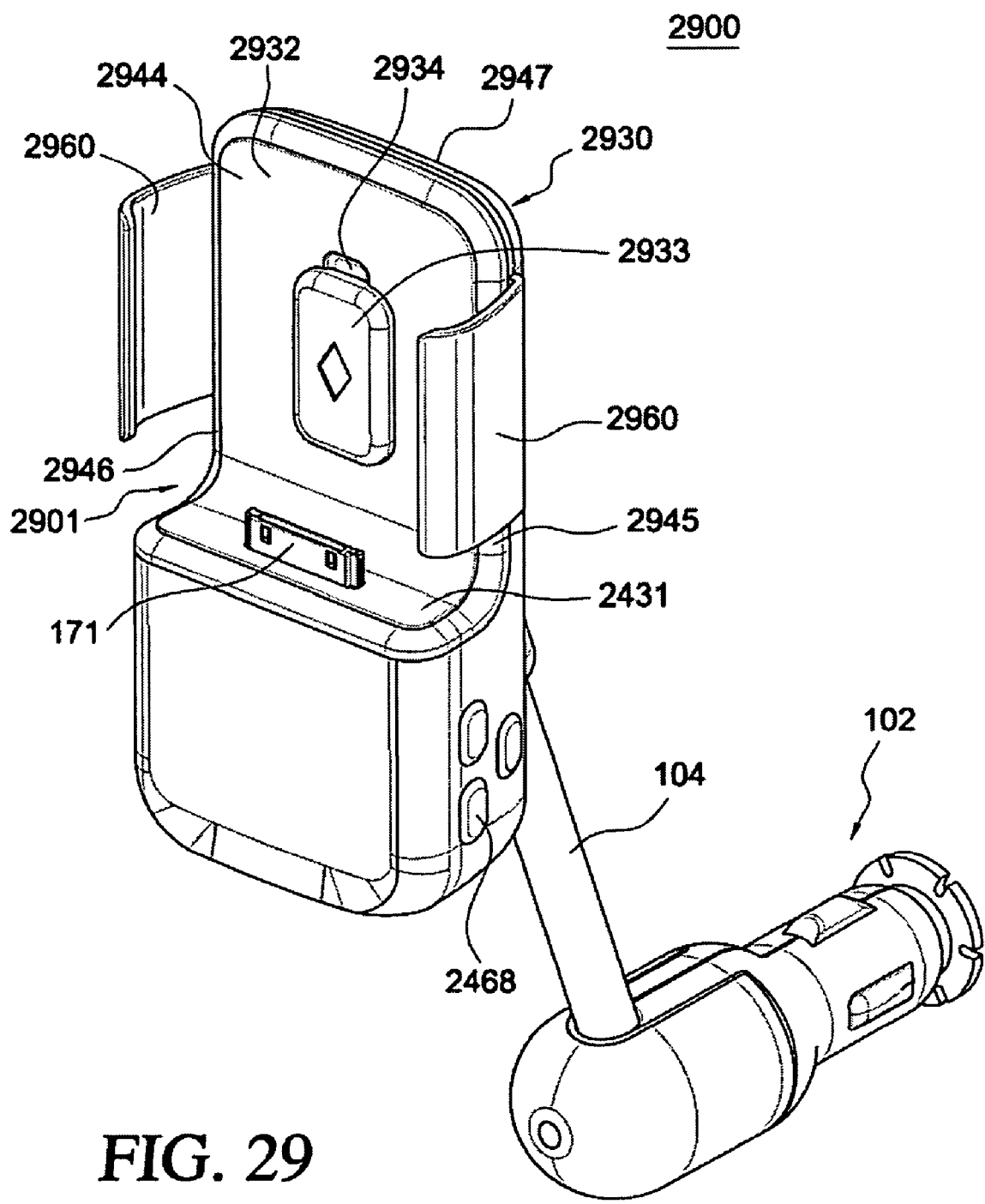
FIG. 29 is a front perspective representational view of a fifth embodiment of the electronic device.
Figure 30:
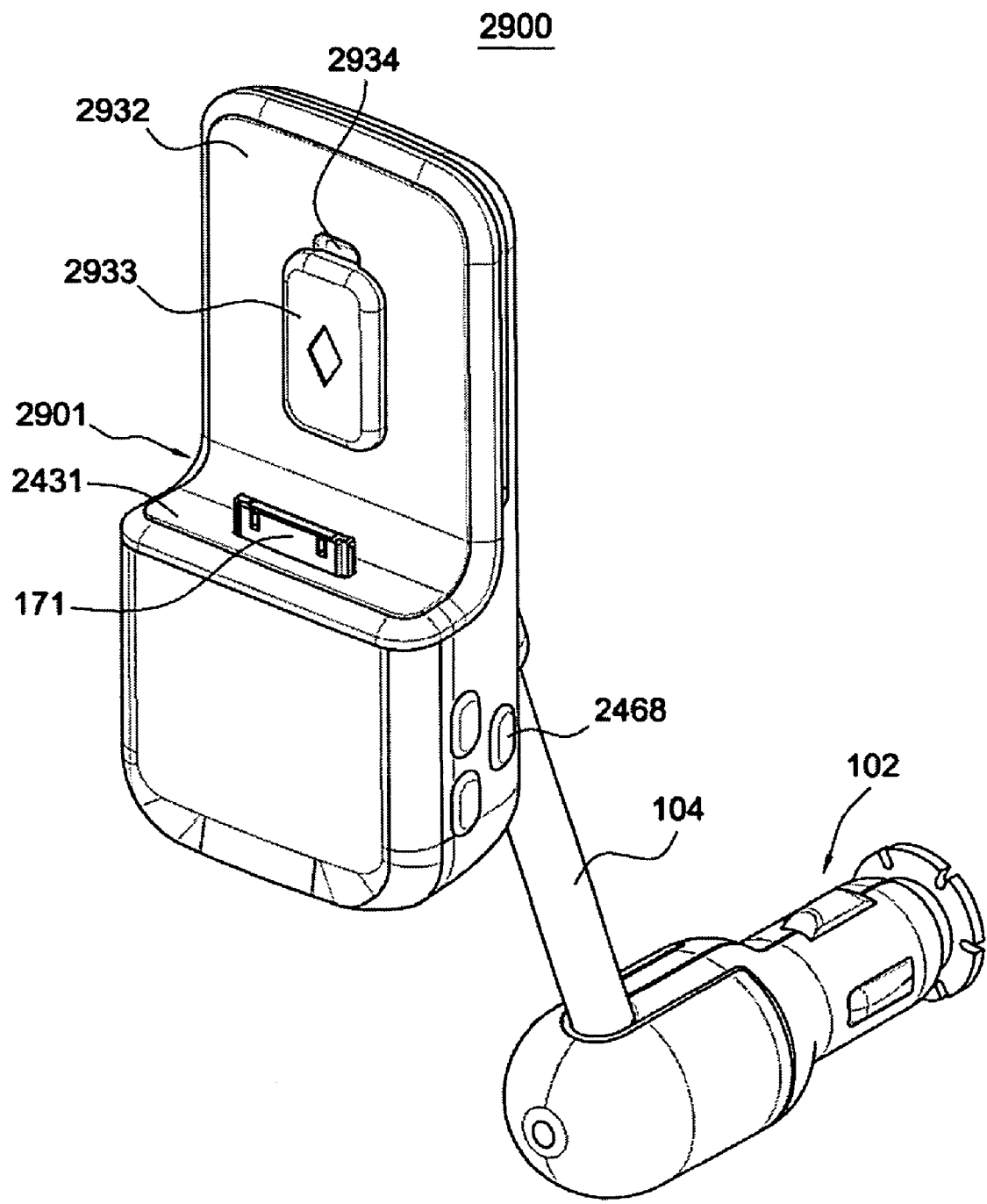
FIG. 30 is a right-side view of the electronic device of FIG. 29, according to the fifth embodiment.
Figure 31:
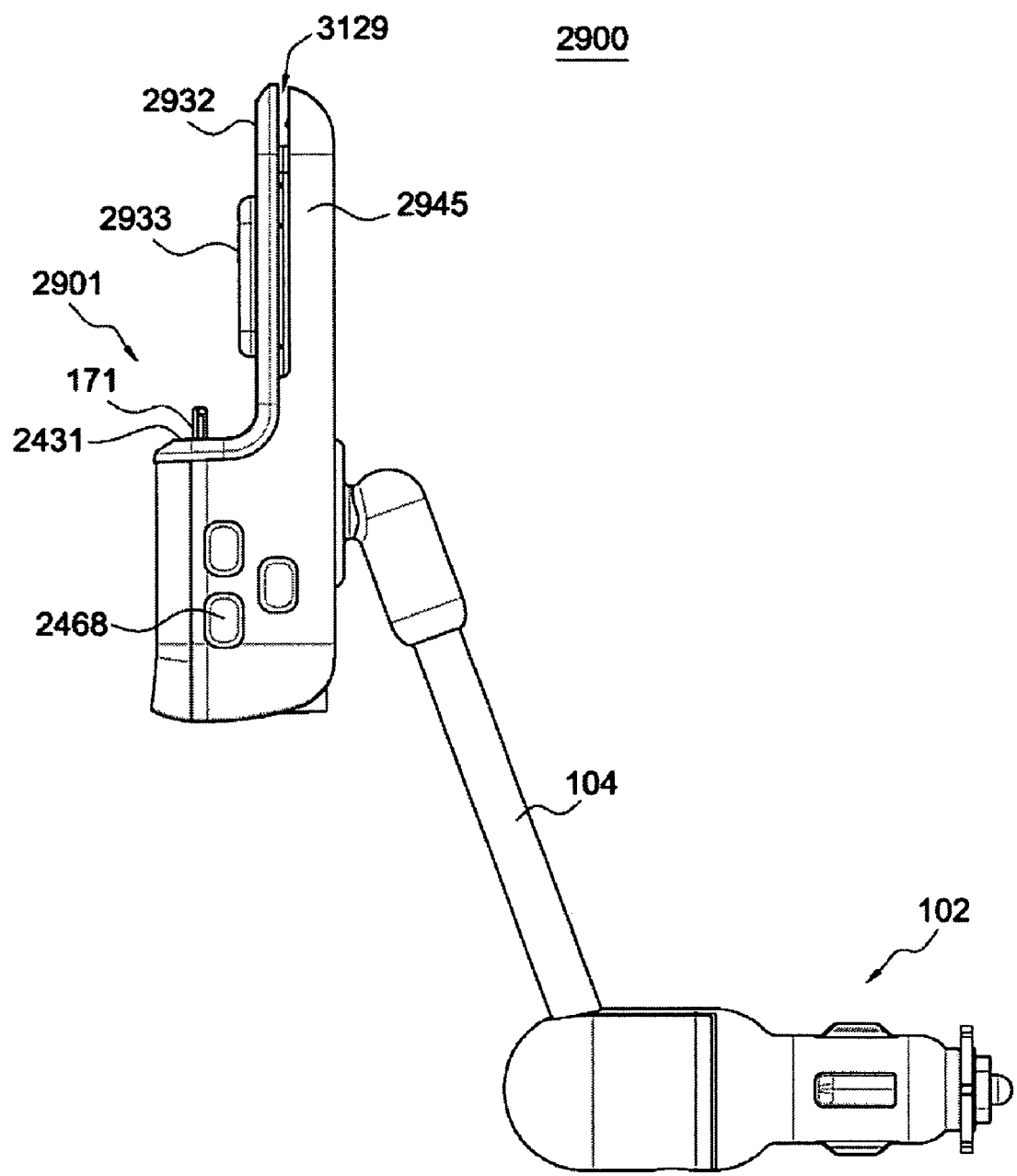
FIG. 31 is a front perspective view of four side supports for the electronic device, according to the fifth embodiment.
Figure 32:
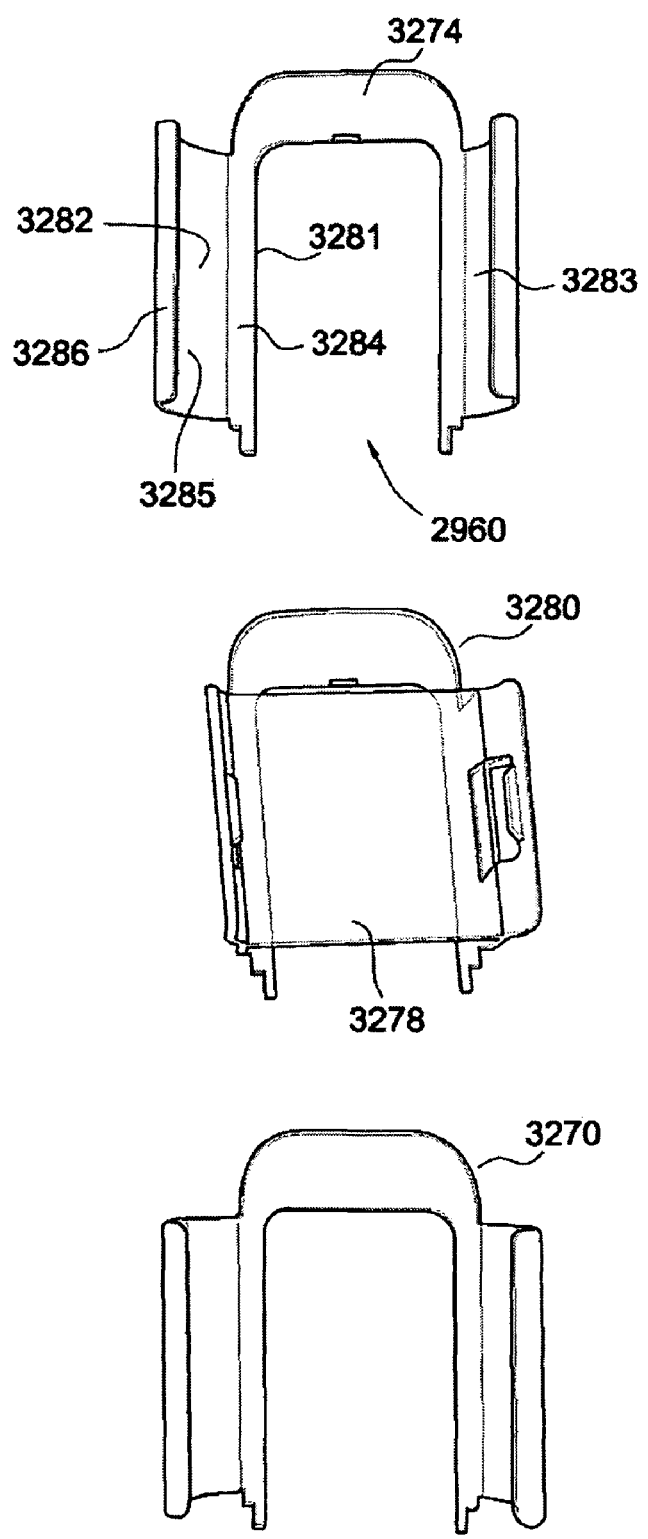
FIG. 32 is a front perspective representational view of a sixth embodiment of the electronic device.

Turning to yet other embodiments, FIG. 29 is a front perspective, representational view of an electronic device 2900 with side support 2960, according to a fifth embodiment. FIG. 30 is a front perspective, representational view of an electronic device 2900, according to a fifth embodiment. FIG. 31 is a right-side view of electronic device 2900, according to the fifth embodiment. FIG. 32 is a front perspective view of three side supports for electronic device 2900, according to the fifth embodiment.

In some examples, an electronic accessory or device 2900 is configured to hold at least two media players 2550 (FIG. 25). That is, electronic device 2900 is configured to couple to at least a first media player and a second media player. In the same or different examples, electronic device 2900 is configured to couple media players 2550 to external power supply 105 (FIG. 10).

In many embodiments, electronic device 2900 can include: (a) a holding structure or a holder 2901 configured to hold media players 2550; (b) a power unit 102; (c) a transmitter 2880 (FIG. 28) mechanically coupled to holder 2401; (d) a compressor 2870 (FIG. 28) for modifying electrical signals from media players 2550; (e) an amplifier 2875 (FIG. 28); (f) buttons 2468; and (g) connector 104. Holder 2401 can be configured to hold, at a given time, only one of media players 2550.

Electronic device 2900 is identical or similar to electronic device 2400 (FIG. 24) except that electronic device 2900 is configured to coupled to side supports 2960, 3270, and 3280 (FIG. 32) instead of side supports 2460 and 2760 (FIG. 27). As describe in detail below, side supports 2960, 3270, and 3280 (FIG. 32) have a unitary structure. That is, instead of the side support including a two separate side supports, side supports 2960, 3270, and 3280 (FIG. 32) can each include a single support that supports media players 2550.

As illustrated in FIGS. 29-31, holder 2901 can include: (a) a base or cradle 2930 configured to couple to at least two of media players 2550; (b) dock connector 171; and (c) side supports 2960 removably coupleable to cradle 2930. Cradle 2930 can be configured to couple to, at a given time, only one of media players 2550. Similarly, side supports 2960 can be configured to couple to only one of media players 2550, at a given time.

In numerous embodiments, cradle 2930 can include: (a) a base portion 2431 coupled to power unit 102 and include dock connector 171; (b) an extension portion 2932 extending away from base portion 2431 and configured to removably couple to side support 2960; and (c) a spacer pad 2933 removably coupled to extension portion 2932.

Extension portion 2932 includes: (a) a side 2944 coupled to base portion 2431; (b) a side 2945 adjacent to side 2944 and configured to removably couple side support 2960; (c) a side 2946 adjacent to side 2944 and opposite side 2945 and configured to removably couple side support 2960; and (d) a side 2947 adjacent to sides 2944, 2945, and 2946 and configured to removably couple side support 2960.

In some embodiments, extension portion 2932 includes a groove 3129 that extends from side 2946 through side 2947 into side 2945, as partially shown in FIG. 31. That is, in this embodiment, extension portion 2932 includes a single groove 3129 that extends through sides 2945, 2946, and 2947. In other embodiments, sides 2945, 2946, and 2947 can include other connection mechanisms, and side supports 2960 can include complementary connection mechanisms.

Spacer pad 2933 can help provide support to the back side of media players 2550 when media players 2550 is coupled to cradle 2930. The thickness of media players 2550 can vary and spacer pad 2933; along with other spacer pads (not shown), allow electronic device 2900 to securely hold or couple to media devices of various thickness.

Spacer pad 2933 can be used when a first media player of media players 2550 with a first thickness is coupled to cradle 2930. Spacer pad 2933 can be replaced with another spacer pad with a second thickness when electronic device 2900 is coupled to a a second media device of media players 2550 with a thickness different than the thickness of the first media player of media players 2550. In some examples, spacer pad 2933 includes connection mechanism (e.g. a snap) that allows easy coupling and decoupling of spacer pad 2933 from electronic device 2900.

In some examples, spacer pad 2933 or other spacer pads are only used with some media players. For example, the thickness of some media players can be large enough such that these media players do not need a spacer pad to securely couple to cradle 2930. In other examples, a spacer pad is unnecessary if a side support is design to be used without a spacer pad. In various examples, spacer pads are not used with small media players. Instead, the side support can contain a back support for the media player. As illustrated in FIG. 28, in one embodiment, side support 3280 (FIG. 32) include a back support 3278 for the back side of the media player because side support 3280 is designed to secure small media players to cradle 2930 (FIG. 29).

As shown in FIG. 32, in some embodiments, side support 2960 can include: (a) a connection mechanism 3281 configured to removably couple to extension portion 2932, and (b) arms 3282 and 3283 and (c) a connecting region 3274 coupling arms 3282 and 3283. Arm 3282 can include: (a) a proximal end 3284 coupled to connection mechanism 3281; (b) a distal end 3286; and (c) a body 3285 extending between distal end 3286 and proximal end 3284. Body 3285 can be curved, bent, or arced in one or more places to hold better media players 2550. For example, body 3285 can be bent to conform to the shape of media players 2550. Arm 3283 can be identical or similar to arm 3282.

Side supports 3270 and 3280 can be similar to side support 2960 except that side supports 3270 and 3280 can be designed to work with media player with different shapes and sizes. In some examples, side support 3280 can also include a back support 3278, as previously discussed. In the illustrated embodiment, cradle 2430 is configured to couple, at any particular time, to only side supports 2960, side support 3270, or side supports 3280.

Side supports 3270 and 3280 can also be coupled to cradle 2930 in the same manner that side support 2960 is coupled to cradle 2430. Assuming media players 2550 shown in FIG. 25 is the first media player, side support 2960 can be coupled to and/or securely holds the first media player to electronic device 2900.

In the same or a different embodiment, side support 3270 can be configured to couple and/or securely hold a second media player to electronic device 2900. In the same or a different embodiment, side support 3280 can be configured to couple and/or securely hold a third media player to electronic device 2900.

The size and shape of side supports 2960, 3270, and 3280 can correspond to the size and shape of media players 2550. For example, the second media player can be larger than the first media player and the third media player can be small than the first media player. Regardless of these physical configurations, side supports 2960, 3270, and 3280 can be comprised of the same or different materials used for holder 101 of FIGS. 1-8 and 12.

Figure 33:
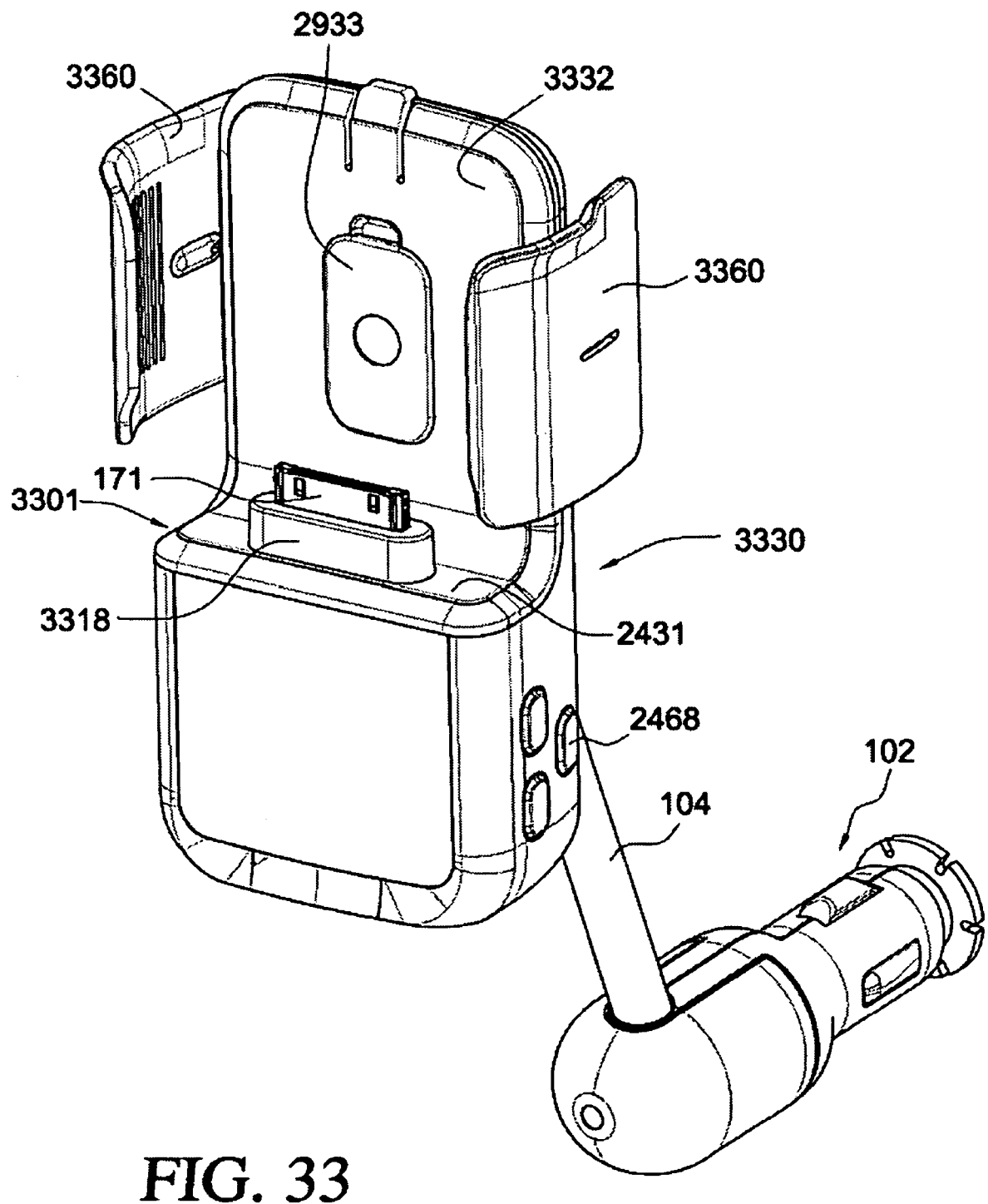
FIG. 33 is a front perspective, representational view of the electronic device of FIG. 32 coupled to a media player, according to the sixth embodiment of the electronic device.
Figure 34:
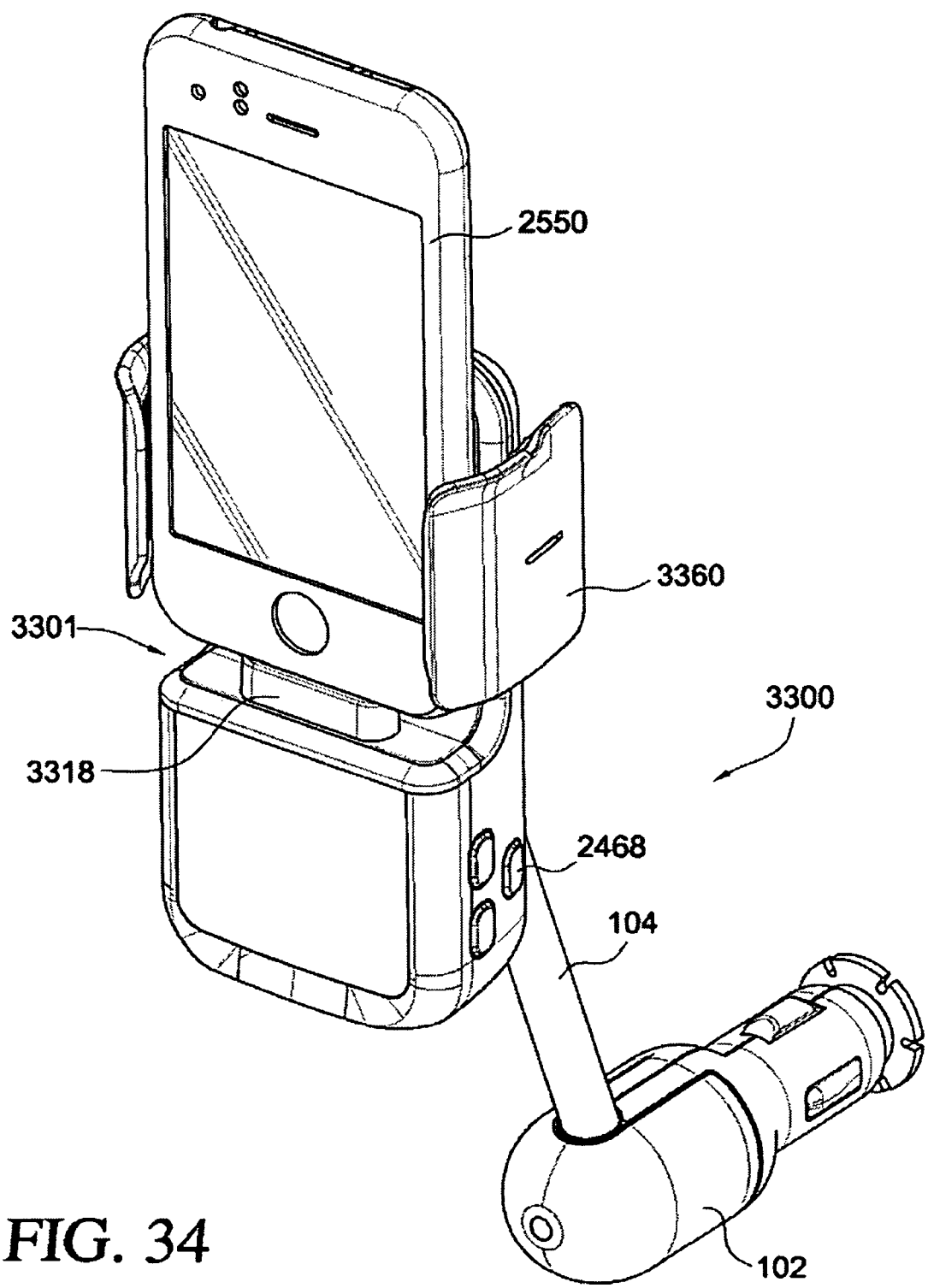
FIG. 34 is a front perspective, representational view of an electronic device of FIG. 32 with side support coupled to media players of FIG. 32, according to a sixth embodiment.
Figure 35:
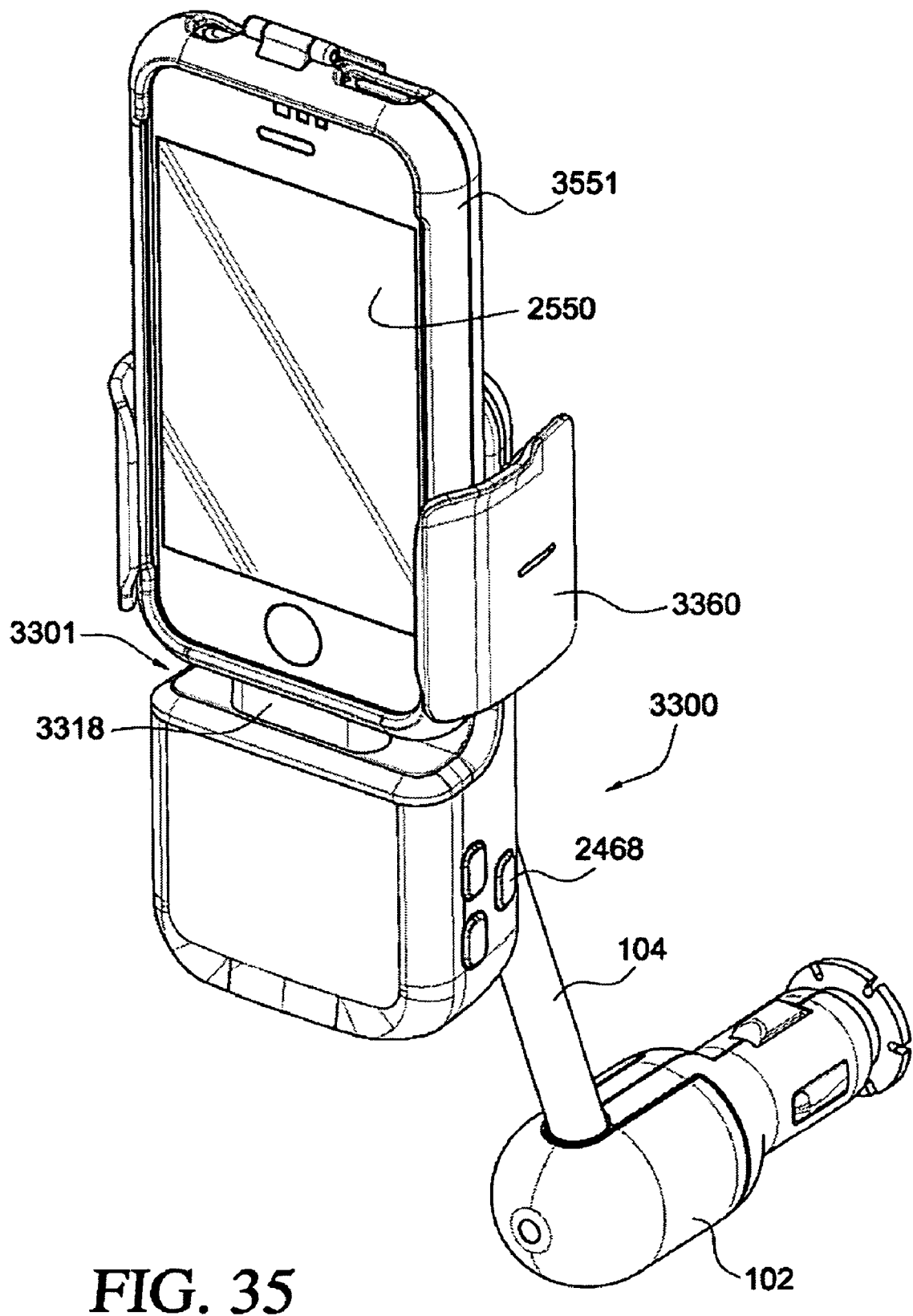
FIG. 35 is a front perspective, representational view of an electronic device of FIG. 32 with side support coupled to media player of FIG. 33, according to a sixth embodiment.
Figure 36:
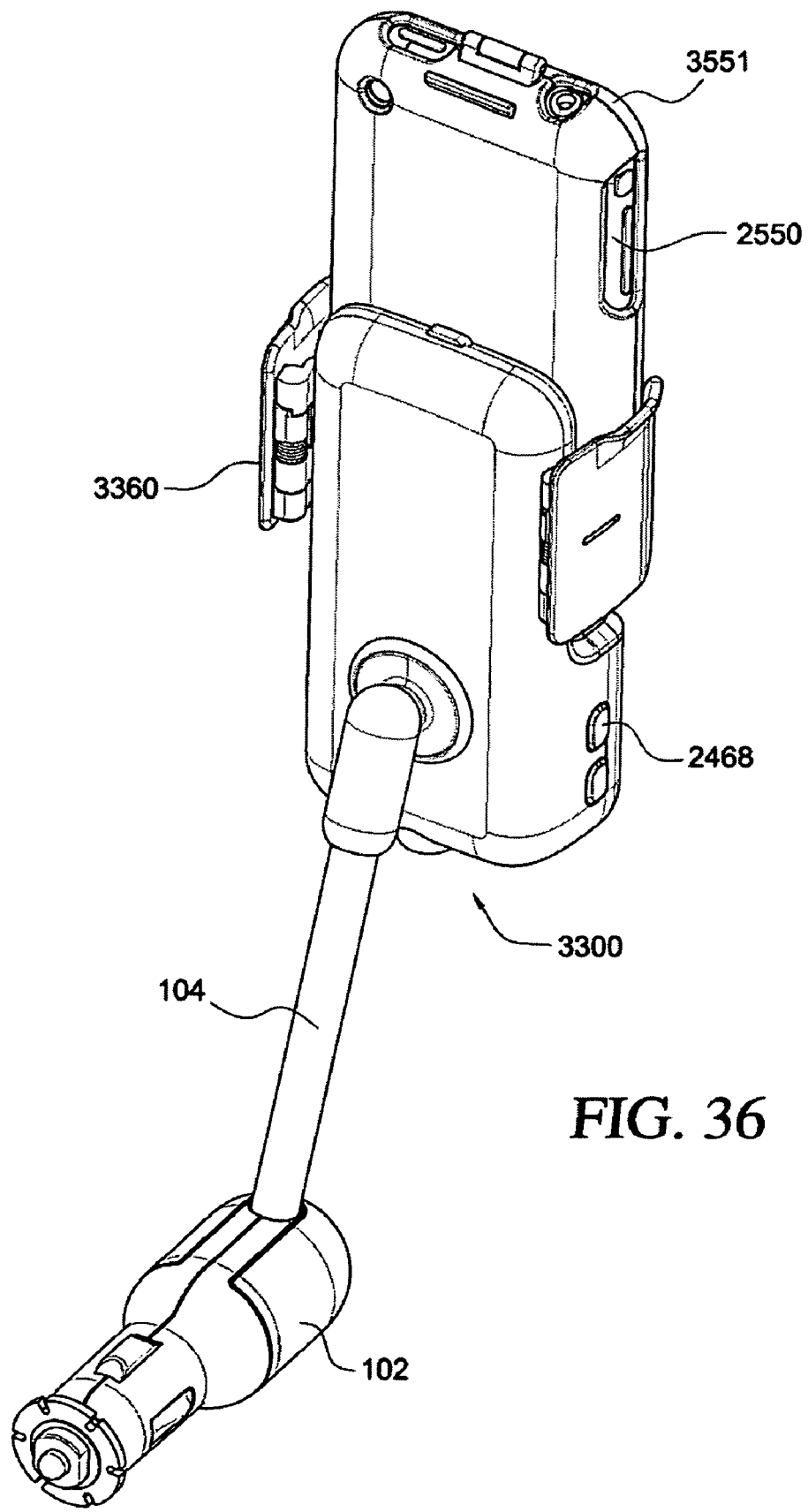
FIG. 36 is a back perspective, representational view of an electronic device of FIG. 32 with side support coupled to media players of FIG. 33, according to a sixth embodiment.

Turning to additional embodiments, FIG. 33 is a front perspective, representational view of an electronic device 3300 with side support 3360, according to a sixth embodiment. FIG. 34 is a front perspective, representational view of an electronic device 2900 with side support 3360 coupled to media players 2550, according to a sixth embodiment. FIG. 35 is a front perspective, representational view of an electronic device 2900 with side support 3360 coupled to media players 2550, according to a sixth embodiment. FIG. 36 is a back perspective, representational view of an electronic device 2900 with side support 3360 coupled to media players 2550, according to a sixth embodiment.

In the examples illustrated in FIGS. 35 and 36, media players 2550 are inside of a case 3551. Media players 2550 shown in FIGS. 34-36 can be a second media player of media players 2550. The media player shown in FIGS. 1-6, 16-18, 21, 23, and 25 can be a first media player of media players 2550.

In some examples, an electronic accessory or device 3300 is configured to hold at least two media players 2550 (FIG. 25). That is, electronic device 3300 is configured to couple to at least a first media player and a second media player. In the same or different examples, electronic device 3300 is configured to couple media players 2550 to external power supply 105 (FIG. 10).

Electronic device 3300 can be coupled to various media players 2550 while media players 2550 are inside of case 3551. This feature provides a significant improvement over electrical devices of the prior art because media players had to be removed from their cases before a user coupled the media player to the electrical device of the prior art. The need to remove the media player from its case annoys and frustrates users and exposed the media player to environmental hazards.

In many embodiments, electronic device 3300 can include: (a) a holding structure or a holder 3301 configured to hold media players 2550; (b) a power unit 102, (c) a transmitter 2880 (FIG. 28) mechanically coupled to holder 2401; (d) a compressor 2870 (FIG. 28) for modifying electrical signals from media players 2550; (e) an amplifier 2875 (FIG. 28); (f) buttons 2468; and (g) connector 104. Holder 3301 can be configured to hold, at a given time, only one of media players 2550.

As illustrated in FIGS. 33-34, holder 3301 can include: (a) a base or cradle 3330 configured to couple to at least two of media players 2550; (b) dock connector 171; (c) a neck 3318; and (d) a side supports 3360 coupled to cradle 3330. Cradle 3330 and side supports 3360 can be configured to couple to, at a given time, only one of media players 2550.

In numerous embodiments, cradle 2930 can include: (a) a base portion 2431 coupled to power unit 102 and neck 3318; (b) an extension portion 3332 extending away from base portion 2431 and couple to side support 3360; and (c) a spacer pad 2933 removably coupled to extension portion 3332. In some examples, side support 3360 is removable coupled to extension portion 3332. In other examples, because side supports 3360 are configured to work with all sizes of media players within a predetermined range, there is not need for side support 3360 to be removable.

Neck 3318 provides space between base portion 2431 and media players 2550 when media players 2550 are coupled to electrical device 3300. That is, neck 3318 allows electrical device 3300 to couple to media players 2550 while media players 2550 is inside of case 3551 by providing room for case 3551 between base portion 2431 and media players 2550 while maintaining a good coupling between media players 2550 and dock connector 171.

In one embodiment, the width and length of the neck 3318 is the width and length of dock connector 171 plus a minimum wall thickness necessary to guarantee stability. In the same or different embodiments, the dimensions of neck 3318 can be related to the dimensions of case 1050. For example, the height of neck 3318 can be greater than the thickness of most protective cases, or the thickness of protective cases made by one specific manufacturer. In one embodiment, the length and width of neck 3318 can be set to be smaller than the width and length of the opening in most protective cases or one specific brand of protective case. Setting the dimensions of neck 3318 in relation to the dimensions of the protective cases ensures a good coupling can be achieved between media players 2550 and dock connector 171 when most brands of protective cases are used.

Figure 37:
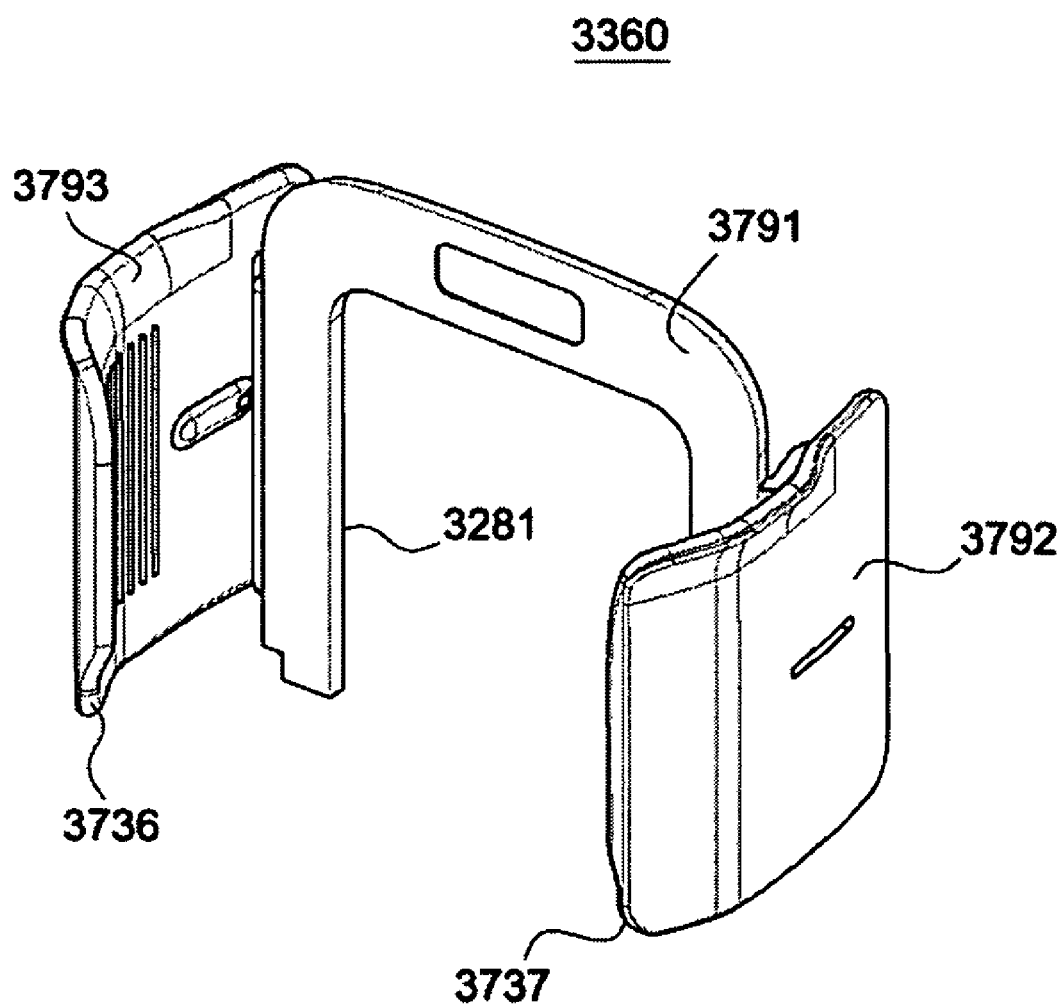
FIG. 37 is a front perspective view of side support for electronic device of FIG. 32, according to the sixth embodiment.
Figure 38:
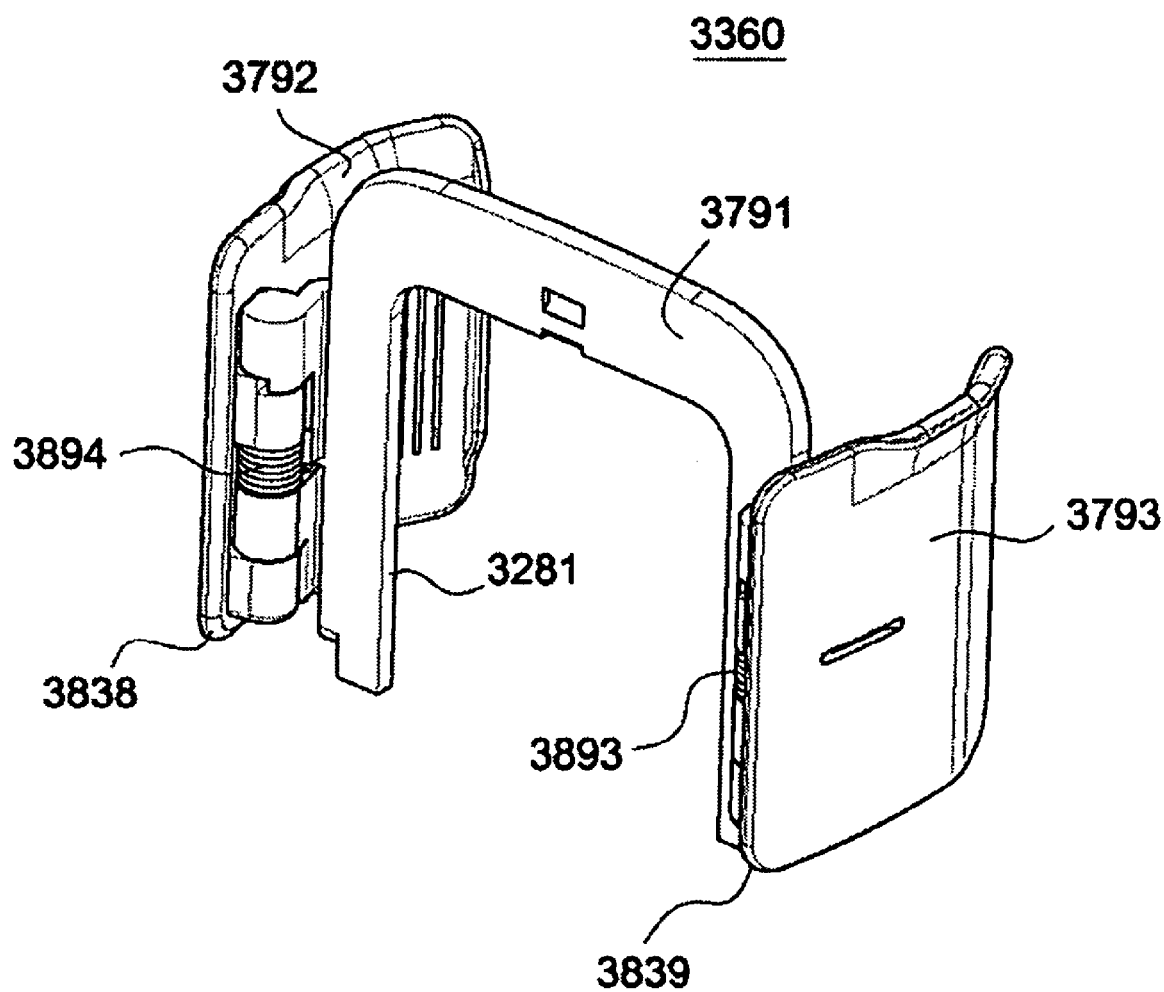
FIG. 38 is a rear perspective view of side support of FIG. 37 for electronic device of FIG. 32, according to the sixth embodiment.
Figure 39:
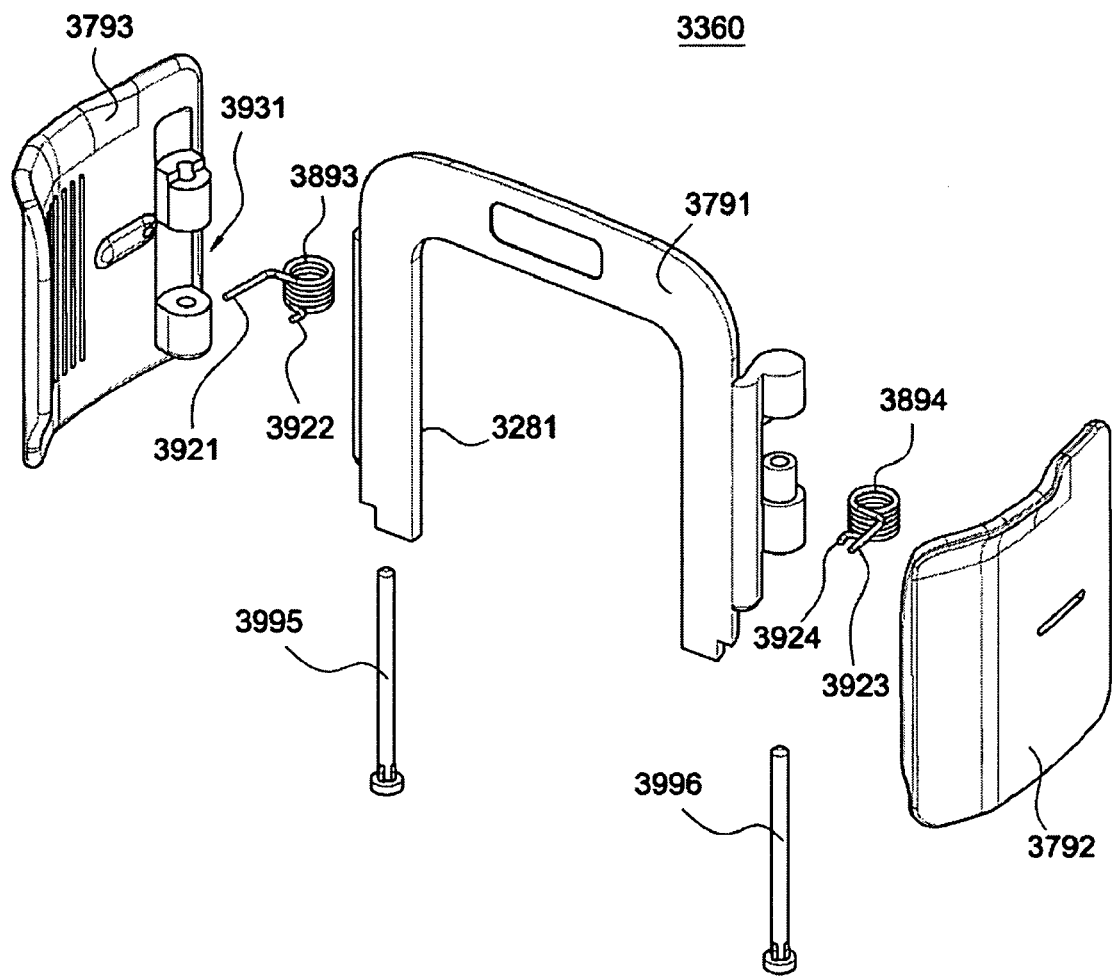
FIG. 39 is an exploded view of side support of FIG. 37, according to the sixth embodiment.
Figure 40:
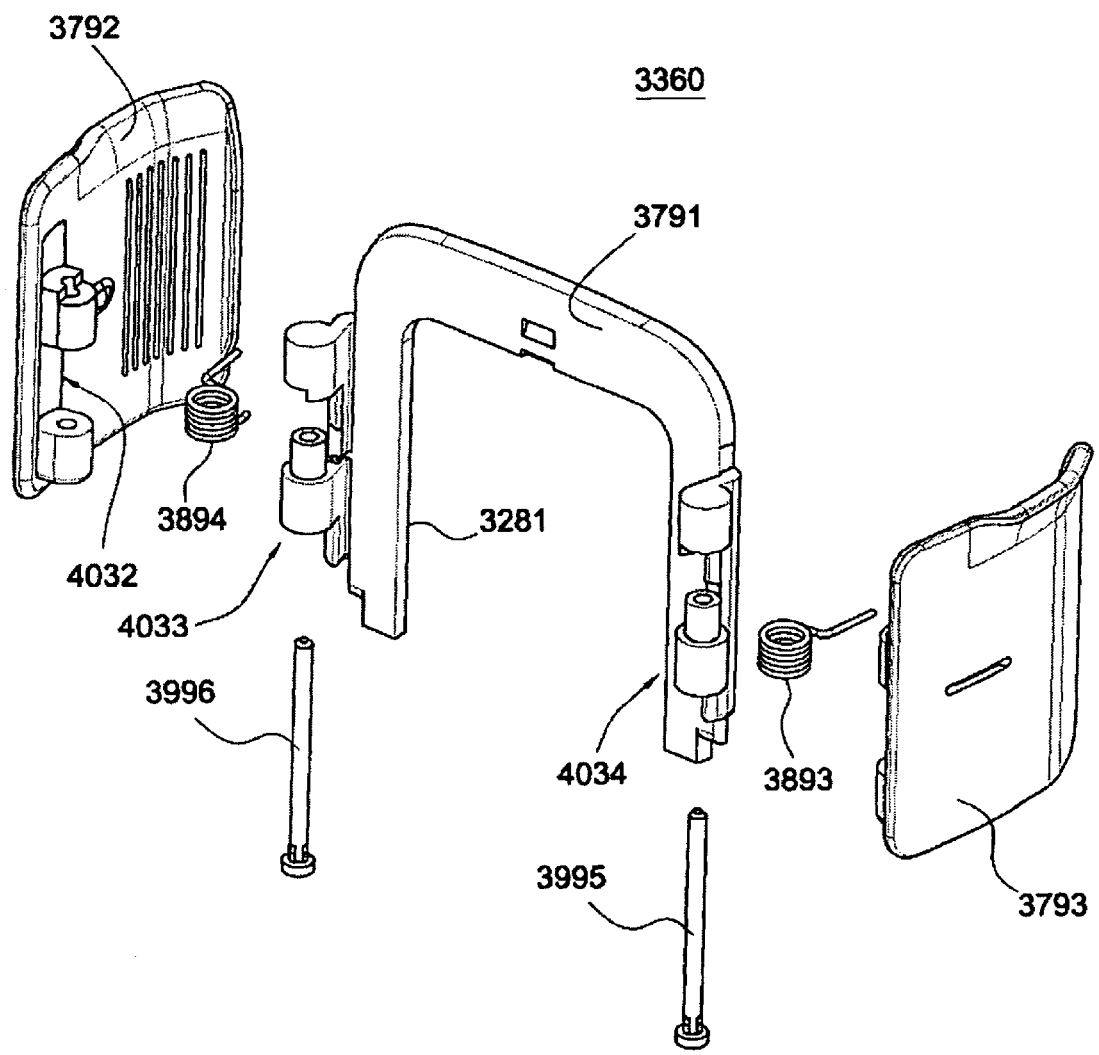
FIG. 40 is an exploded view of side support of FIG. 37, according to the sixth embodiment.

FIG. 37 is a front perspective view of side support 3360 for electronic device 2900, according to the sixth embodiment. FIG. 38 is a rear perspective view of side support 3360 for electronic device 2900, according to the sixth embodiment. FIG. 39 is an exploded view of side support 3360, according to the sixth embodiment. FIG. 40 is an exploded view of side support 3360, according to the sixth embodiment.

Side support 3360 can include: (a) a connecting region 3791; (b) a connection mechanism 3281 configured to removably couple to extension portion 3332; and (c) arms 3792 and 3793; (d) springs 3893 and 3894; and (e) pins 3995 and 3996.

In this example, electrical device 3300 uses arms 3792 and 3793 to apply pressure to the sides of media players 2550. Arms 3792 and 3793 are attached to and hinged to connection region 3791 using springs 3893, 3894 and pins 3995, 3996. In some examples, end 3921 of spring 3893 is coupled to arm 3793 and end 3922 of spring 3893 is coupled to connecting region 3791. Similarly, end 3923 of spring 3894 is coupled to arm 3792 and end 3924 of spring 3894 is coupled to connecting region 3791. In some examples, springs 3893 and 3894 can be metal coil torsion springs. The tension created by springs 3893 and 3894 can be used to couple and secure media players 2550 to electrical device 3300. That is, springs 3893 and 3894 in combination with arm 3793 and 3792, respectively, are two resiliently biased clamping mechanism that can be used to help secure electric device 3300 to media players 2550.

Pins 3995 and 3996 can be used to couple connection region 3791 to arms 3792 and 3793, respectively. Pin 3995 can be inserted into coupling mechanism 3931 (FIG. 39) of arm 3793 and coupling mechanism 4034 (FIG. 40) of connection region 3791 to secure arm 3793 to connection region 3791. Similarly, pin 3996 can be inserted into coupling mechanism 4032 (FIG. 40) of arm 3793 and coupling mechanism 4033 (FIG. 40) of connection region 3791 to secure arm 3792 to connection region 3791.

To couple media players 2550 to electrical device 3300, a user can squeeze or pinch ends 3838 (FIG. 38) of arm 3792 and end 3839 (FIG. 38) of arm 3793 to increase the distance between end 3736 (FIG. 37) of arm 3793 and end 3737 (FIG. 37) of arm 3792. While squeezing ends 3838 and 3839 together, the user can couple media players 2550 to electrical device 3300. After media players 2550 is inserted, the user can release ends 3838 and 3839 and springs 3893 and 3894 can create tension between arms 3792 and 3793 and media players 2550. This tension holds and secures media players 2550 to electrical device 3300.

In other embodiments, other mechanisms, instead of using springs 3893 and 3894 and pins 3995 and 3996, can be used to couple arms 3793 and 3792, respectively, to connection region 3791, other mechanisms can be used. For example, arms 3793 and 3792 can be coupled to connection region 3791 using a flexible plastic or resin material that can flexed. The flexible plastic or resin can be resiliently biased and provided the same clamping feature created by use springs 3893 and 3894 and pins 3995 and 3996. In some embodiments, the flexibility in the plastic or resin material coupling arms 3793 and 3792 and connection region 3791 can be provide by a flexible metal bar (e.g. a flat lead spring) embedded in the plastic or resin material.

Figure 41:
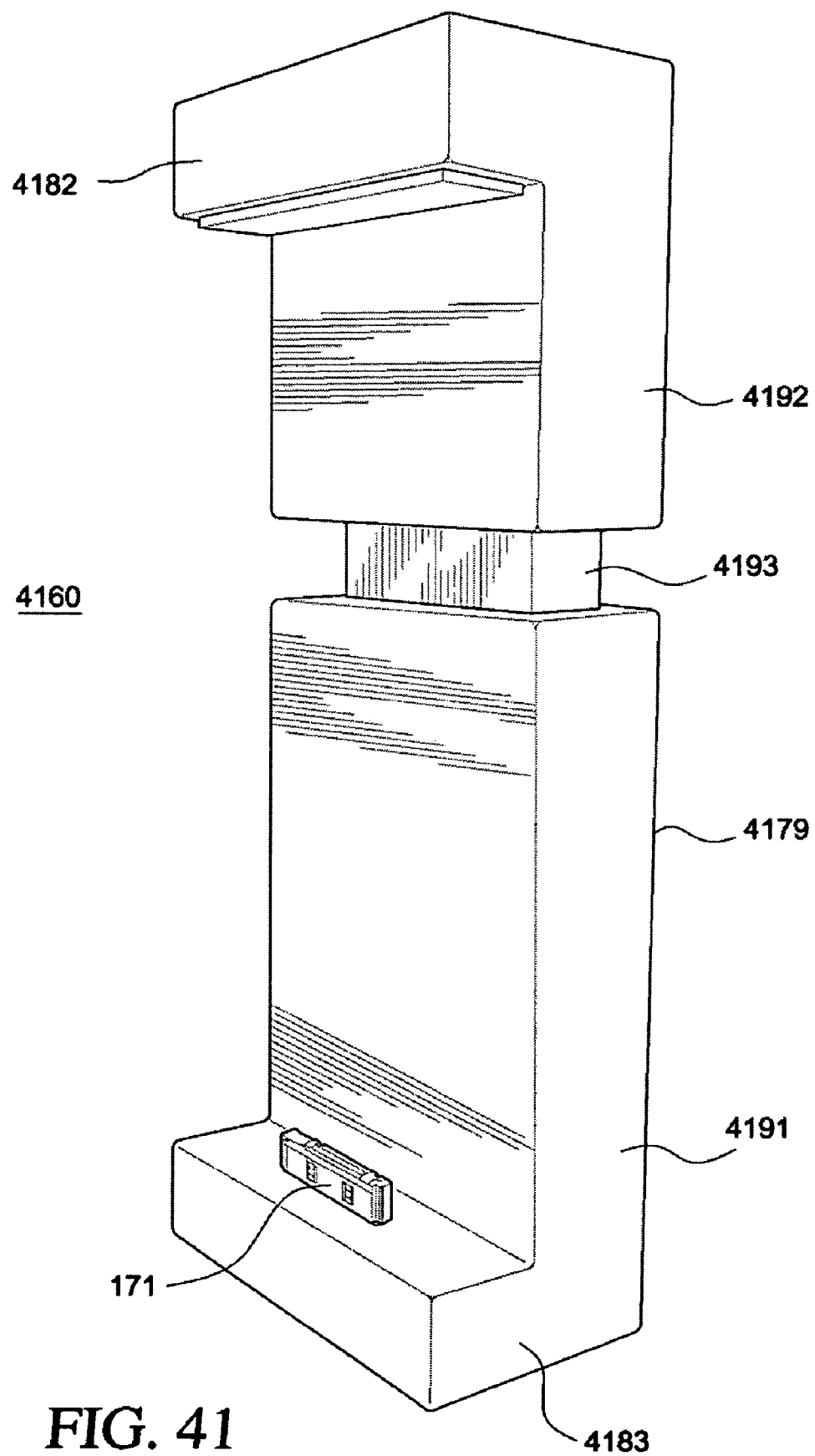
FIG. 41 is a front perspective view of a cradle for an electronic device, according to a seventh embodiment.
Figure 42:
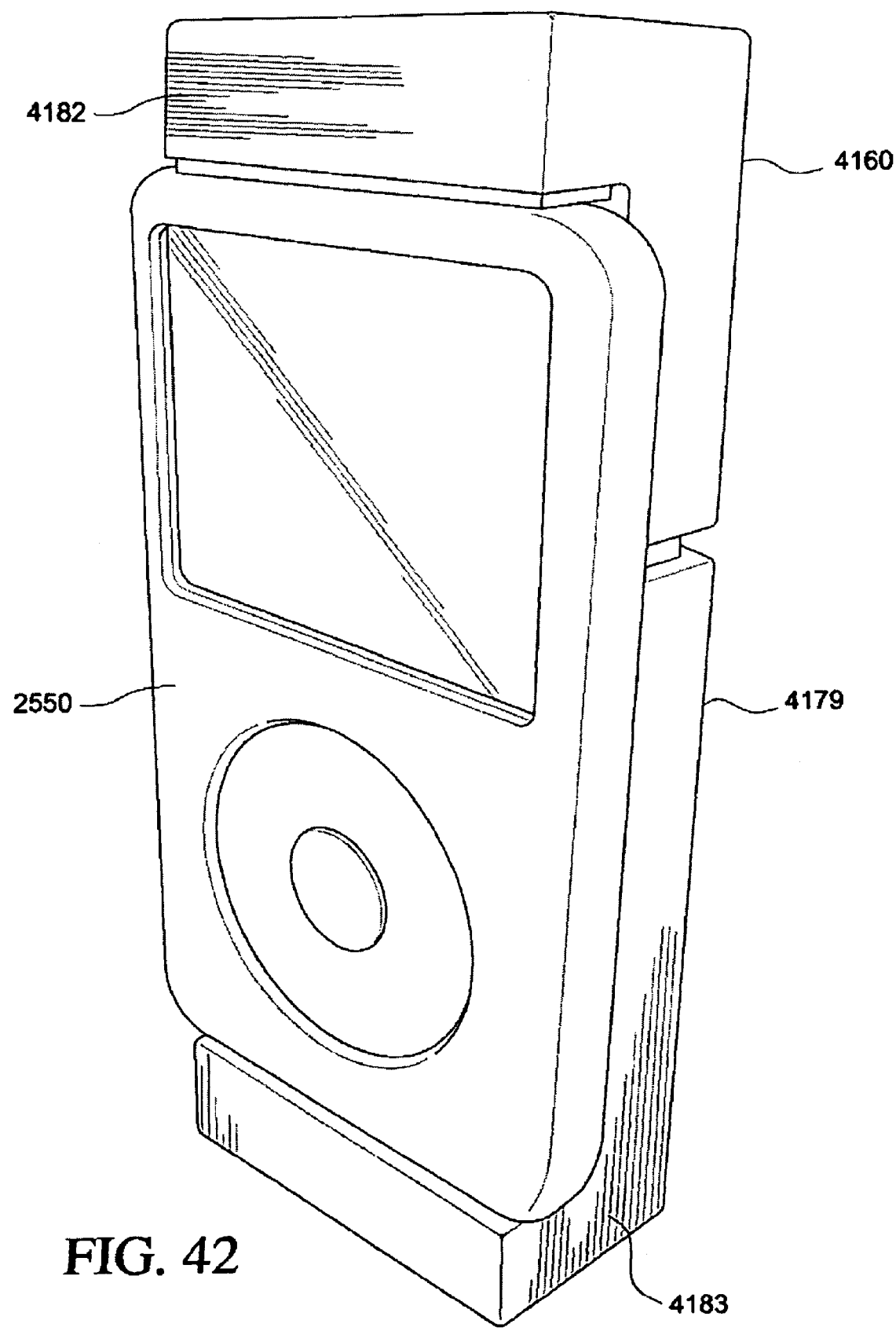
FIG. 42 is a front perspective view of cradle of FIG. 41 coupled to a media player, according to the seventh embodiment.

FIG. 41 is a front perspective view of a cradle 4130, according to a seventh embodiment. FIG. 42 is a front perspective view of cradle 4160 coupled to media players 2550, according to the seventh embodiment.

In the embodiment illustrated in FIGS. 41 and 42, cradle 4160 includes: (a) arms 4183 and 4182; (b) an adjustable body 4179; and (c) dock connector 171 protruding from arm 4183. In these embodiments, arms 4183 and 4182 securely coupled to the top and bottom portions of media players 2550. The length of body 4179 can be adjusted depending on the length of the media player coupled to cradle 4160. That is, if a first media has a first length and a second media player has a second length, the length of body 4179 can be adjusted to be proportion to the first length when coupled to the first media player and proportional to the second length when coupled to the second media player.

In some examples, body 4179 includes: (a) a first part 4191; (b) a second part 4192; and (c) a third part 4193 coupling first part 4191 and second part 4192. Third part 4193 is located at least partially within first part 4191 and second part 4192. The length of body 4179 is adjusted by changing the amount of third part 4193 located inside of either of first part 4191 or second part 4192. That is, the length of body 4179 can be lengthened by sliding a larger portion of third portion 4193 out of first part 4191 or second part 4192. In other examples, other methods or mechanism can be used to change the length of body 4179.

Figure 43:
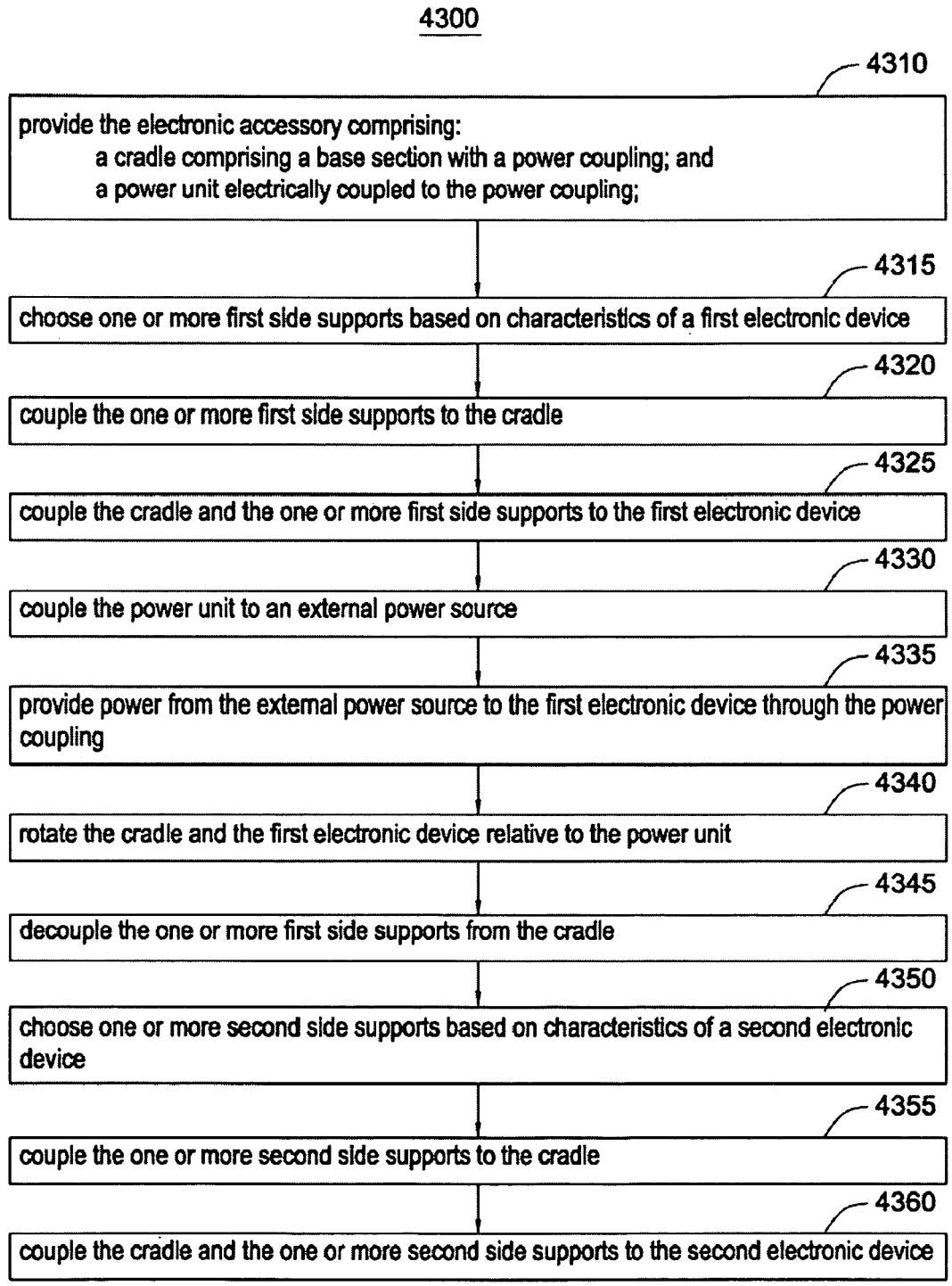
FIG. 43 illustrates a flow chart for an embodiment of a method of using an electronic accessory.

FIG. 43 illustrates a flow chart 4300 for an embodiment of a method of using an electronic accessory. Flow chart 4300 in FIG. 43 includes a step 4310 of providing an electronic accessory including: (a) a cradle having a base section with a power coupling; and (b) a power unit electrically coupled to the power coupling. As an example, the electronic accessory can be identical to or similar to electronic device 2400, 2900, or 3300 as shown in FIGS. 24, 29, and 33, respectively. The cradle can be identical to or similar to cradle 2430, 3330, or 4160, as illustrated in FIGS. 24, 33, and 41, respectively. The base section and the power unit can be identical to or similar to base portion 2431, and power unit 102, respectively, as illustrated in FIG. 24.

Flow chart 4300 in FIG. 43 continues with a step 4315 of choosing one or more first side supports based on characteristics of a first electronic device. For example, the one or more side supports can be identical to or similar to any of side supports 2461, 2462, 2761, and 2762 as shown in FIG. 27 or side supports 2960, 3270, and 3280 in FIG. 32. In some embodiments, the one or more side supports of step 4315 are shaped and sized to correspond to the first electronic device. In these embodiments, the side supports chosen would be the side supports sized and shaped to correspond to the first electronic device. For example, if the first electrical device is an iPod Mini, side supports 2461 and 2462 can be chosen because these side supports are designed based on the characteristics of the iPod Mini in one example.

In other embodiments, a single side support can be designed to work with media players of various size and shapes. For example, the side support can be identical or similar to side support 3360 of FIG. 33. In these embodiments, step 4315 can be omitted or skipped.

Next, flow chart 4300 in FIG. 43 includes a step 4320 of coupling the one or more first side supports to the cradle. As an example, coupling the one or more first side supports to the cradle can be identical to or similar to the coupling of side support 2461 and 2462 to cradle 2430 as shown in FIG. 24 or the coupling of side supports 2761 and 2762 to cradle 2430. The coupling of the one or more side supports can also be identical or similar to the coupling of side supports 2960, 3270, or 3280 to electrical device 2900. In other embodiments, the side support can be permanently coupled to the electrical device and step 4320 can be skipped.

Flow chart 4300 in FIG. 43 continues with a step 4325 of coupling the cradle and the one or more first side supports to the first electronic device. For example, coupling the cradle and the one or more first side supports to the first electronic device can be identical to or similar to the coupling of cradle 2430 and side supports 2461 and 2462 to the first media player, as shown in FIG. 25 or the coupling cradle 3330 and side support 3360 to the second media player, as shown in FIGS. 34-36.

Subsequently, flow chart 4300 in FIG. 43 includes a step 4330 of coupling the power unit to an external power source. As an example, the coupling of the power unit to an external power source can be similar to the coupling of power unit 102 to external power supply 105, as shown in FIGS. 10 and 11.

Next, flow chart 4300 in FIG. 43 includes a step 4335 of providing power from the external power supply to the first electronic device through a power coupling. As an example, the power coupling of the step 4335 can be similar to the power coupling of dock connector 171 in FIGS. 24 and 26.

Flow chart 4300 in FIG. 43 continues with a step 4340 of rotating the cradle and the first electronic device relative to the power unit. In some embodiments, step 4340 can further include using the one or more first side supports to provide support to the first electronic device during the rotation of the cradle and the first electronic device.

Flow chart 4300 in FIG. 43 additionally can include a step 4345 of decoupling the one or more first side supports from the cradle. For example, the cradle decoupled from the one or more side supports can be identical to or substantially similar to cradle 2430 as shown in FIG. 26.

Furthermore, flow chart 4300 in FIG. 43 includes a step 4350 of choosing one or more second side supports based on characteristics of a second electronic device. For example, the one or more second side supports can be similar to the side supports 2760 as shown in FIG. 27. In some embodiments, one or more of side supports 2760 are design and/or configured to hold the second electronic device in the cradle. For example, if the second electrical device is an iPod, side supports 2761 and 2762 can be chosen because these side supports are designed based on the characteristics of the iPod. In other embodiments, one of side supports 2960, 3270, and 3280 can be the second side support.

Subsequently, flow chart 4300 in FIG. 43 includes a step 4355 of coupling the one or more second side supports to the cradle. In one example, the second side supports can be coupled to the cradle in a manner identical to or similar to the coupling of side support 2461 and 2462 to cradle 2430 as shown in FIG. 24 or the coupling of side supports 2761 and 2762 to cradle 2430. The coupling of the one or more second side supports can also be identical or similar to the coupling of side supports 2960, 3270, or 3280 to electrical device 2900.

Next, flow chart 4300 in FIG. 43 includes a step 4360 of coupling the cradle and the one or more second side supports to the second electronic device. For example, coupling the cradle and the one or more second side supports to the second electronic device can be similar to or identical to the coupling of cradle 2430 and side supports 2761 and 2762 to the second media player.

Although, flow chart 4300 is illustrated to have a particular sequence of steps, other sequences are contemplated. For example, steps 4315, 4320, and/or 4325 can occur after step 4330. Additionally, steps 4345, 4350, 4355, and/or 4310 can occur before steps 4330, 4335, and/or 4340.

Variations and modifications of what has been described will be apparent to one skilled in the art. For example, although engineering plastic (e.g., acrylonitrile-butadiene-styrene, polyacrylate, phenolformaldehyde resin, polyethylene, polypropylene, polyphenylene oxide, polycarbonate, polyamide (e.g., nylon), polyacetal, polyurethane, polystyrene, polyvinyl chloride, reinforced plastics, ureaformaldehyde resin, etc.) can be used for the various parts of different embodiments (e.g., most of the non-metallic parts of the power acquisition sub-unit and the holder), some or all of those parts may also be made of metal or polymers that are not usually considered to be engineering plastics. As another example, the dimensions may be anything suitable for the electronic device of interest. One or more parts of the unit or accessory may be detachable from the other parts. Furthermore, one or more of the side supports can be used to support two or more media players of different sizes.

The claims are intended to cover all variations and modifications that fall within the true spirit and scope of the invention.

What is claimed is:

1. An electronic accessory for coupling two or more electronic devices to an external power supply, the electronic accessory comprising:
a holder comprising:
a cradle section configured to couple to at least two of the two or more electronic devices, the cradle section comprising a power coupling;
two or more spacer pads, each of the two or more spacer pads is configured to removably couple to the cradle section; and
two or more side supports, each of the two or more side supports is configured to removably couple to the cradle section; and
a power unit electrically coupled to the power coupling and configured to removably couple to the external power supply,
wherein:
at least a first one of the two or more side supports is configured to provide support to a first one of the two or more electronic devices when the first one of the two or more electronic devices is coupled to the cradle section and the at least the first one of the two or more side supports is coupled to the cradle section;
at least a second one of the two or more side supports is configured to provide support to a second one of the two or more electronic devices when the second one of the two or more electronic devices is coupled to the cradle section and the at least the second one of the two or more side supports is coupled to the cradle section;
at least a first one of the two or more spacer pads is configured to provide support to the first one of the two or more electronic devices when the first one of the two or more electronic devices is coupled to the cradle section and the at least the first one of the two or more spacer pads is coupled to the cradle section; and
at least a second one of the two or more spacer pads is configured to provide support to the second one of the two or more electronic devices when the second one of the two or more electronic devices is coupled to the cradle section and the at least the second one of the two or more spacer pads is coupled to the cradle section.

2. The electronic accessory of claim 1, wherein:
the cradle section comprises:
a base portion coupled to the power unit and comprising the power coupling; and
an extension portion extending away from the base portion and configured to removably couple to each of the two or more side supports.

3. The electronic accessory of claim 2, wherein:
the base portion is configured to couple to a first side of the two or more electronic devices.

4. The electronic accessory of claim 2, wherein:
the extension portion comprises:
a first side coupled to the base portion;
a second side adjacent to the first side and configured to removably couple to a first support of the at least the first one of the two or more side supports; and
a third side adjacent to the first side and opposite the second side, the third side configured to removably couple to a second support of the at least the first one of the two or more side supports.

5. The electronic accessory of claim 1 wherein:
the at least one of the two or more side supports is a unitary structure.

6. The electronic accessory of claim 1, wherein:
the cradle section is configured to couple, at any particular time, to only one of the two or more side supports.

7. The electronic accessory of claim 1, wherein:
each of the two or more side supports has a first width; and
the first width of the at least the first one of the two or more side supports is different than the first width of the at least the second one of the two or more side supports.

8. The electronic accessory of claim 1, further comprising:
a transmitter mechanically coupled to the holder,
wherein:
the holder further comprises a signal coupling; and
the signal coupling is electrically coupled to the transmitter and configured to transmit data from the two or more electronic devices to the transmitter when the two or more electronic devices are coupled to the cradle section.

9. The electronic accessory of claim 1, wherein:
each of the two or more side supports comprises:
a connection mechanism configured to removably couple to the cradle section;
at least two arms, each arm of the at least two arms comprising:
a proximal end coupled to the connection mechanism;
a distal end; and
a body extending between the distal end and the proximal end.

10. The electronic accessory of claim 9, wherein:
the first one of the two or more electronic devices comprises:
a bottom side;
a front side having a display and adjacent to the bottom side;
a back side adjacent to the bottom side and opposite the front side; and
a first side adjacent to the front side, the back side, and the bottom side; and
when the at least the first one of the two or more side supports is coupled to the cradle section and the cradle section is coupled to the bottom side of the first one of the at least two or more electronic devices, the distal end of a first one of the two arms of the first side support is adjacent to the front side of the first one of the two or more electronic devices, a portion of the body of the first one of the at least two arms of the first side support is adjacent to the first side of the first one of the two or more electronic devices, and the proximal end of the first one of the at least two arms of the first side support is adjacent to the back side of the first one of the two or more electronic devices.

11. The electronic accessory of claim 9, wherein:
each of the two or more side supports further comprises:
a bridge section coupled to a first arm of the at least two arms and a second arm of the at least two arms.

12. An electronic device to hold two or more media players, each media player of the two or more media players having a first side, a second side, and a third side, the electronic device comprising:
a holding structure configured to hold a first one of the two or more media players and comprising:
at least two clasps; and
a base, the base comprises:
a base portion; and
an extension portion coupled to the base portion and extending away from the base portion; and an electronic component electrically coupleable to the first one of the two or more media players through the holding structure, wherein:

the at least two clasps are removably coupleable to the extension portion;

a first clasp of the at least two clasps is configured to couple to the first side of the first one of the two or more media players;

a second clasp of the at least two clasps is configured to couple to the second side of the first one of the two or more media players;

the extension portion is configured to support the third side of the first one of the two or more media players when the first clasp of the at least two clasps is coupled to the first side of the first one of the two or more media players.

13. The electronic device of claim 12, wherein:

the holding structure is configured to hold, at a given time, only one of the two or more media players;

the holding structure is also configured to hold a second one of the two or more media players having a different size than the first one of the two or more media players; and the electronic component is electrically coupleable to the second one of the two or more media players through the holding structure when the second one of the two or more media players is held by the holding structure.

14. The electronic device of claim 13, wherein:

a third clasp of the at least two clasps is configured to couple to the first side of the second one of the two or more media players;

a fourth clasp of the at least two clasps is configured to couple to the second side of the second one of the two or more media players; and a first distance between a distal end of the first clasp and a distal end of the second clasp when the first and second clasps are coupled to the extension portion is different than a second distance between a distal end of the third clasp and a distal end of the fourth clasp when the third and fourth clasps are coupled to the extension portion.

15. The electronic device of claim 12, further comprising:

a compressor for modifying audio signals from the two or more media players, wherein:

the electronic component is a transmitter; and the compressor is configured to receive an audio signal from the two or more media players and, when instructed by a user, output a modified audio signal to the electronic component.

16. The electronic device of claim 15, wherein:

when instructed by the user, the compressor is configured to apply to the audio signal at least one of a dynamic compression or a pre-gain amplification.

17. The electronic device of claim 12, further comprising:

a power unit electrically coupleable to the first one of the two or more media players through the holding structure.

18. The electronic device of claim 12, further comprising:

a connecting bar coupling the first clasp to the second clasp.

19. An electronic accessory for two or more electronic devices, the electronic accessory comprising:

a holder comprising:

a cradle section configured to couple to the two or more electronic devices; and a side support coupled to the cradle section; and an electronic component electrically coupleable to the two or more electronic devices through the holder, wherein:

the side support comprises:

a connection region;

at least two arms coupled to the connection region;

a first clamping mechanism coupling a first arm of the at least two arms to the connection region; and a second clamping mechanism coupling a second arm of the at least two arms to the connection region; and the first clamping mechanism and the second clamping mechanism are configured to create a tension between the first arm and the second arm to secure the cradle section to the two or more electronic devices.

20. The electronic accessory of claim 19, wherein:

the first clamping mechanism comprises:

a first spring coupled to the first arm of the at least two arms and the connection region;

the second clamping mechanism comprises:

a second spring coupled to the second arm of the at least two arms and the connection region; and the first spring is coupled to the first arm and the second spring is coupled to the second arm such that the tension is created between the first arm and the second arm.

21. The electronic accessory of claim 19, wherein:

the first one of the two or more electronic devices comprises:

a first side;

a second side opposite the first side;

a front side having a display and adjacent to the first side and the second side; and a back side adjacent to the first side and second side and opposite the front side;

the first arm of the at least two arms is adjacent to the first side of the first one of the two or more electronic devices; and the second arm of the at least two arms is adjacent to the second side of the first one of the two or more electronic devices.

22. A method of using an electronic accessory, the electronic accessory comprising: a cradle having a base section with an electrical coupling; and an electronic component electrically coupled to the electrical coupling; the method comprising:

choosing one or more first side supports based on at least one characteristic of a first electronic device;

coupling the one or more first side supports to the cradle;

choosing a first spacer pad based on the at least one characteristic of the first electronic device;

coupling the first spacer pad to the cradle; and coupling the cradle, the first spacer pad, and the one or more first side supports to the first electronic device.

23. The method of claim 22, further comprising:

coupling the electronic component to an external power source; and providing power from the external power source to the first electronic device through the electrical coupling, wherein:

the electronic component is a power unit; and the electrical coupling is a power coupling.

24. The method of claim 22, further comprising:

rotating the cradle and the first electronic device relative to the power unit; and using the one or more first side supports to provide support to the first electronic device during the rotating.

25. The method of claim 22, further comprising:
decoupling the first electronic device from the cradle and the one or more first side supports;
decoupling the first spacer pad from the cradle;
decoupling the one or more first side supports from the cradle;
choosing one or more second side supports based on at least one characteristic of a second electronic device;
coupling the one or more second side supports to the cradle;
choosing a second spacer pad based on the at least one characteristic of the second electronic device;
coupling the second spacer pad to the cradle; and
coupling the cradle, the second spacer pad, and the one or more second side supports to the second electronic device.

26. The method of claim 25, wherein:
coupling the one or more second side supports to the cradle further comprises:
providing the one or more second side supports to have a second width when coupled to the cradle that is different than a first width of the one or more first side supports when coupled to the cradle.

27. The electronic accessory of claim 1, wherein:
at least a third one of the two or more side supports is configured to provide support to a third one of the two or more electronic devices without concurrent use of the two or more spacer pads when the third one of the two or more electronic devices is coupled to the cradle section and the at least one third one of the two or more side supports is coupled to the cradle section.

28. The electronic accessory of claim 1, wherein:
the cradle section comprises:
a base portion coupled to the power unit; and
an extension portion extending away from the base portion; and
the two or more spacer pads are configured to couple to the extension portion of the cradle section.

29. The electronic accessory of claim 1, wherein:
the at least the first one of the two or more spacer pads has a first thickness;
the at least the second one of the two or more spacer pads has a second thickness; and
the first thickness is different than the second thickness.

30. The electronic device of claim 12, wherein:
the holding structure further comprises:
at least one spacer pad configured to couple to extension portion; and
a third clasp of the at least two clasps configured to couple to the first side of a second one of the two or more media players;
a fourth clasp of the at least two clasps configured to couple to the second side of the second one of the two or more media players; and
the at least one spacer pad is configured to support the third side of the second one of the two or more media players when the first clasp of the at least two clasps is coupled to the first side of the second one of the two or more media players, and the second clasp of the at least two clasps is coupled to the second side of the second one of the two or more media players.

31. The electronic accessory of claim 19, further comprising:
at least one spacer pad configured to couple to the cradle section and configured to provide support to the two or more electronic devices when the two or more electronic devices are coupled to the holder.

* * * * *